United States Patent [19]
Nishida et al.

[11] Patent Number: 5,089,845
[45] Date of Patent: Feb. 18, 1992

[54] PRINTING APPARATUS

[75] Inventors: Fumihiko Nishida; Makoto Urata; Hiroyuki Fujisawa, all of Kyoto, Japan

[73] Assignee: Dainippon Screen Mfg Co. Ltd., Japan

[21] Appl. No.: 637,379

[22] Filed: Jan. 4, 1991

[30] Foreign Application Priority Data

| | | | |
|---|---|---|---|
| Jan. 12, 1990 | [JP] | Japan | 2-4946 |
| Mar. 30, 1990 | [JP] | Japan | 2-34665[U] |
| Mar. 30, 1990 | [JP] | Japan | 2-34666[U] |
| Mar. 30, 1990 | [JP] | Japan | 2-34667[U] |
| Mar. 30, 1990 | [JP] | Japan | 2-87061 |
| Mar. 30, 1990 | [JP] | Japan | 2-87062 |
| Mar. 30, 1990 | [JP] | Japan | 2-87063 |

[51] Int. Cl.$^5$ ............................................. G03B 27/04
[52] U.S. Cl. ........................................ 355/85; 355/99
[58] Field of Search .............................. 355/79, 85, 99

[56] References Cited

U.S. PATENT DOCUMENTS

| | | | |
|---|---|---|---|
| 4,284,349 | 8/1981 | Beasley et al. | 355/79 |
| 4,389,117 | 6/1983 | Floyd et al. | 355/99 X |
| 4,423,955 | 1/1984 | Powers | 355/85 X |
| 4,565,443 | 1/1986 | Yazaki | 355/99 |
| 4,575,235 | 3/1986 | Powers | 355/99 X |
| 4,583,838 | 4/1986 | Machida et al. | 355/85 X |
| 4,664,510 | 5/1987 | Weag | 355/99 X |
| 4,827,316 | 5/1989 | Brown | 355/79 |
| 4,931,833 | 6/1990 | Elwing | 355/85 |
| 4,951,089 | 8/1990 | Powers | 355/85 |
| 4,962,314 | 10/1990 | Hirota et al. | 355/99 C |

FOREIGN PATENT DOCUMENTS

| | | |
|---|---|---|
| 55-44927 | 11/1980 | Japan . |
| 58-95051 | 6/1983 | Japan . |
| 1-19140 | 4/1989 | Japan . |

Primary Examiner—Richard A. Wintercorn
Attorney, Agent, or Firm—Ostrolenk, Faber, Gerb & Soffen

[57] ABSTRACT

In a printing apparatus, a supply pallet storing an original and a photosensitive film is located above a printer. The films are carried onto a transparent plate of the printer in this order by a carrier. Then, light from a light source of the printer is directed toward the transparent plate, whereby an image provided on the original film is printed onto the photosensitive film. Thus, the printing apparatus is small in plane size.

26 Claims, 44 Drawing Sheets

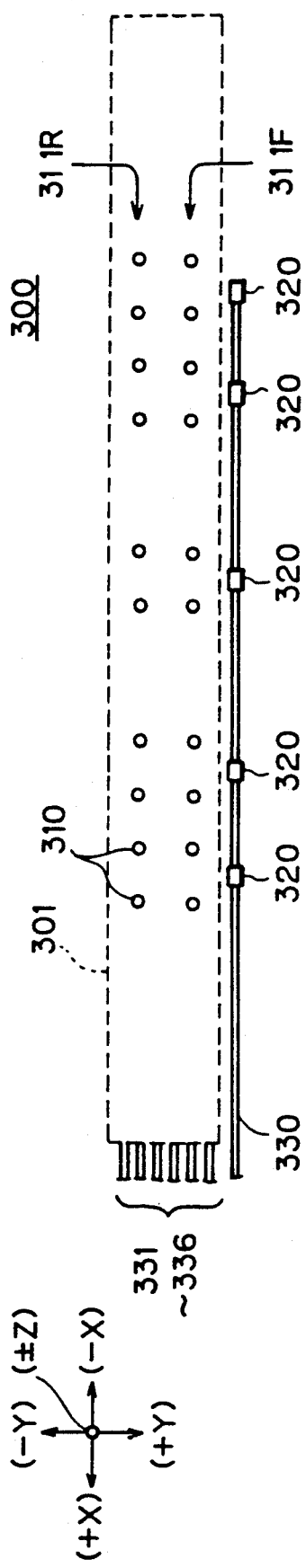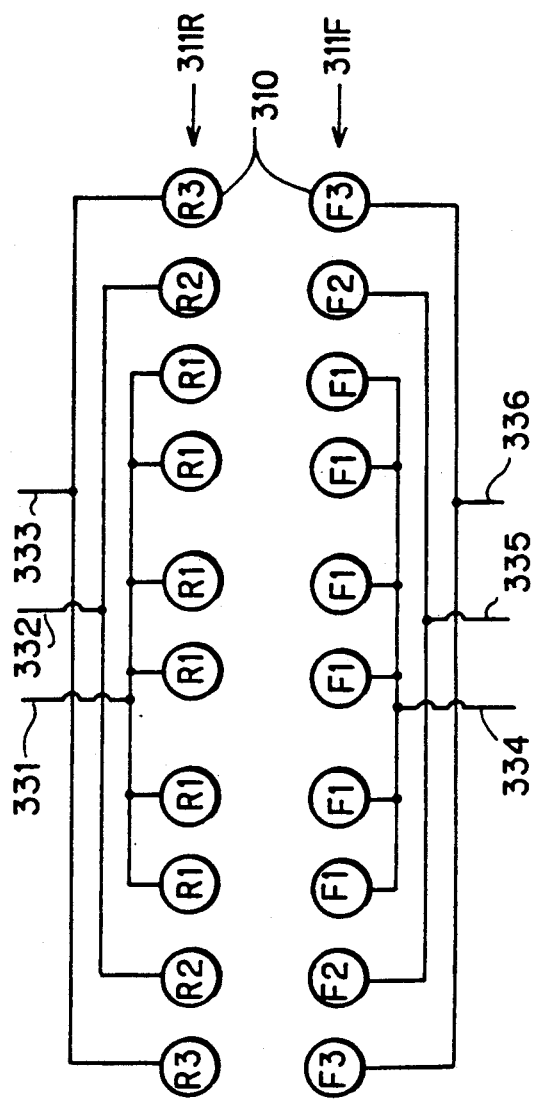

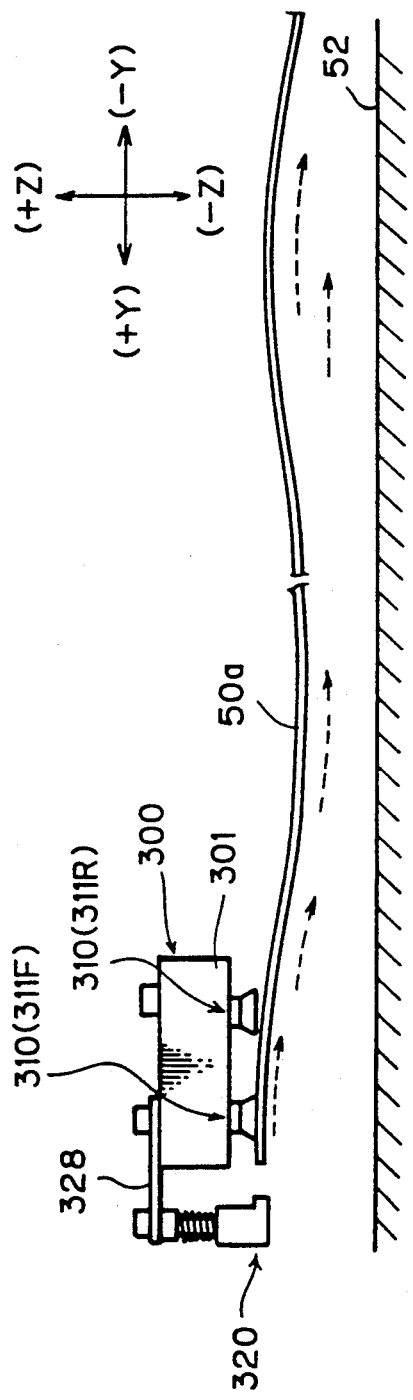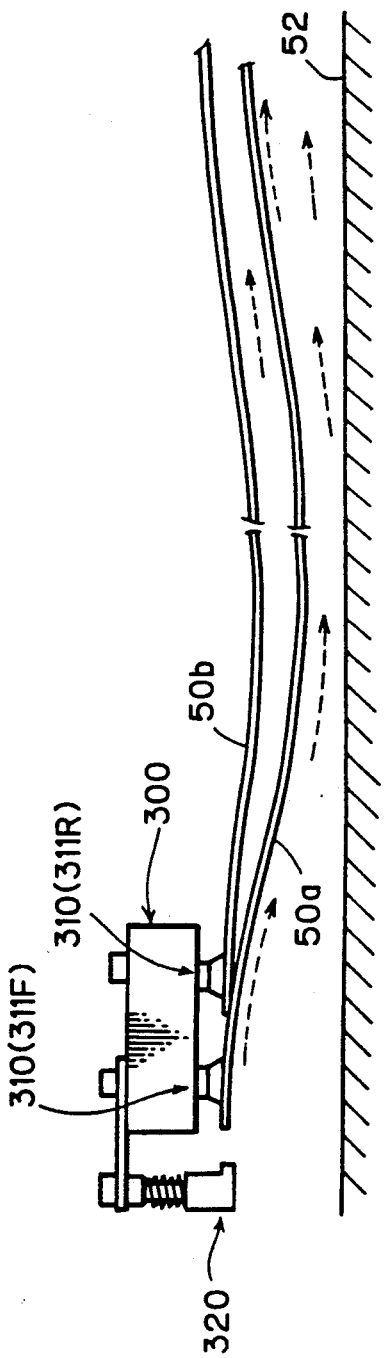

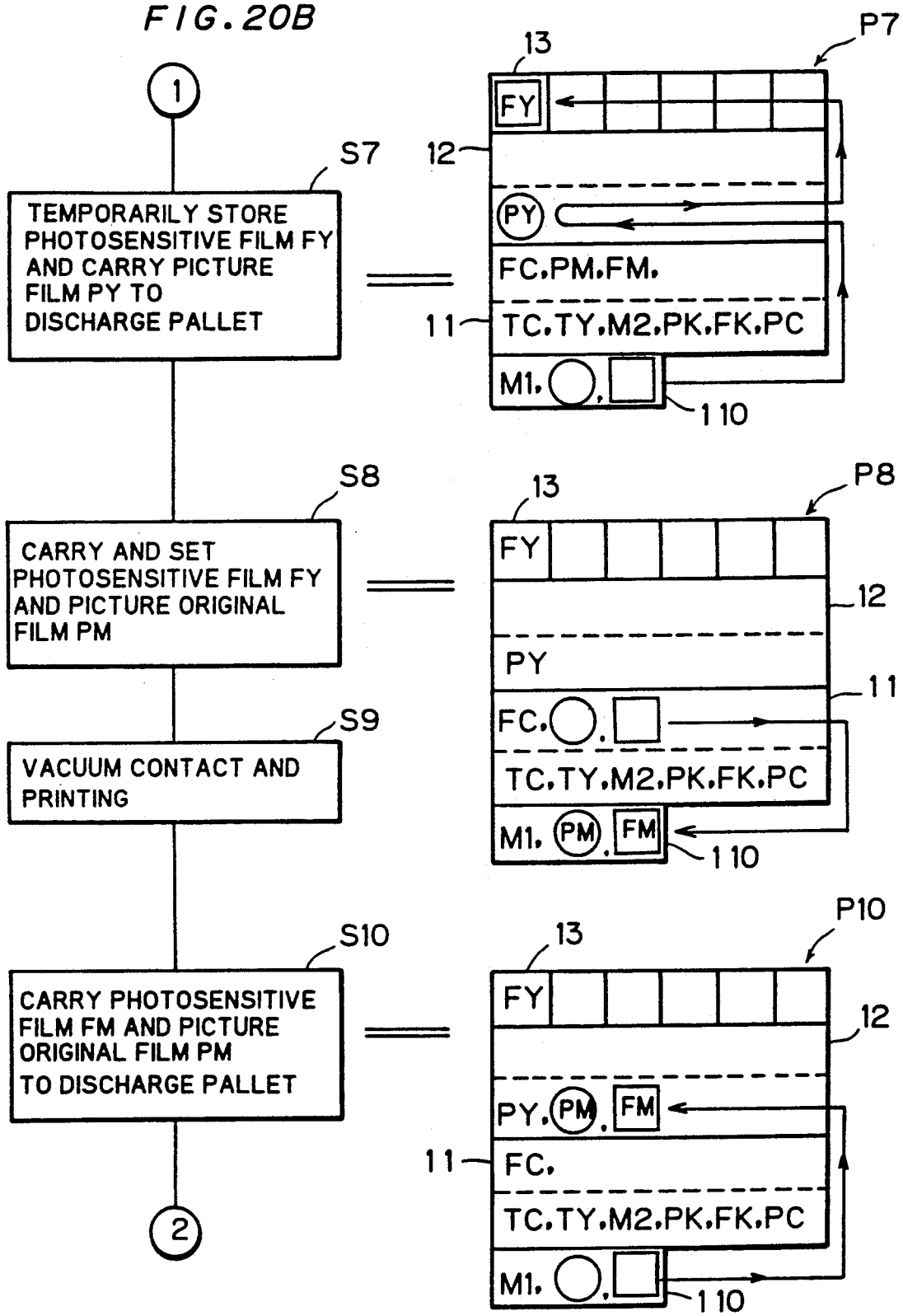

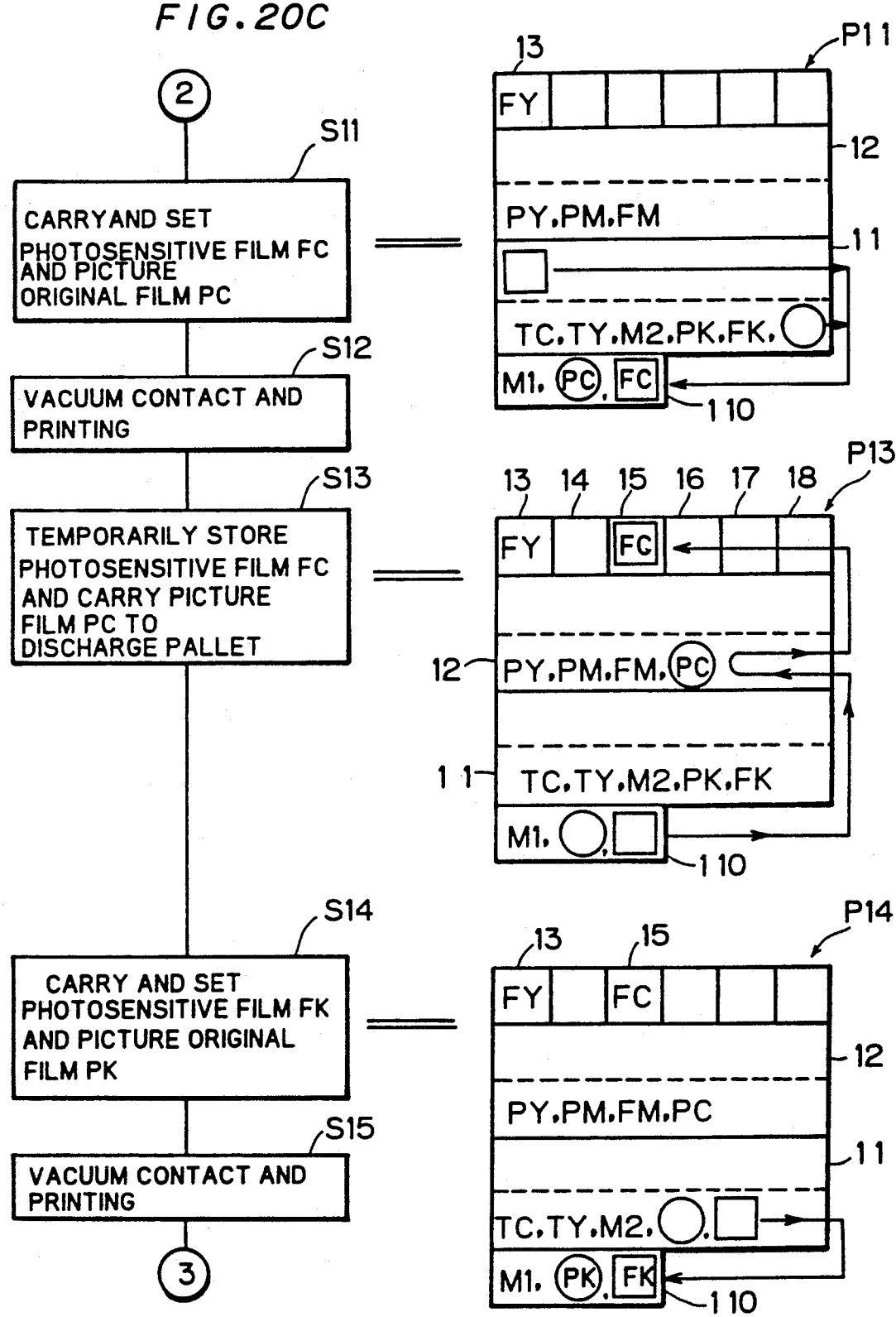

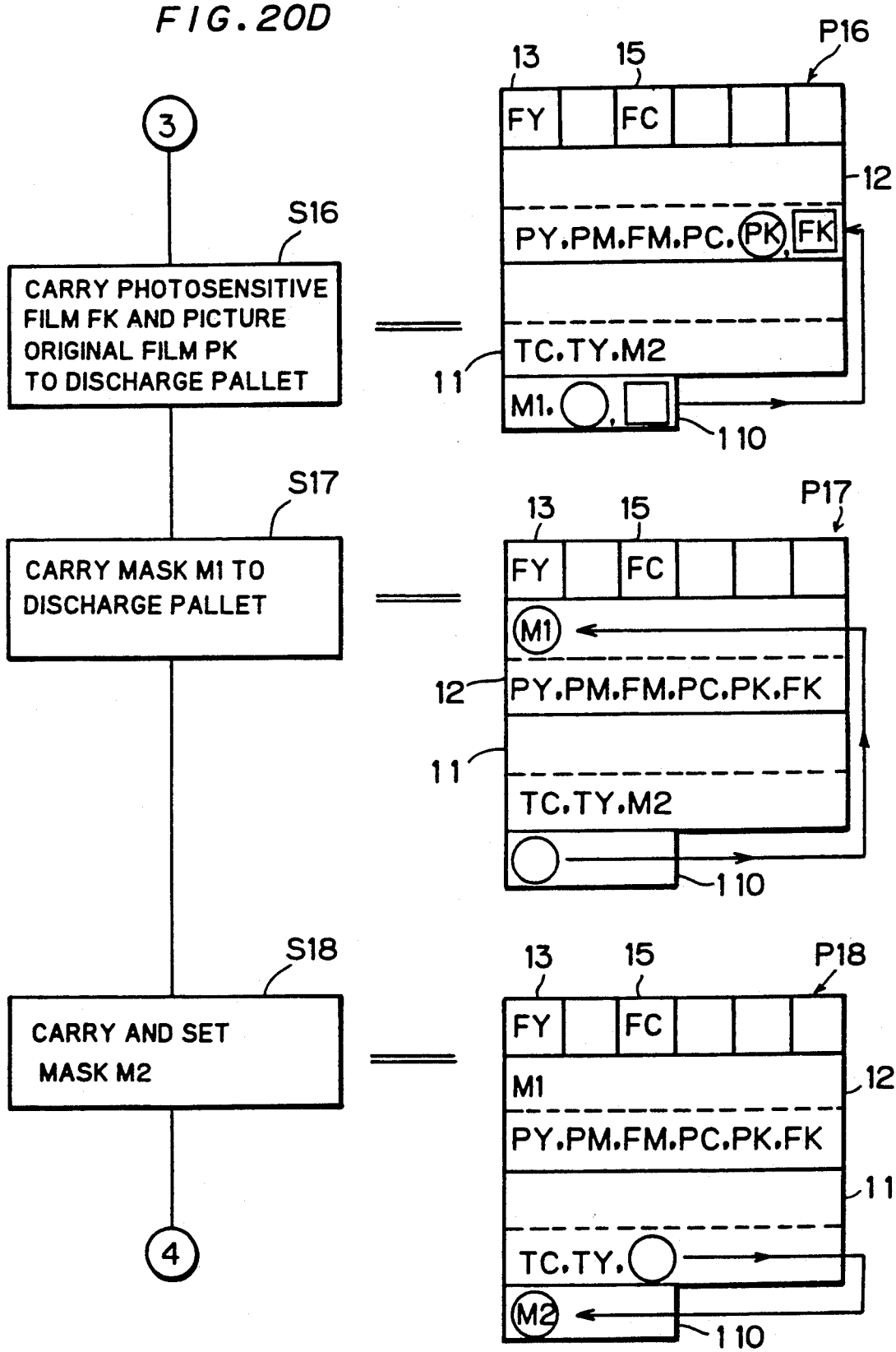

FIG.20E
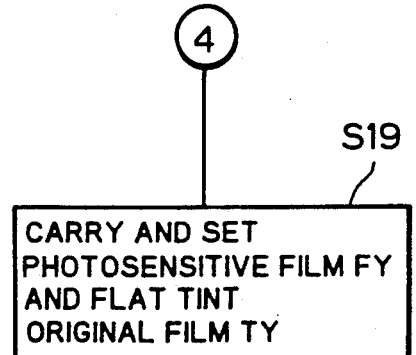
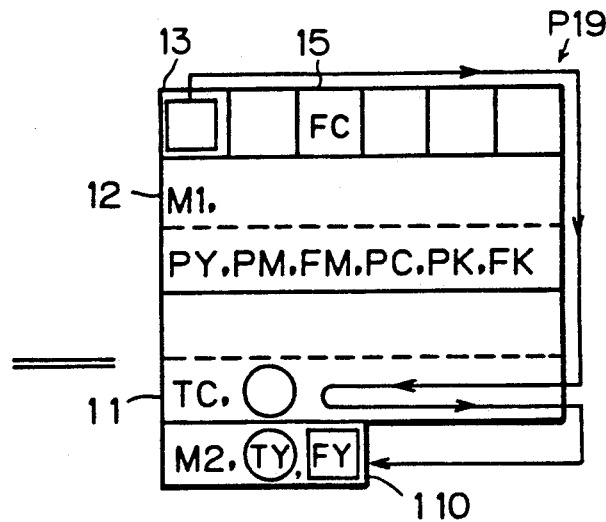
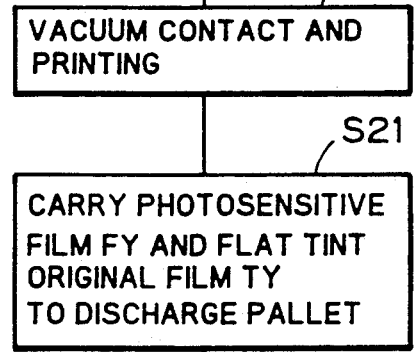
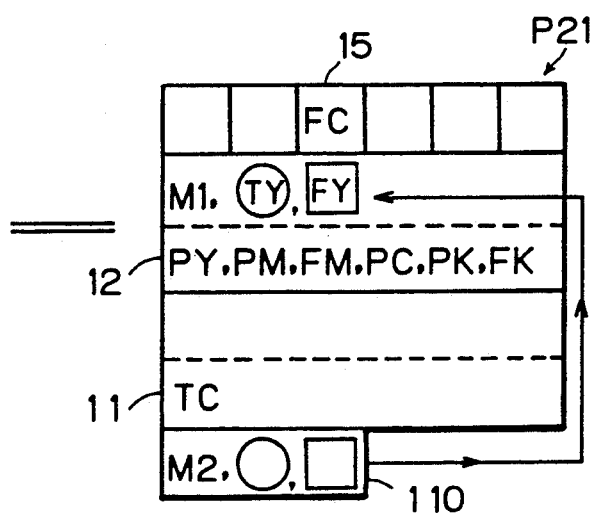
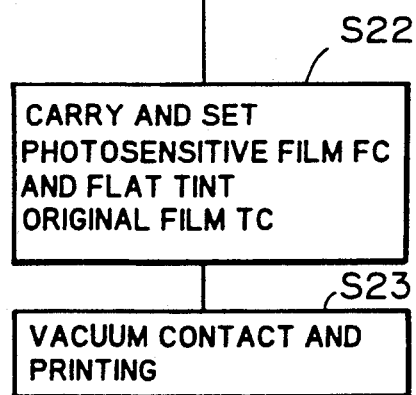
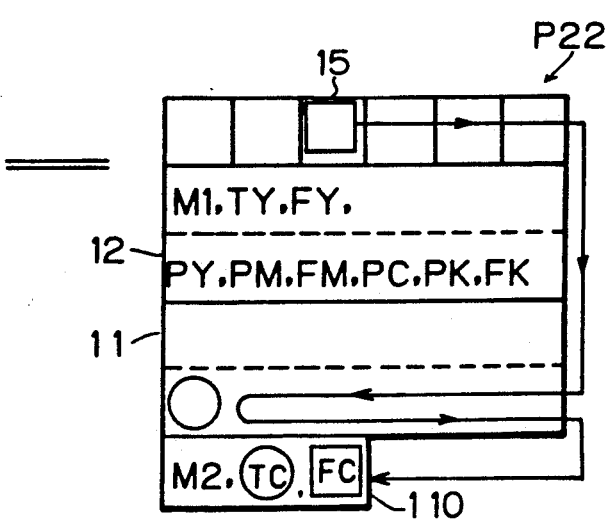

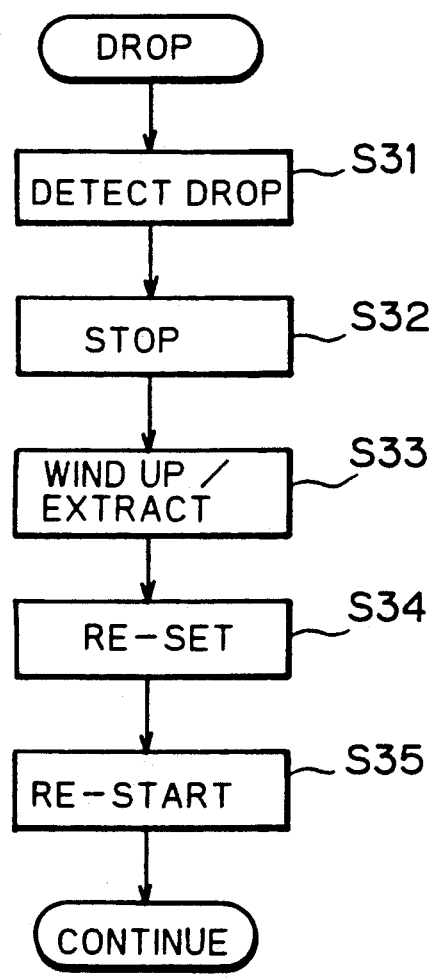

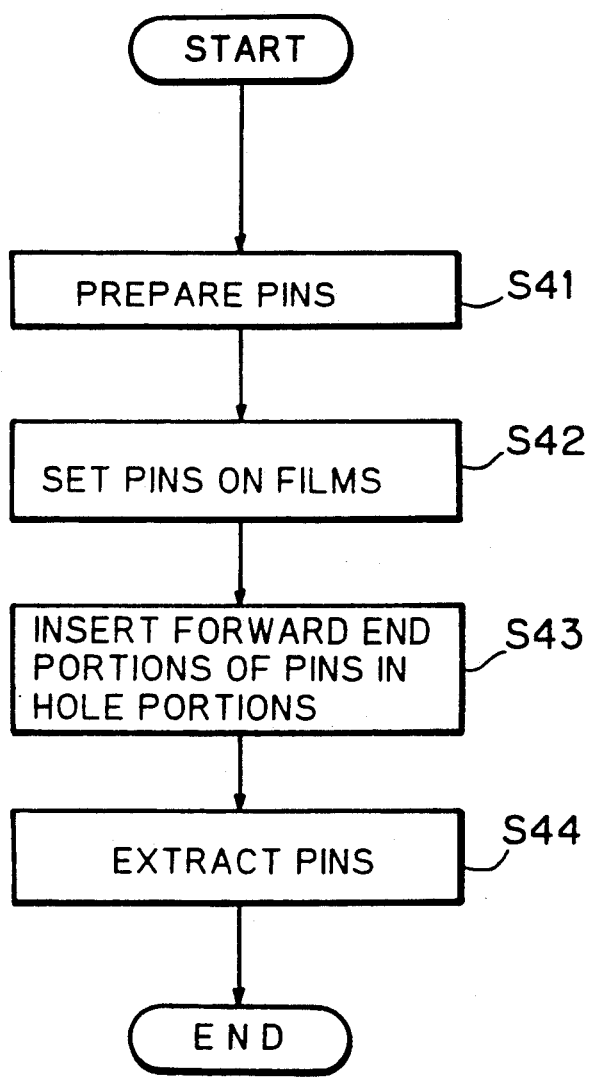

PRINTING APPARATUS

BACKGROUND OF THE INVENTION

1. Field of the Invention

The present invention relates to a printing apparatus for printing an image provided on an original film onto a photosensitive film and, more particularly, to a printing apparatus for producing a color separation.

2. Description of the Background Arts

In a photoengraving process, it is necessary to prepare four color separations which contain information for each of the major printing colors: Yellow (Y), magenta (M), cyan (C) and black (BK). Each of the color separations is produced by printing an image provided on an original film onto a photosensitive film (unexposed film). Then, a reproduction process employing the four color separations is carried out, so that the color image corresponding to the original film is reproduced into a printing paper. When the printing paper is comprised of a plurality of color images such as pictures and characters, all of the images must be provided onto each of the color separations. The term "multiple printing" refers to the multiple operations for printing the images to be reproduced onto a photosensitive film for each color separation.

This multiple printing operation necessarily increases the number of films required for printing. Thus, the required films include the following:

a) four photosensitive films for respective color components Y, M, C and BK;

b) original films for respective color components Y, M, C and BK each of which has a halftone negative original expressing an image such as pictures and characters; and c) a mask film.

Thus, the operation for performing multiple printing by successively combining these films in accordance with prescribed rules is extremely complicated and even a skilled operator requires a considerable time.

Further, since registration of the respective films must be performed with high accuracy in printing, it is necessary to align the positions of the films through register pins. In the multiple printing operation, the number of times for performing such registration is also considerably increased, thereby applying a heavy burden to the operator.

In order to cope with such situation, an apparatus for automatically performing printing operation has been developed. For example, Japanese Patent Laid-Open Gazette No. 60-10252 discloses an automatic printing apparatus in which a pallet group storing an original film and a photosensitive sheet (printing plate) is arranged at the back of an exposure plane of a printer. In the apparatus, one of the pallets selectively advances above the exposure plane while a suction plate of a carrier applying suction to a film in the pallet. Thus, the film is carried onto the exposure plane. The printing operation is automated by using this apparatus, to achieve a reduction in time for the printing operation as well as a reduction of the burden of the operator.

Since the films are generally large in size, the size of a pallet for storing the films must also be increased. Therefore, the aforementioned conventional automatic printing apparatus is considerably increased in plane size. Thus, not only is a wide area is required as an installation area for this automatic printing apparatus, but also it is not easy to correct problems which may arise in the central portion of the apparatus. Further, since a mechanism for moving each pallet must be provided in addition to a moving mechanism for moving a carrier for transfer of the film in the pallet onto the exposure plane, the mechanism for moving the respective parts is also complicated.

SUMMARY OF THE INVENTION

The present invention is directed to a printing apparatus for printing an image provided on an original film onto a photosensitive film. The printing apparatus comprises: a printer including a light source for emitting light and a transparent plate located above the light source; film storage means, arranged above the transparent plate, having a supply pallet for storing a plurality of films required for printing, the films including an original film and a photosensitive film; a carrier including vacuum suction means for applying suction to an end of the film and a nozzle for blowing air in a predetermined direction substantially in parallel with a lower surface of the film held by the vacuum suction means; a carrier moving mechanism for moving the carrier between the transparent plate and the film storage means; a film pocket mechanism for forming a pocket space on a downstream side with respect to an air blowing direction; and a controller for controlling the printer, the carrier and the carrier moving mechanism, such that the original and the photosensitive film which are stored in the supply pallet are carried onto the transparent plate by the carrier so as to be stacked in this order, and then light from the light source is directed toward the transparent plate, whereby an image provided on the original film is printed onto the photosensitive film.

The present invention is also directed to a method of storing a plurality of films on a supply pallet in a prescribed order, the supply pallet having a plurality of first pins, each of the films having a plurality of first holes each of which is engageable with the first pins and a plurality of second holes. The method comprises: preparing a plurality of second pins each of which has a pin portion having diameters identical to or smaller than those of the second holes and a plate portion having larger sizes than the diameters of the second holes; stacking the films in reverse order while engaging the second holes with the second pins; inserting top end portions of the second pins in hole portions provided in the supply pallet while engaging the first holes of the films with the second pins; and extracting the second pins from the second holes.

Accordingly, an object of the present invention is to provide a printing apparatus which is small in plane size and operable by a relatively small number of movable mechanisms.

Another object is to provide a printing apparatus which can prevent damage of a film even if the film is dropped in the apparatus.

Another object is to provide a printing apparatus which can easily extract a film dropped in the apparatus.

Another object is to provide a printing apparatus in which the time required for printing an image provided on an original film onto a photosensitive film is reduced.

Another object is to provide a carrier moving mechanism for a printing apparatus, which can prevent an exposure surface from breakage caused by a carrier when the carrier carries films between film storage means and a printer, without adding any specific structure such as a moving mechanism to the film storage means.

Another object is to provide a temporary storage pallet for a printing apparatus, which can easily prevent positional deviation of the film.

Another object is to provide a film storage method for a printing apparatus, which can reduce downtime of the printing apparatus without reducing positional accuracy of a supply pallet.

Another object is to simplify te structure of a carrier for a printing apparatus.

Another object is to provide a carrier for a printing apparatus, which can easily engage register holes provided in films with register pins uprightly provided in a printer means.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8A is a plan view of the carrier;

FIG. 8B is a perspective view of a suction cup;

FIG. 8C illustrates the relation between the suction cups and a suction tube in the carrier;

FIG. 10A is a side elevational view of the carrier holding a film;

FIG. 10B is a side elevational view of the carrier holding two films;

FIGS. 20A to 20F are flow charts showing the operation of the embodiment, respectively;

FIG. 21 is a flow chart of the operation for extracting a dropped film;

FIG. 23 is a flow chart of the operation for storing films in the supply pallet;

DESCRIPTION OF THE PREFERRED EMBODIMENTS

A. Overall Structure

Figure 1A:
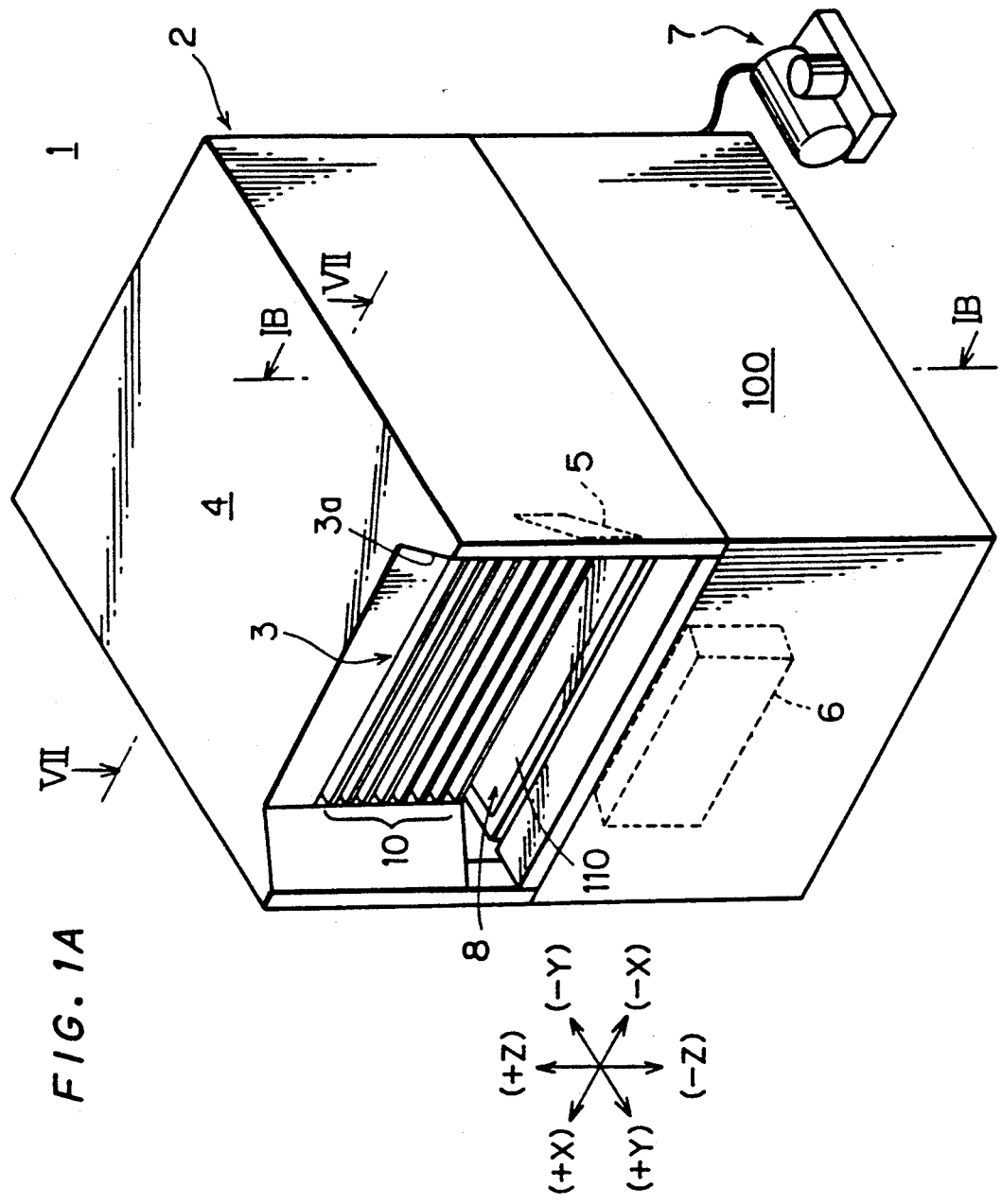
FIG. 1A is a perspective view of a printing apparatus according to an embodiment of the present invention.

FIG. 1A is a perspective view of a printing apparatus 1 according to an embodiment of the present invention. The printing apparatus 1 comprises a body 2 and an air compressor 7 which is coupled to the body 2 through an air hose. The body 2 includes a printer 100 in the form of a rectangular solid and a housing 4 provided above the printer 100. The housing 4 has a window 3 on it front, so that a pallet group 10 can be inserted into and extracted from the housing 4 through the window 3.

A horizontally extending transparent plate 110 such as a glass plate is provided on a top portion of the printer 100. The pallet group 10 is located above the transparent plate 110 through a prescribed space 8. A console panel 5 is located on a right side wall 3a of the window 3, while a control unit 6 for controlling the operation of the printing apparatus 1 is contained in the printer 100. In FIG. 1A, symbols ($\pm X$) and ($\pm Y$) represent the directions which orthogonally intersect with each other in a horizontal plane, and symbols ($\pm Z$) represent the vertical directions which orthogonally intersect with these directions ($\pm X$) and ($\pm Y$).

Figure 1B:
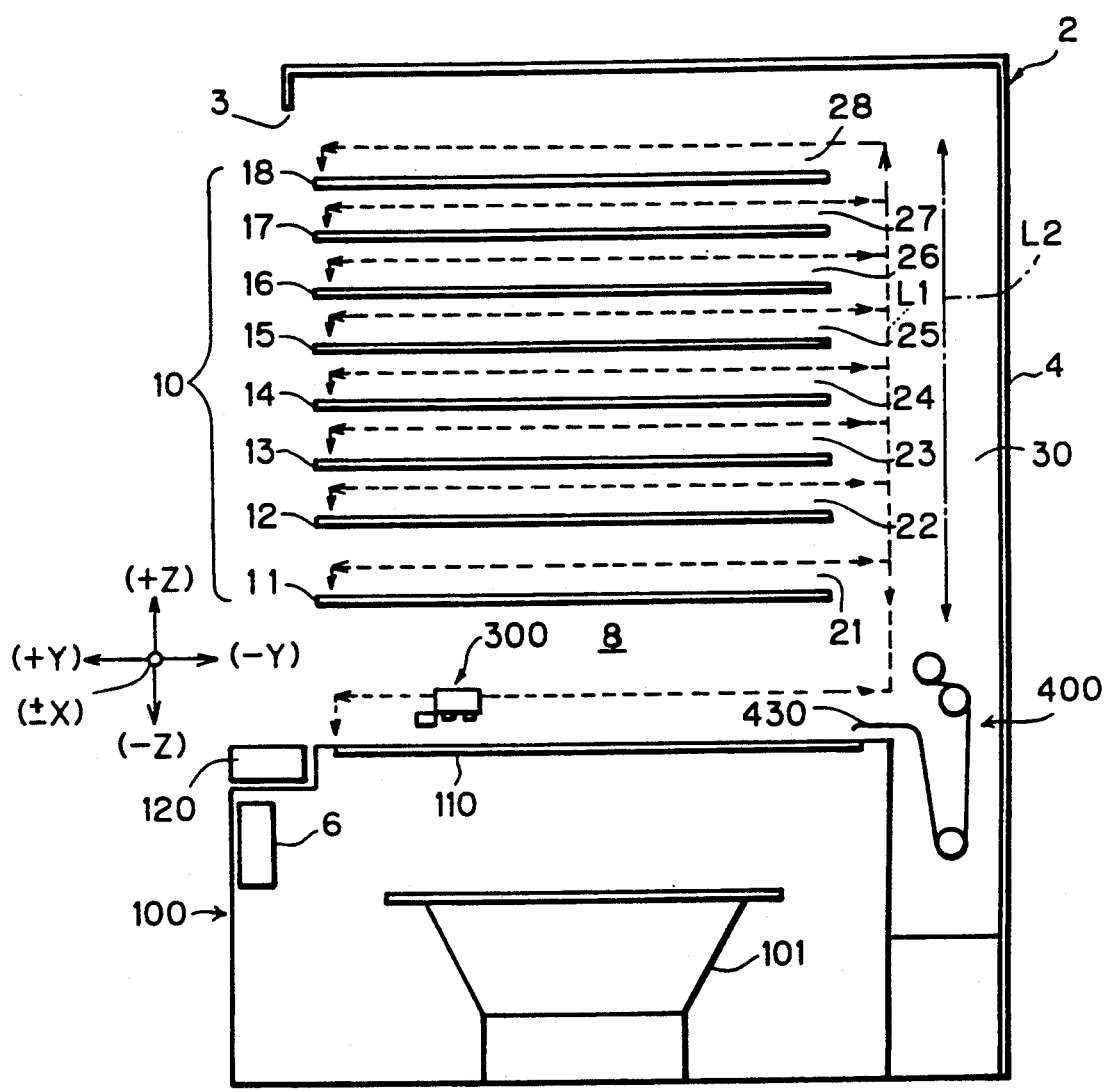
FIG. 1B is a sectional view of a body along the line IB—IB in FIG. 1A.

FIG. 1B is a sectional view of the body 2 along a line IB—IB in FIG. 1A. The printer 100 comprises a light source 101 upwardly emitting light and a rubber sheet spreading mechanism 120. The rubber sheet spreading mechanism 120 is located under the window 3. In the rubber sheet spreading mechanism 120, and end side of the transparent plate 110 is defined as "initial position".

The pallet group 10 includes eight pallets 11 to 18: the bottom pallet 11 is a supply pallet for previously storing original, photosensitive and mask films which are carried onto the transparent plate 110 in printing; the pallet 12 located just above the supply pallet 11 is a discharge pallet for receiving films which have been used for printing in a stacking manner; and the remaining pallets 13 to 18 are temporary storage pallets for temporarily storing films which are used a plurality of times in printing. Each of the temporary storage pallets 13 to 18 can hold a film by vacuum suction means. In the embodiment, thus, the temporary storage pallets 13 to 18 can simultaneously store a maximum of six films to be stored.

In printing, one or a plurality of mask films are generally employed. Thus, it is desired that one or a plurality of pallets for storing the mask films are installed as temporary storage pallets in addition to the four pallets for temporarily storing respective photosensitive films for color components Y, M, C and BK.

The respective pallets 11 to 18 are disposed in superposed vertically spaced relation, in other words, there are prescribed gaps 21 to 27 therebetween. Further, a prescribed space 28 is also present between the top pallet 18 and a top surface of the housing 4. Though the pallets 11 to 18 may be arranged in arbitrary order, it is preferably that the supply pallet 11 is in the bottom. Furthermore, the discharge pallet 12 may be disposed just above the supply pallet 11. The reason for this is as follows:

First, it is noted that the supply pallet 11 and the discharge pallet 12 are necessarily used in printing while the frequency of employment of the temporary storage pallets 13 to 18 relatively low. Namely, the temporary storage pallets 13 to 18 are partially or entirely used only when it is necessary to temporarily store films. Needless to say, it is possible to execute a printing procedure without using the temporary storage pallets 13 to 18 as the case may be. Even if it is necessary to use the temporary storage pallets 13 to 18, the number of times of using them is relatively small. On the other hand, each of the films is carried from the supply pallets 11 to the transparent plate 110, and is carried from the transparent plate 110 to the discharge pallet 12. Hence, it is advantageous to locate a pallet having high access frequency close to the transparent plate 110 with a view to reduce the total time for such carriage. Accordingly, it is preferable to arrange the supply pallet 11 and the discharge pallet 12 under the temporary storage pallets 13 to 18.

In the supply pallet 11, all of the films required for printing must be set thereon with positional relation therebetween. On the contrary, used films may simply be stacked in the discharge pallet 12 so that the same can be extracted through the window 3 when the printing procedure is completed. Thus, it is preferable to locate the supply pallet 11 in a relatively low position so that the same can be easily handled by the operator. For such reason, the order of arrangement of the pallets 11 to 18 is optimized in this embodiment.

The transparent plate 110 serves as a printing surface, on which a mask, an original and a photosensitive film are stacked one by one in this order. The light from the light source 101 is directed through the transparent plate 110 toward the films stacked thereon, whereby a prescribed image is printed onto the photosensitive film. The films are carried between the transparent plate 110 and the respective pallets 11 to 18 by carrier 300 which extends in the direction ($\pm X$). The carrier 300 applies suction to one end of the film in a vacuum-suction manner while blowing air toward the film in the direction ($-Y$). Thus, the carrier 300 suspendingly holds the film. The carrier 300 is also moved in the directions ($\pm Y$) and ($\pm Z$) by a carrier moving mechanism not shown in FIG. 1B. In practice, the carrier 300 is moved along a moving path indicated by a broken arrow "L1", since the films must be carried while avoiding interference between the carrier 300 and the respective pallets 11 to 18.

A vertically extending space 30 is provided in the rear-side interior of the housing 4. In the space 30, a film pocket mechanism 400 vertically moves along a dashed-dotted line L2. The depth of a pocket for storing the film is automatically changed following the movement of the carrier 300 along the directions ($\pm Y$).

Detailed of respective parts of the printing apparatus 1 are as follows:

B. Detailed Structure of Each Parts

(B-1) Printer 100

Figure 2:
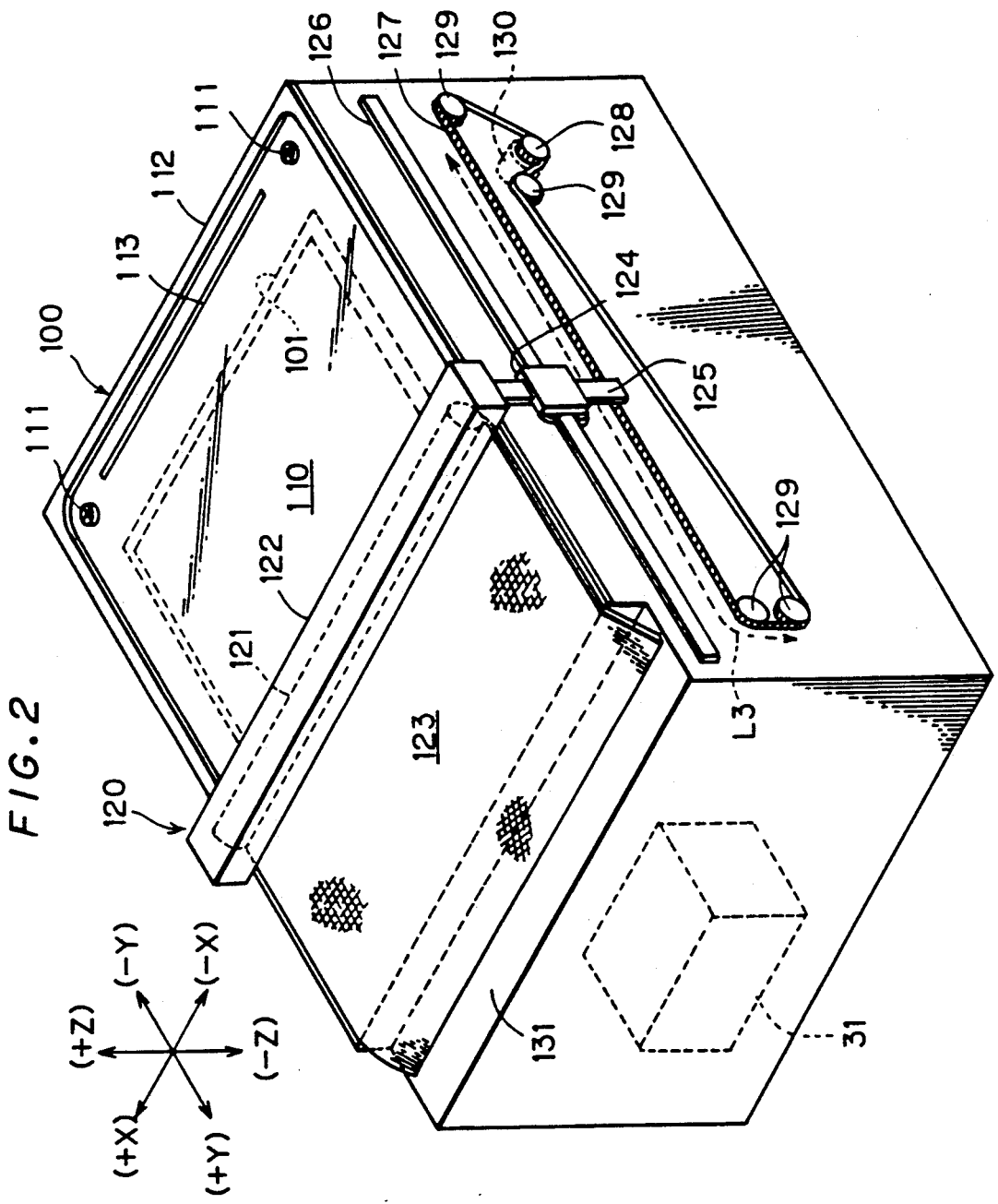
FIG. 2 is a perspective view of a printer.

FIG. 2 is a perspective view of the printer 100. A guide rail 126 extending in the directions ($\pm Y$) is mounted on each side of the printer 100, so that a traveling member 124 can travel in the directions ($\pm Y$) along the guide rail 126. A coupling rod 125 is inserted in the traveling body 124 for sliding along the directions ($\pm Z$), and the lower end of the coupling rod 125 is coupled to an endless chain 127. The endless chain 127 extends about a sprocket 128 coupled to a motor 130 and a sprocket 129 rotatably mounted on the printer body. Thus, driving force of the motor 130 is transmitted through the chain 127, in consequence the coupling rod 125 moves along a moving path indicated by the arrow "L3", the moving path L3 being in combination of horizontal movement along the directions ($\pm Y$) and vertical movement along the directions ($\pm Z$). A mechanism similarly to the above is also provided on the opposite side of the printer 100, although such mechanism is not shown in FIG. 2.

The top end of the coupling rod 125 is coupled to an elongated box 122 extending in the directions ($\pm X$). In the box 122, a rubber sheet 123 having a light-shielding and airtight property is stored in the form of a roll 121, while an end of the rubber sheet 123 is fixed to a step 131 which is formed on the front side of the transparent plate 110. When the chain 127 is clockwisely rotated, thus, the box 122 is moved in the direction ($-Y$). Accordingly, the rubber sheet 123 is delivered from the roll 121, to thereby cover the upper surface or the transparent plate 110. When the chain 127 is counter-clockwisely rotated, on the contrary, the boxy 122 is moved in the direction ($\pm Y$), so that the rubber sheet 123 is wound in the form of the roll 121 as the box 122 is moved along the direction ($+Y$). If the chain 127 is further anticlockwisely rotated, the coupling rod 125 is downwardly moved in the direction ($-Z$) while the box 122 being downwardly moved onto the step 131.

On the other hand, air suction ports 111 are provided on end portions of the transparent plate 110. The suction ports 111 are coupled to a vacuum pump 31, so as to suck air around the transparent plate 110. Further, a rubber packing 112 is provided around the transparent plate 110. When the rubber sheet 123 is spread to cover the overall transparent plate 110, thus, a space between the transparent plate 110 and the rubber sheet 123 is rendered airtight against the exterior.

Figure 3:
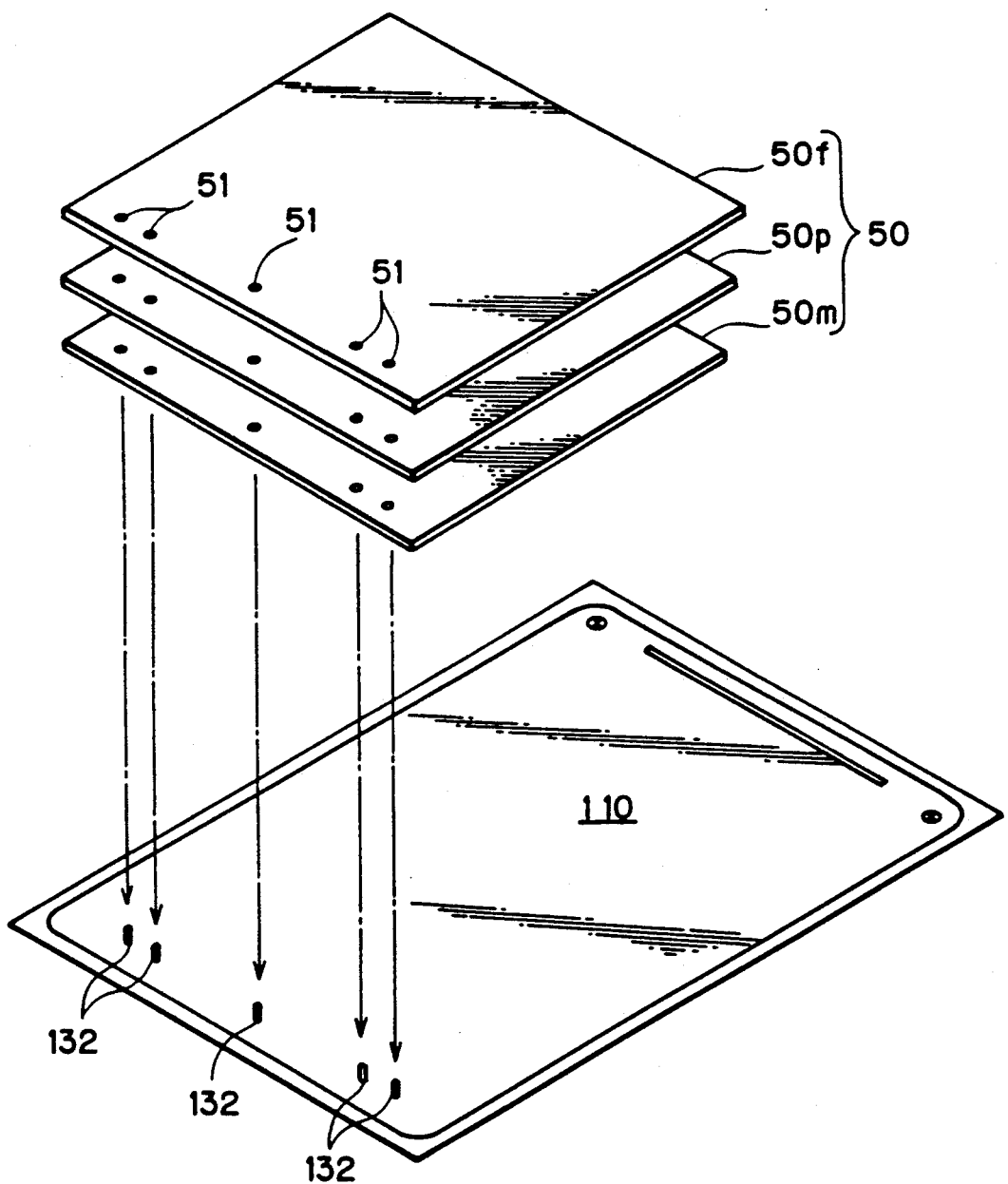
FIG. 3 illustrates the relation between a glass plate and films to be stacked on a supply pallet.

FIG. 3 illustrates the relation between the transparent plate 110 and films to be stacked thereon. As i FIG. 3, a plurality of pins 132 are uprightly provided on a pin bar, not shown in the figure, which is mounted on an end portion of the transparent plate 110. Further, a plurality of register holes 51 are formed in an end portion of each of films 50 so as to be engaged with the register pins 132, the films 50 including a mask film 50m, original film 50p and a photosensitive film 50f. In printing an image onto the photosensitive film 50f, the films 50 are stacked and located on the transparent plate 110 while the register holes 51 thereof being engaged with the pins 132, respectively. Such placement is automatically performed through the carrier 300 of FIG. 1B, as hereinafter described.

After the respective films 50 are placed on the transparent plate 110, the rubber sheet 123 of FIG. 2 is automatically spread to cover the respective films 50. Then, negative pressure is applied to a space between the rubber sheet 123 and the glass plate 110 by sucking air from the suction ports 111. This allows the films 50 and the transparent plate 110 to be brought into close contact with each other. Next, the light source 101 emits light for a time corresponding to a prescribed integrated quantity of light, so that light passing through a transparent portion of the mask film 50m impinges upon the photosensitive film 50f through the original film 50p. Consequently, a portion of the image on the original film 50p, corresponding to the transparent portion, is printed onto the photosensitive film 50f. Thereafter, the rubber sheet 123 is wound in the form of the roll 121 by movement of the box 122 along the direction (+Y).

(B-2) Film Storage Part 200

Figure 4A:
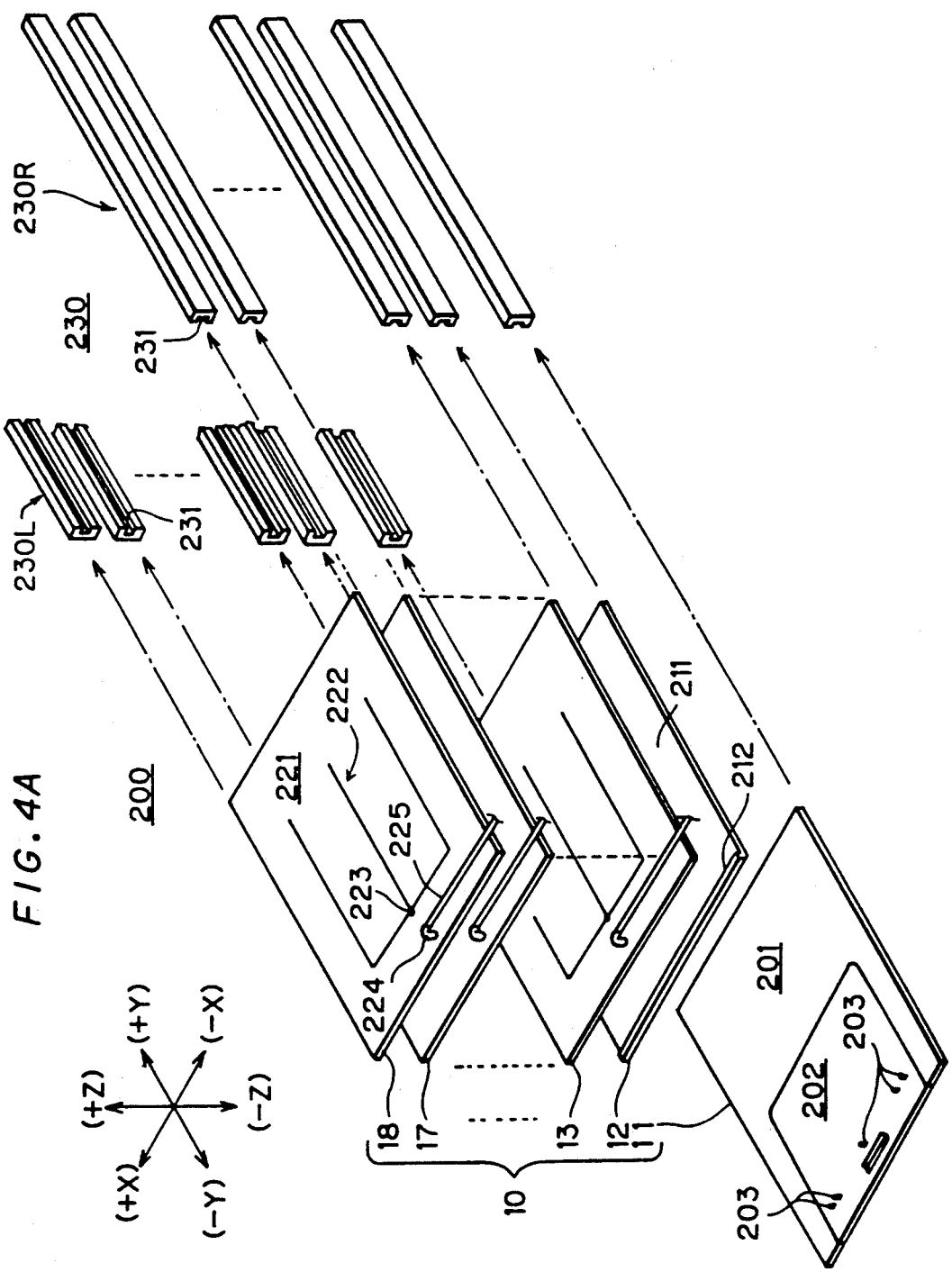
FIG. 4A is an exploded perspective view of a film storage part.
Figure 7:
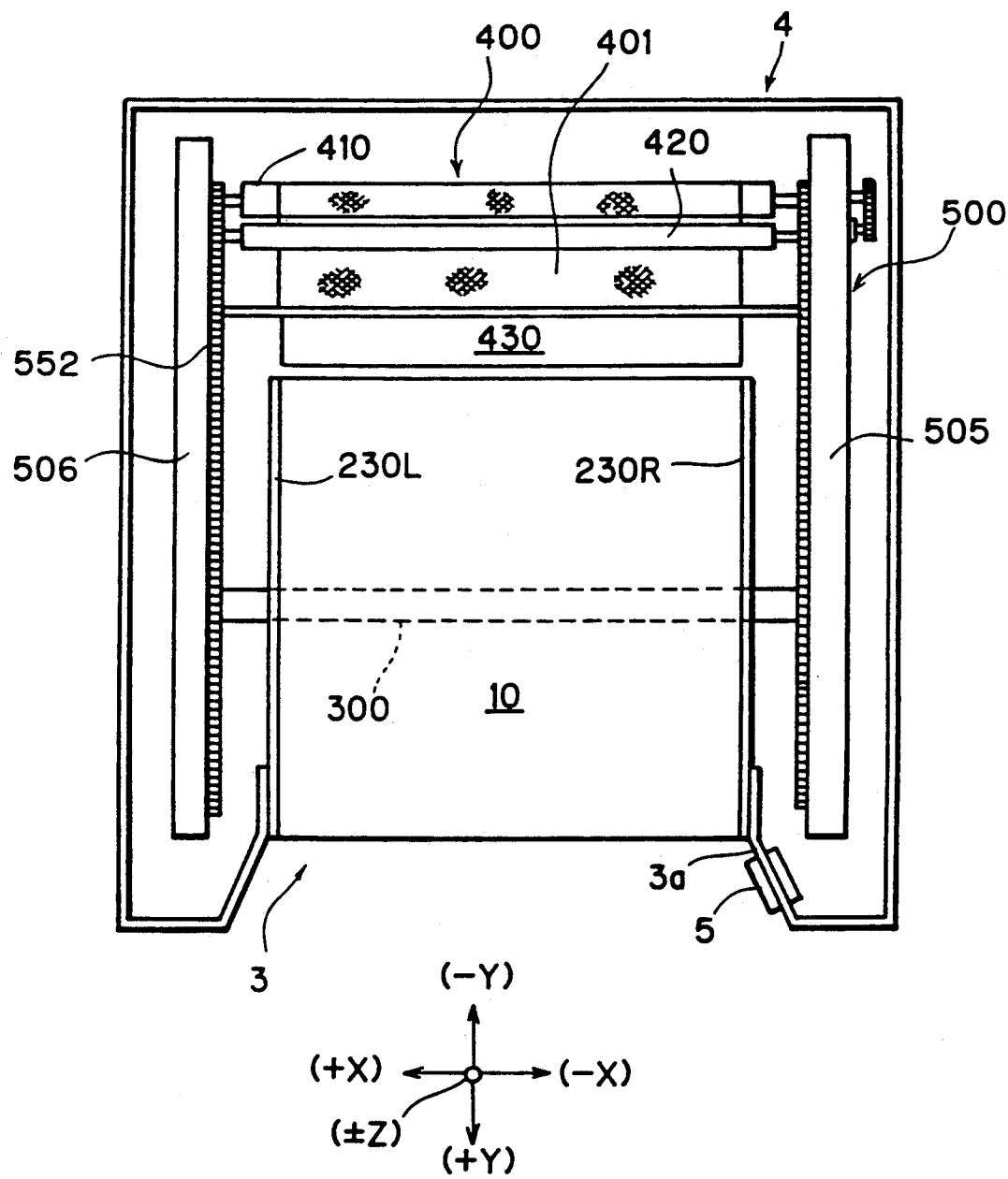
FIG. 7 is a sectional view taken along the line VII—VII in FIG. 1A.

FIG. 4A is an exploded perspective view of the film storage part 200. As in FIG. 4A, the film storage part 200 has a pallet holding mechanism 230 which holds the pallet group 10. The pallet holding mechanism 230 has eight horizontal guide members 230R and eight horizontal guide members 230L, which are fixed in the interior of the housing 4, as shown in FIG. 7. FIG. 7 is a typical sectional view taken along the line VII—VII in FIG. 1A. Side edges of the respective pallets 11 to 18 are inserted in guide grooves 231 formed in respective ones of the horizontal guide members 230R and 230L, so that the pallet 11 to 18 are held between the horizontal guide members 230R and 230L. The pallets 11 to 18 are slidable along the grooves 231, and can be drawn out through the window 3 of FIG. 1A at need. Particularly, the supply pallet 11 and the discharge pallet 12 are drawn out before and after printing in order to set and discharge the films, respectively. FIGS. 1A and 1B show the pallet group 10 in a state held by the pallet holding mechanism 230.

In FIG. 4A, the supply pallet 11 is formed by two metal plates 201 and 202. These plates 201 and 202 are coupled with each other by fixed screws (not shown), for example. Accordingly, the plate 202 can be removed from the plate 201 by loosening the fixed screws. The plate 202 has a plurality of upright pins 203 which are engageable with the register holes 51 (FIG. 3) in each of of the films 50. Hence, all films required for printing are set on the supply pallet 11 with the register holes 51 being engaged with the pins 203. Since the plate 202 is detachable from the plate 201, it is possible to draw out only the plate 202 for setting the films. If a plurality of plates 202 are previously prepared, it is also possible to set films, to be required in next the printing, during automatic driving of the printing apparatus 1.

The discharge pallet 12 is formed by a metal plate 211, and a bank 212 provided on an end portion of the plate 211 for preventing film droppage. It is not necessary to provide pins for registering the films on the discharge pallet 12, since the discharge pallet 12 is for merely storing used films.

Figure 4B:
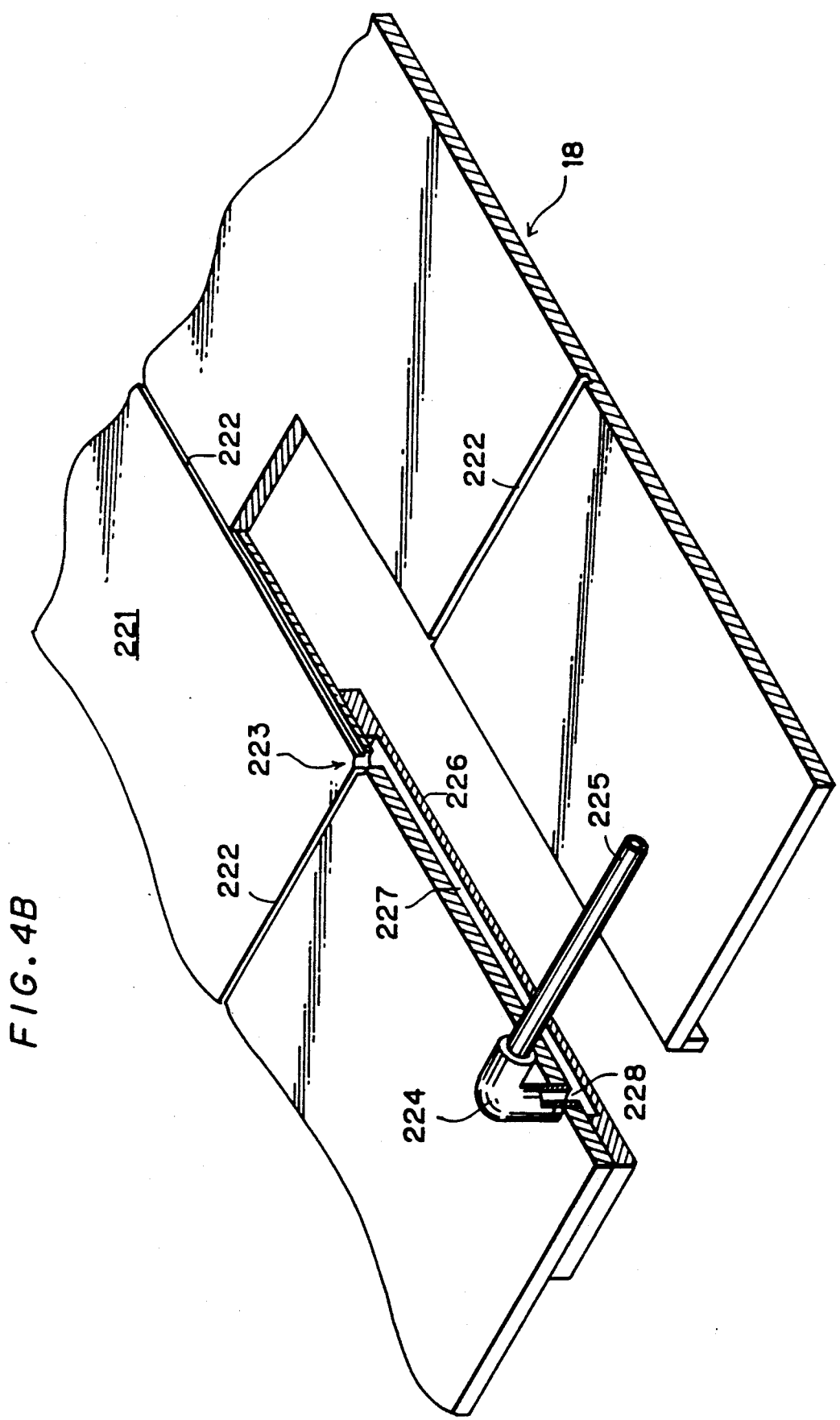
FIG. 4B is a partially fragmented enlarged view of a temporary storage pallet.

The temporary storage pallets 13 to 18 have the same structures. FIG. 4B is a partially fragmented enlarged view of the discharge pallet 18.

The pallet 18 comprises a metal plate 221 having a flat upper surface. An E-shaped groove 222 is formed on the upper surface of the plate 221, and an air suction port 223 is provided in one portion of the groove 222. The air suction port 223 is defined by an upper opening of a through hole passing through the plate 221.

As in FIG. 4B, a metal plate 226 having a groove 227 is fixed to the back surface of the metal plate 221. An end of this groove communicates with the air suction port 223, while the other end communicates with a through hole 228 which is formed on an end of the plate 221. A hollow connector 224 is inserted in the through hole 228, and communicates with the vacuum pump (negative pressure source) 31 shown in FIG. 2 through a flexible tube 225 and an electromagnetic valve (not shown). Thus, the groove 222 provided on the plate 221 and the air suction port 223 are coupled to the vacuum pump 31 through the groove 227, the connector 224 and the tube 225. When a film is placed on the plate 221 and air is sucked from the air suction port 223, a negative pressure is applied to the film. Thus, the film is held onto the plate 221 while preventing positional deviation thereof during such air suction.

(B-3) Carrier Moving Mechanism 500

Figure 5:
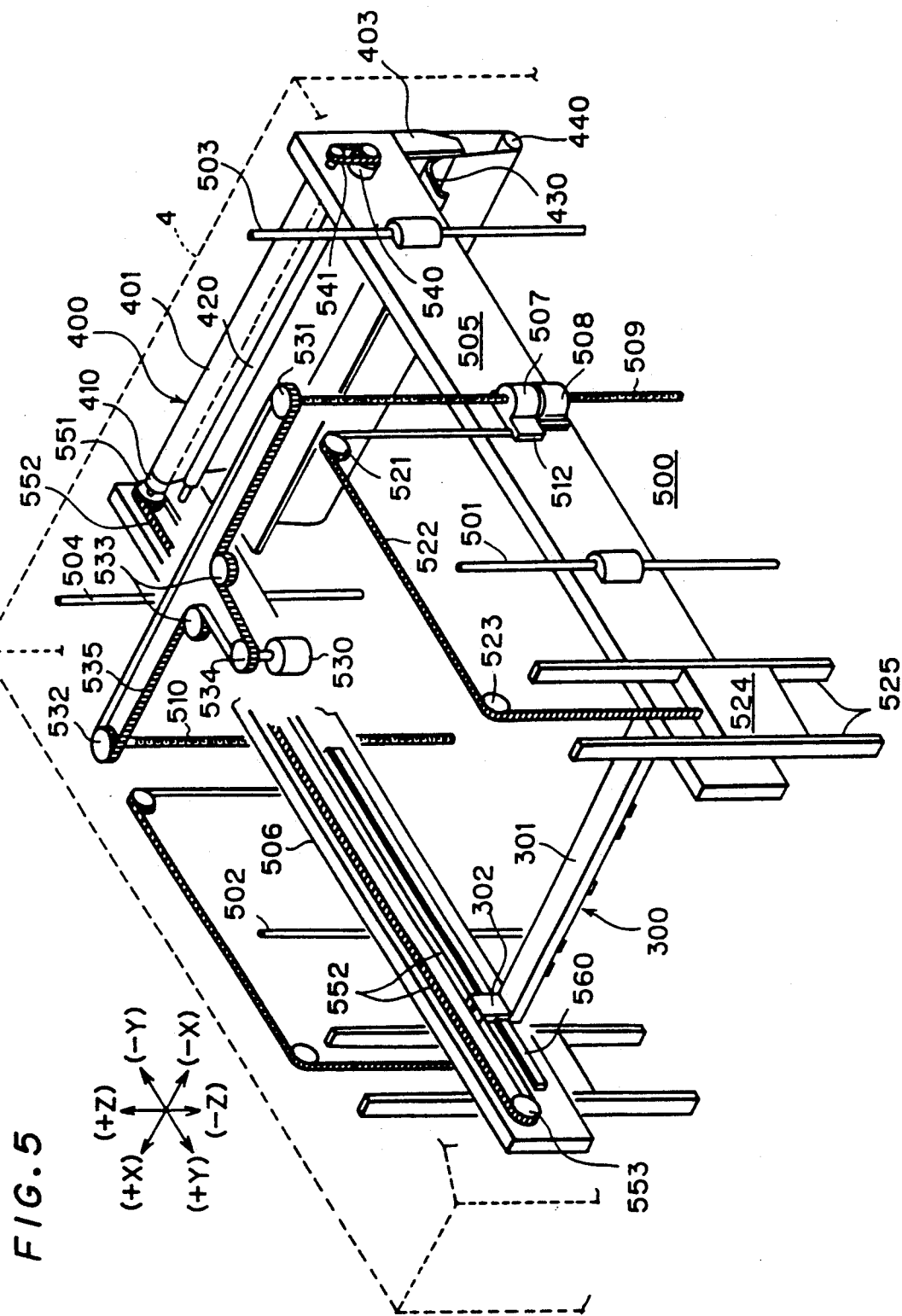
FIG. 5 is a perspective view of a carrier moving mechanism.

FIG. 5 is a perspective view of the carrier 300 and the carrier driving mechanism 500. The carrier driving mechanism 500 is provided around the film storage part 200 (not shown in FIG. 5).

(1) Vertical Movement

Four guide rods 501 to 504 extending in the directions (±Z) are provided on both side portions of the housing 4. Elevation beams 505 and 506 extending in the directions (±Y) are supported by the guide rods 501 to 504 for sliding along the directions (±Z). Positional relation between the respective elevation beam 505 and 506 and the pallet group 10 is shown in FIG. 7.

As in FIG. 5, a coupling member 507 is fixed to the side of the elevation beam 505. A nut 508 is engaged with a screw rod 509 extending in the direction (±Z), and is disposed under the coupling member 507.

Figure 6A:
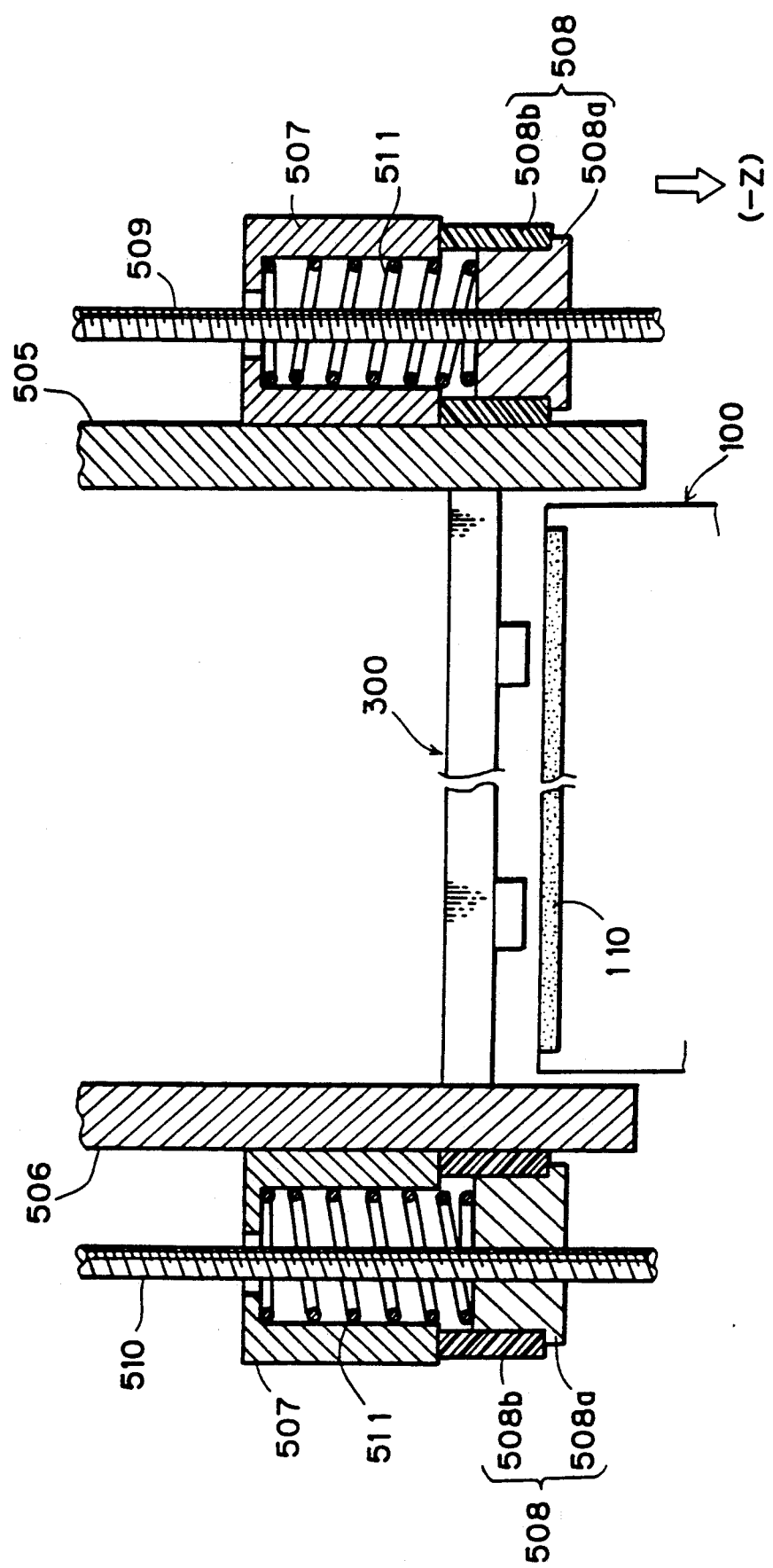
FIGS. 6A and 6B are sectional views showing the relation between a coupling member and a nut in the carrier moving mechanism.
Figure 6B:
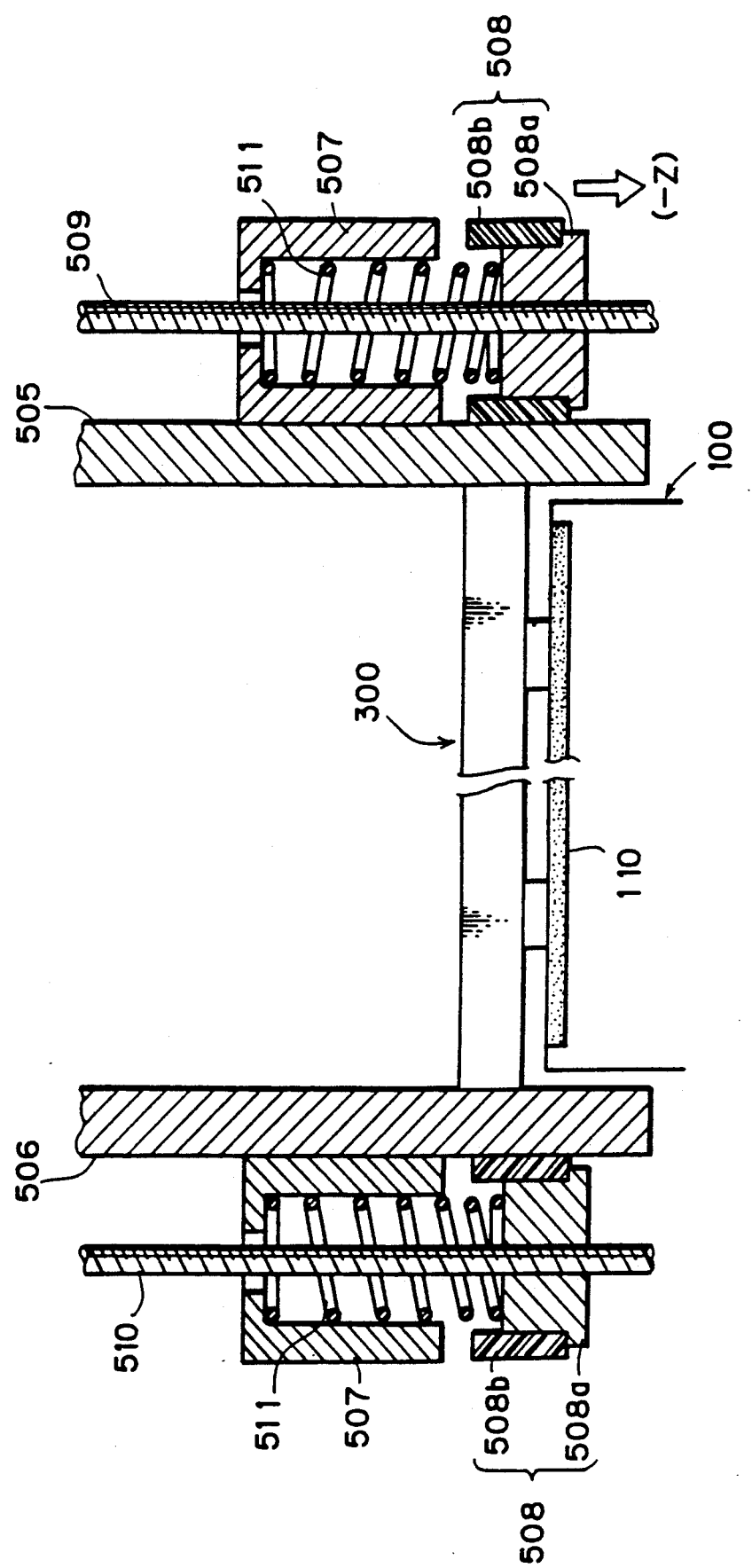

FIGS. 6A and 6B are fragmentary sectional views of the carrier driving mechanism 500. Referring to FIGS. 6A and 6B, the coupling member 507 is rendered hollow so as to receive the screw rod 509 therein. The nut 508 is formed by a casing 508b and a nut body 508a fixed to the casing 508b. The nut 508 is in contact with the wall of the elevation beam 505. Thus, the nut 508 is moved upward or downward along the screw rod 509 without rotation as the screw rod 509 rotates. However, the nut 508 is not fixed to the wall of the elevation beam 505. Further, the coupling member 507 is merely placed on the nut 508 which is not fixed to the coupling member 507. A spring 511 is provided in the internal space of the coupling member 507.

When the nut 508 is moved upward by rotation of the screw rod 509, the coupling member 507 is pressed up so that the elevation beam 505 is guided through the guide rods 501 and 503 to move up. When the nut 508 is moved downward by reverse rotation of the screw rod 509, on the contrary, the coupling member 507 and the elevation beam 505 is moved down. If external force preventing the downward movement of the elevation beam 505 acts during such downward movement, only the nut 508 is continuously moved downward while the coupling member 507 and the elevation beam 505 stop moving downward, as shown in FIG. 6B. A guide member 512 (FIG. 5) extending in the direction ($\pm Z$) is mounted on the wall of the elevation beam 505, in order to guide such downward movement of only the nut 508.

On the other elevation beam 506, a coupling member 507, a nut 508, a screw rod 510 and a spring 511 are provided, similarly to the elevation beam 505.

As in FIGS. 6A and 6B, the carrier 300 is supported by the elevation beams 505 and 506, so as to transfer one or a plurality of the films on the transparent plate 110 of FIG. 1B. That is, the carrier 300 is moved downward while holding the film, to thereby transfer the same on the transparent plate 110. If stoppage of rotation of the screw rods 509 and 510 is delayed, the carriage 300 collides with the transparent plate 110. Assuming that the nut 508 and the coupling member 507 are fixed with each other, the carrier 300 applys strong force to the transparent plate 110, to possibly break the transparent plate 110.

Accordingly to this embodiment, on the other hand, the coupling member 507 is merely placed on the nut 508. This allows the carrier 30 to stop moving downward even if the nuts 508 successively is moved downward. Consequently, it is possible to prevent the transparent plate 110 and the carrier 300 from breakage.

The carrier 300, the elevation beams 505 and 506, the coupling member 507 and the nut 508 are integrally moved down in the direction ($-Z$) in such a state that the coupling member 507 is placed on the nut 508, until the carrier 300 collides with the transparent plate 110. After colliding, the carrier 300, the elevation beams 505 and 506 and the coupling member 507 are integrally stopped by the transparent plate 110, while only the nut 508 is downwardly moved in the direction ($-Z$) by rotation of the screw rods 509 and 510 (FIG. 6B).

Thus, even if stoppage of rotation of the screws rods 509 and 510 is delayed, the carrier 300 stops moving downward as soon as colliding with the transparent plate 110. In addition to that, only the own weights of the carrier 300, the elevation beams 505 and 506 and the coupling member 507 are applied onto the transparent plate 110. Consequently, the transparent plate 110 and the carrier 300 are prevented from breakage. Since the elevation beams 505 and 506 are guided by the guide rods 501 to 504 and the guide member 512, no positional deviation thereof takes place.

Further, the carrier moving mechanism 500 includes balance mechanisms 520 in correspondence to the elevation beams 505 and 506. In the balance mechanism 520 for the elevation beam 505, the elevation beam 505 is coupled with a balancer 524 by a chain 522. The chain 522 is extended about sprockets 521 and 523 rotatably supported by the top surface of the housing 4. The balancer 524 is guided by a guide rail 525 so as to slide along the same. The balance mechanism 520 for the elevation beams 506 is similar to the balance mechanism 520 for the elevation beams 505 in structure. This allows the overall members, including the elevation beams 505 and 506, the carrier 300 coupled therewith and the like, to be considerably small effective weight as compared with the original weight thereof. Thus, elevation of the beams 505 and 506 can be performed with small force, while a shock caused by collision of the carrier 300 with the transparent plate 110 in FIG. 1B is extremely reduced. Furthermore, a load applied onto the transparent plate 110 after collision with the carrier 300 is also extremely reduced.

Consequently, it is possible to further effectively prevent the transparent plate 110 and the carrier 300 from breakage with an effect caused by placing the coupling member 507 on the nut 508.

Sprockets 531 and 532 are mounted on respective top portions of the screw rods 509 and 510. A coupled sprocket 533 and a driving sprocket 534 are supported for rotation by the top surface of the housing 4, while an endless toothed belt 535 extend along the sprockets 531 to 534. The driving sprocket 534 is coupled to a rotor shaft of the motor 530. Thus, the motor 530 is so rotated that the screw rods 509 and 510 are rotated in the same direction at the same angle: That is, the elevation of the elevation beam 505 is synchronized with that of the elevation beam 506.

(2) Horizontal Movement

In the right upper portion of FIG. 5, a roller 410 extends between the elevation beams 505 and 506. As hereinafter described, the roller 410 serves as a member of the film pocket mechanism 400 as well as a member for horizontal movement of the carrier 300. A motor 540 is mounted on an end portion of the elevation beam 505 so as to apply its driving force to the roller 410 through a toothed belt 541.

A sprocket 551 is secured on an end portion of the roller 410 on the side of the elevation beam 506. A toothed endless belt 552 extends along the sprockets 551 and 553, the sprocket 553 being mounted on the other end of the elevation beam 506. Further, a horizontal guide rail 560 is fixed to the elevation beam 506 in parallel with the endless belt 552.

The carrier 300 comprises an elongated horizontal beam 301 extending in the directions ($\pm X$), and a slider 302 which is fixed to an end portion of the horizontal beam 301. The slider 302 is slidable on the guide rail 560 in the directions ($\pm Y$), and an upper end thereof is fixed to the endless belt 552. A similar endless belt transmission mechanism (not shown) and a guide rail (not shown) are provided on an inner side wall of the other elevation beam 505, to drive a slider which is fixed to the other end portion of the carrier 300. Thus, the carrier 300 moves along the directions ($\pm Y$) upon driven by the motor 540.

(B-4) Carrier 300

FIG. 8A is a plan view of the carrier 300. The carrier 300 has twenty vacuum suction cups (negative pressure suction cups) 310 which are mounted on the lower surface of the elongated horizontal beam 301. Each of the suction cups 310 made of rubber is shaped in the form of a cup. Further, each of the cups 310 has a through hole for air suction in its central portion as well as a suction surface downwardly directed, as shown in FIG. 8B. The suction face of each suction cup 310 faces the downward direction, i.e., in the direction ($-Z$). The twenty suction cups 310 are arranged in two trains of ten cups, which are classified into a front group 311F of the ($+Y$) side and a rear group 311R of the ($-Y$) side.

The respective suction cups 310 of the group 311R are paired with that of the group 311F, whereby ten pairs of the suction cups 310 are provided on the carrier 300. The pairs are arranged corresponding to the five register pins 132 of FIG. 3 and the five register pins 203 of FIG. 4. More precisely, in the case that the film registered on the supply pallet 11 by the register pins 203 is hold by the suction cups 310 of the group 311F, the positional relation between the register pins 203 and the suction cups 310 is as follow: the two pairs of suction cups 310 are arranged on sides of each both of the register pins 203. Such positional relation also exists between the register pins 132 and the suction cups 310.

The horizontal beam 301 is coupled to the vacuum pump 31 of FIG. 2 through six flexible tubes 331 to 336. Further, the tubes 331 to 336 are connected to the respective ones of the suction cups 310 in accordance with a prescribed connecting relation.

FIG. 8C illustrates the connecting relation between the suction cups 310 and the flexible tubes 331 to 336. The tube 334 is commonly connected to central six suction cups, which are denoted by symbol "F1", belonging to the front group 311F. The tube 335 is commonly connected to two suction cups F2 which are provided on both sides thereof, and the tube 336 is commonly connected to outermost two suction cups F3. The flexible tubes 331 to 333 are also connected to the suction cups 310 belonging to the rear group 311R. That is, the tubes 331, 332 and 333 are commonly connected to suction cups R1, R2 and R3, respectively. It must be noted that these tubes 331 top 336 are coupled to vacuum pumps 311 independently of each other and can individually supply negative pressure to the same.

Thus, when air is sucked from only the tubes 334, 335 and 336, the suction cups F1, F2 and F3 belonging to the front group 331F are activated. On the other hand, all of the suction cups F1 to F3 and R1 to R3 are activated when air is sucked from all of the tubes 331 to 336. More particularly, the front group 311F is activated to thereby hold one film, while both group 311F and 311R are activated to thereby hold two films. If the film width is relatively narrow, only the central suction cups F1 and R1 may be activated. The side suction cups F2 and R2 are also activated in addition to the central suction cups F1 and R1 if the film width is relatively wide. As to films of larger width, all of the suction cups F1 to F3 and R1 to R3 may be activated. According to the embodiment, the suction cups 310 are arranged so as to be selectively activated. Thus, it is possible to perform optimum suction in response to the width and number of films to be sucked.

As in FIG. 8A, five air injection nozzles 320 are disposed along the edge of the horizontal beam 301 on the (+Y) side. The air injection nozzles 320 are commonly coupled to the compressor 7 of FIG. 1A through the tube 330.

Figure 9:
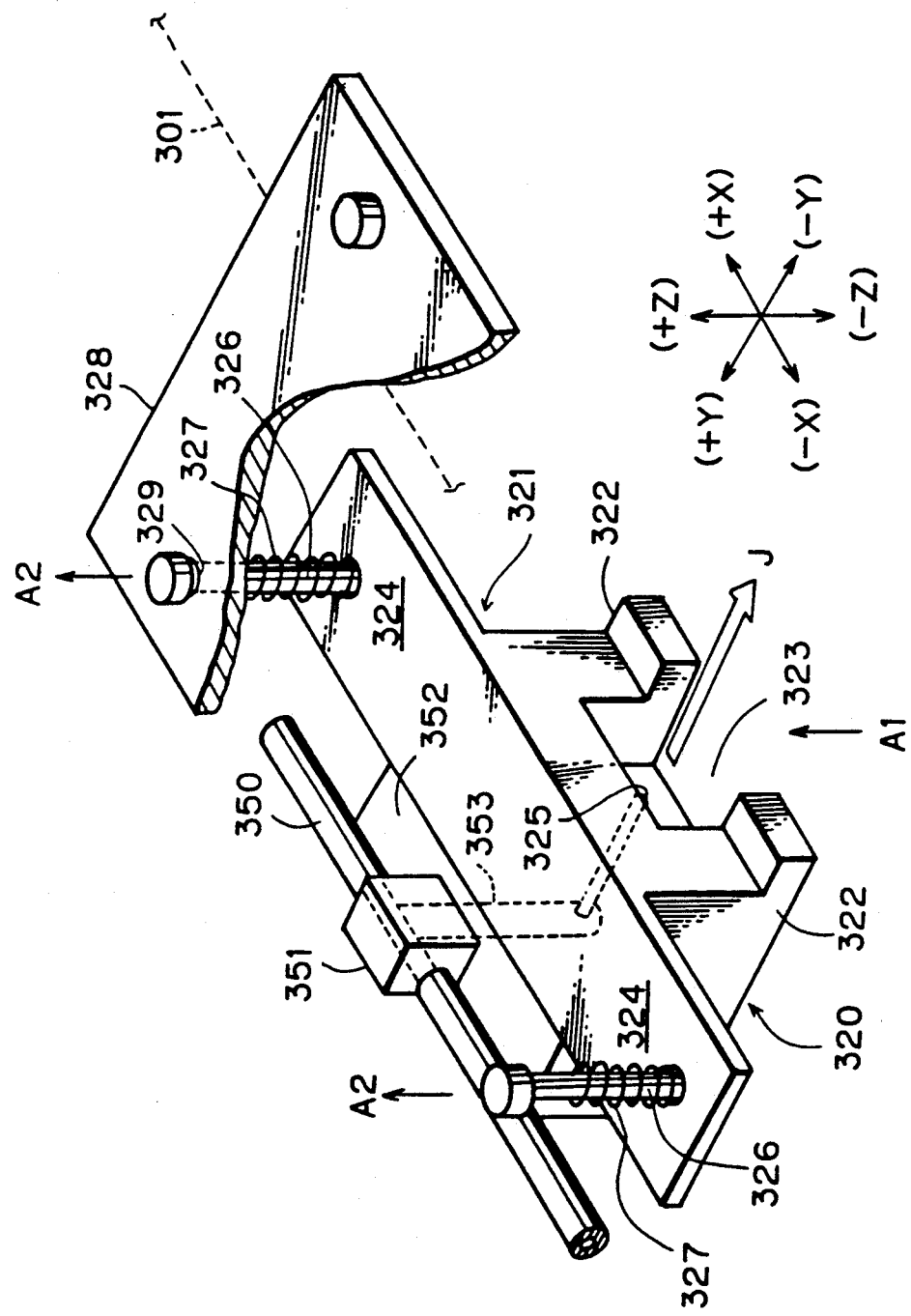
FIG. 9 is a perspective view of an air injection nozzle.

FIG. 9 is a perspective view of each nozzle 320, and FIG. 10A is a side elevational view of the carrier 300 holding a film. Referring to FIG. 9, a body 321 of each nozzle 320 is made of metal, and has a notch 323 on its lower half portion. A pair of legs 322 are provided on both sides of the notch 323, and an upper portion of the body 321 extends in the directions (±X) to define a plate-type wing 324. A pair of bolts 326 are uprightly provided on the wing 324, and springs 327 are provided around the bolts 326.

A pair of through holes 329 (only one of the same is shown in the figure) are formed in a plate 328 for coupling the horizontal beam 301 with the nozzle 320, in which the bolts 326 are slidably inserted. The head portions of the bolts 326 are engaged with the upper surface of the plate 328. Thus, when upward force indicated by an arrow A1 is applied to the nozzle bodies 321, the bolts 326 are moved up along arrows A2 against urging force of the springs 327, so that the overall nozzles 320 are moved up in response. In other words, the nozzles 320 are elastically coupled to the horizontal beam 301. Consequently, it is possible to relatively upwardly retract each nozzle 320 with respect to the position of each suction cup 310 of FIG. 10A. Furthermore, it is possible to press the films through the lower surface of the nozzle body 321.

As in FIG. 9, a metal block 352 is fixed to the back surface of the nozzle body 321. The metal block 352 has an air induction hole 353 serving as an air injection port 325. A tube 350 is coupled to the metal block 352 through a connector 351, so that high-pressure air through the tube 350 is supplied to the injection port 325 through the induction hole 353, and then is injected from the injection port 325 as an air jet J.

The injection port 325 faces toward the direction (−Y), and the principal axis of the air jet J passes through the vicinity of suction openings of the suction cups 310 (FIG. 10A). This allows the air jet J to eject substantially in parallel with the lower surface of the film being held by the suction cups 310.

FIG. 10A illustrates a state in which one film 50a is held by suction applied by the suction cups 310 of the front group 311F while fluttering in the air jet from the nozzle 320. In FIG. 10A, flow of the air is indicated by broken arrows, and the film 50a is suspended on a floor 52 (the transparent plate 110, for example) in a waving state.

In FIG. 10B, two films 50a and 50b are held by suction applied by the suction cups 310 of the front group 311F and the rear group 311R, respectively, while being suspended by an air jet from the nozzle 320. It is also possible to hold three or more films by arranging the suction cups 310 in at least three rows.

(B-5) Film Pocket Mechanism 400

Figure 11:
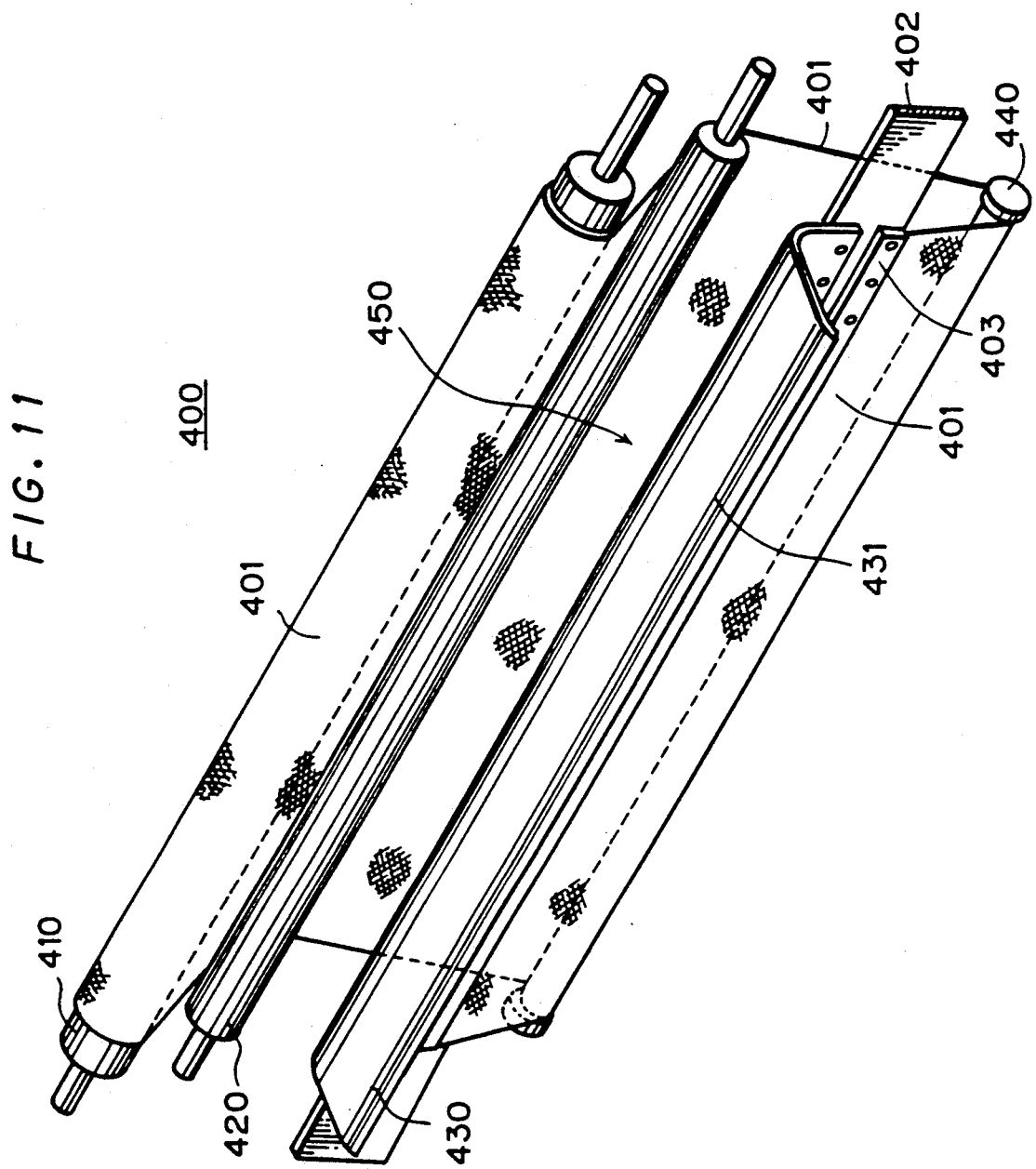
FIG. 11 is a perspective view of a film pocket mechanism.

FIG. 11 is a perspective view of the film pocket mechanism 400. The film pocket mechanism 400 comprises a light shielding sheet 401 of vinyl which is wound on a roller 410. A portion of the sheet 401 is delivered from the roller 410, and its end is secured to a plate 402 by fittings 403. The plate 402 is integrated with the coupling plate 403 of FIG. 5, and is secured to the elevation beams 505 and 506. The delivered portion of the sheet 401 is expanded by a guide roller 420 and a balancing roller 440, to thereby form a V-shaped pocket space 450. Since the other end of the sheet 401 wound on the roller 410 is fixed to the surface of the roller 410, the sheet 401 will not fall from the roller 410 even if the overall sheet 401 is delivered from the roller 410.

On the other hand, a bent metal guide plate 430 is fixed to the plate 402 so as to guide the film carried in the directions (±Y). A leading edge portion 431 of the guide plate 430 is downwardly bent. As mounted on the elevation beams 505 and 506 (FIG. 5), the film pocket mechanism 400 vertically moves following vertical movement of the elevation beams 505 and 506.

Figure 12A:
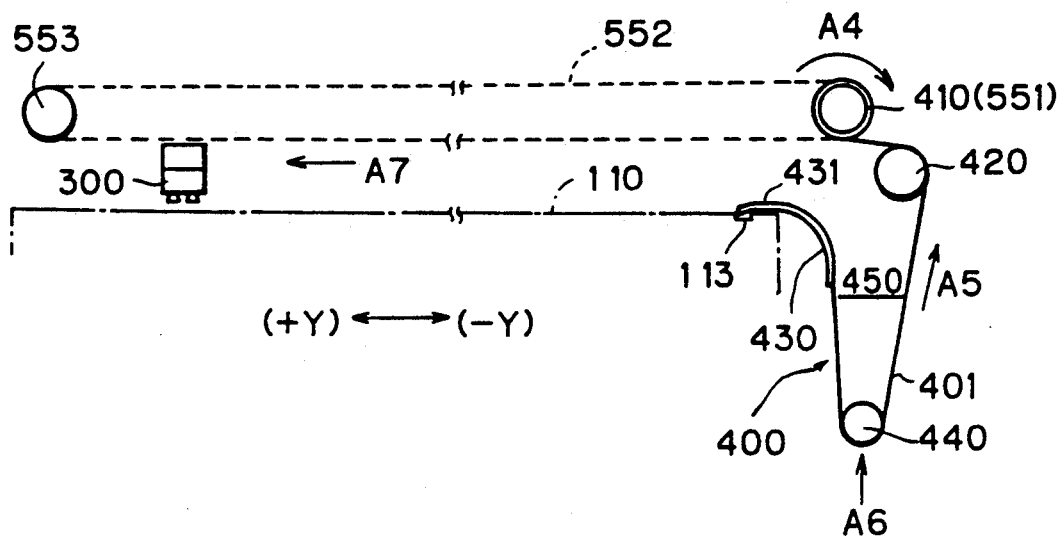
FIGS. 12A and 12B are explanatory diagrams for functions of the film pocket mechanism.
Figure 12B:
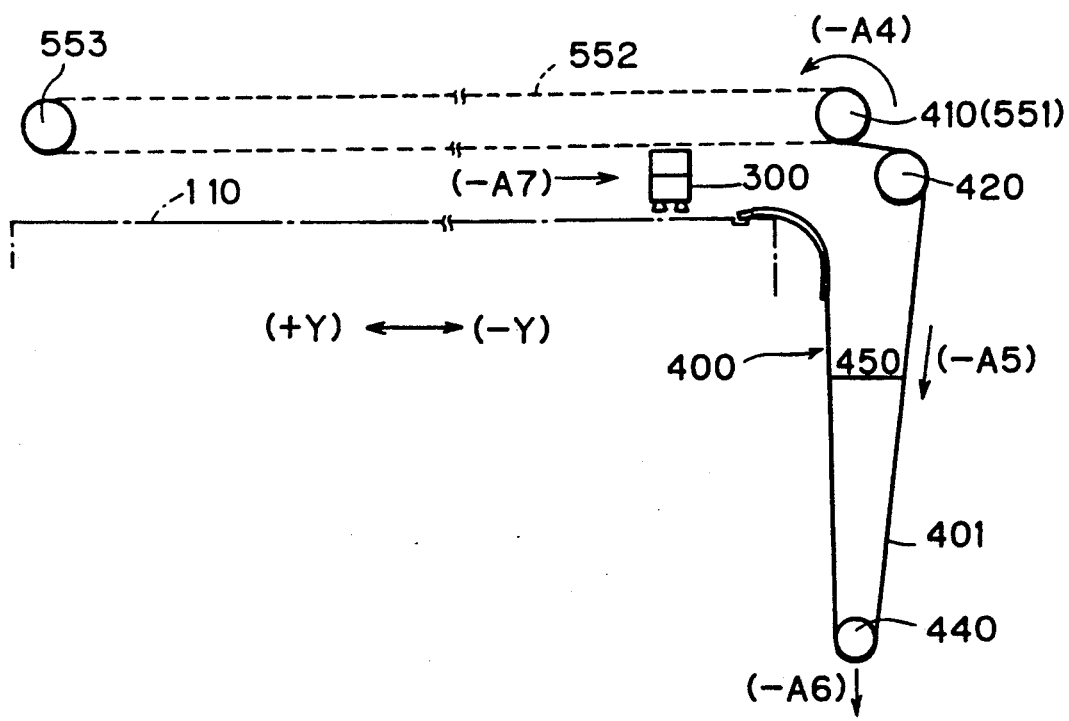

FIGS. 12A and 12B illustrate the operation of the film pocket mechanism 400 and the carrier 300. Upon being driven by the motor 540 of FIG. 5, the roller 410 and the sprocket 551 of FIG. 12A are rotated. If the rotation is made along a direction A4 of FIG. 12A, the carrier 300 is moved in a direction A7, i.e., the direction (+Y) according to the rotation of the endless belt 552. Further, the sheet 401 is wound up in a direction A5 while the balancing roller 440 is moved up in a direction A6 as the roller 410 rotates. Thus, the depth of the pocket space 450 is reduced in parallel with the movement of the carrier 300 in the direction (+Y).

When the motor 540 reversely rotates, on the contrary, the roller 410 and the sprocket 551 rotate in a direction (−A4), as shown in FIG. 12B. Accordingly, the carrier 300 is moved in a direction (−A7), i.e., in the direction (−Y). At the same time, the sheet 401 is delivered in a direction (−A5) while the balancing roller 440 is downwardly moved in a direction (−A6). Thus, the depth of the pocket space 450 is increased.

According to the embodiment, the horizontal movement of the carrier 300 is interlocked with the change in depth of the pocket space 450.

C. Film Carrying Operation

(1) Operation for Carrying One Film

Figure 13A:
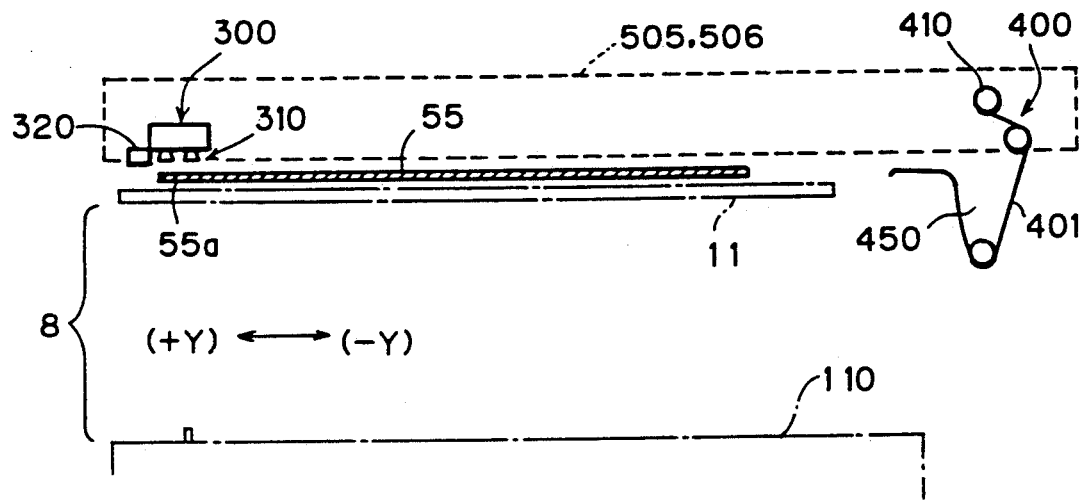
FIGS. 13A to 13H are typical diagrams showing the operation for carrying a film from the supply pallet to the glass plate, respectively.

FIGS. 13A to 13H are typical diagrams illustrating operation for carrying a film 55 from the pallet 11 to the transparent plate 110 through the carrier 300. Referring to FIG. 13A, the carrier 300 is located above a (+Y)-side end portion of the film 55. Although the film 55 is separated from the upper surface of the pallet 11 in FIG. 13A for convenience of illustration, the same is in contact with the upper surface of the pallet 11 in practice while being registered by the register pins 203. Further, the sheet 401 is almost wound on the roller 410. This causes the pocket 450 to be shallow.

Figure 13B:
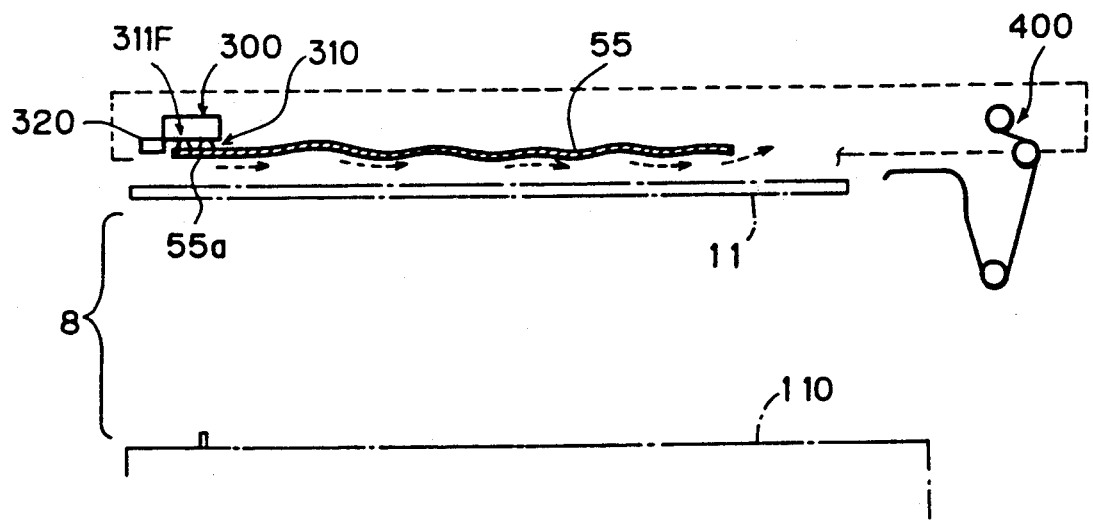

Then the carrier 300 is downwardly moved to a position immediately above one end portion 55a of the film 55, to suck air through the suction cups 310 belonging to the front group 311F. Thus, the end portion 55a of the film 55 is held by the carrier 300. Furthermore, the nozzle 320 ejects an air jet in a direction substantially parallel to the direction (−Y), to cause flow of air indicated by the broken arrow. Consequently, the film 55 is held while being suspended, as shown in FIG. 13B.

Figure 13C:
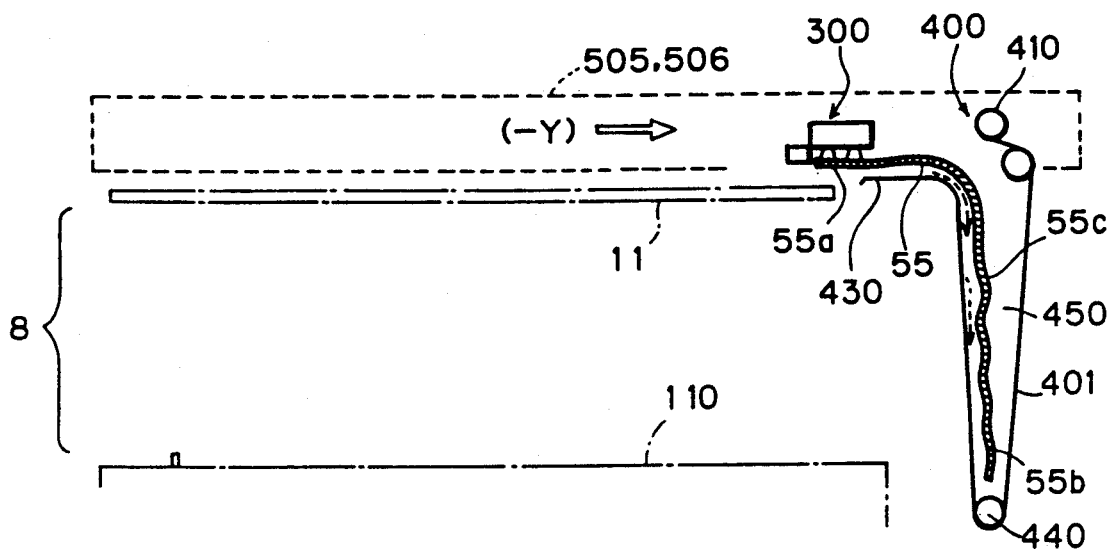

Thereafter the carrier 300 is moved in the direction (−Y) as in FIG. 13C. In synchronization with this, the sheet 401 is delivered from the roller 410, whereby the depth of the pocket space 450 increases according to the movement of the carrier 300. Thus, the other end 55b of the film 55 is first guided by the sheet 401 and the guide plate 430 to hang down into the pocket space 450 along the flow of air, and then the central portion 55c of the film 55 is successively stored in the pocket space 450.

Figure 13D:
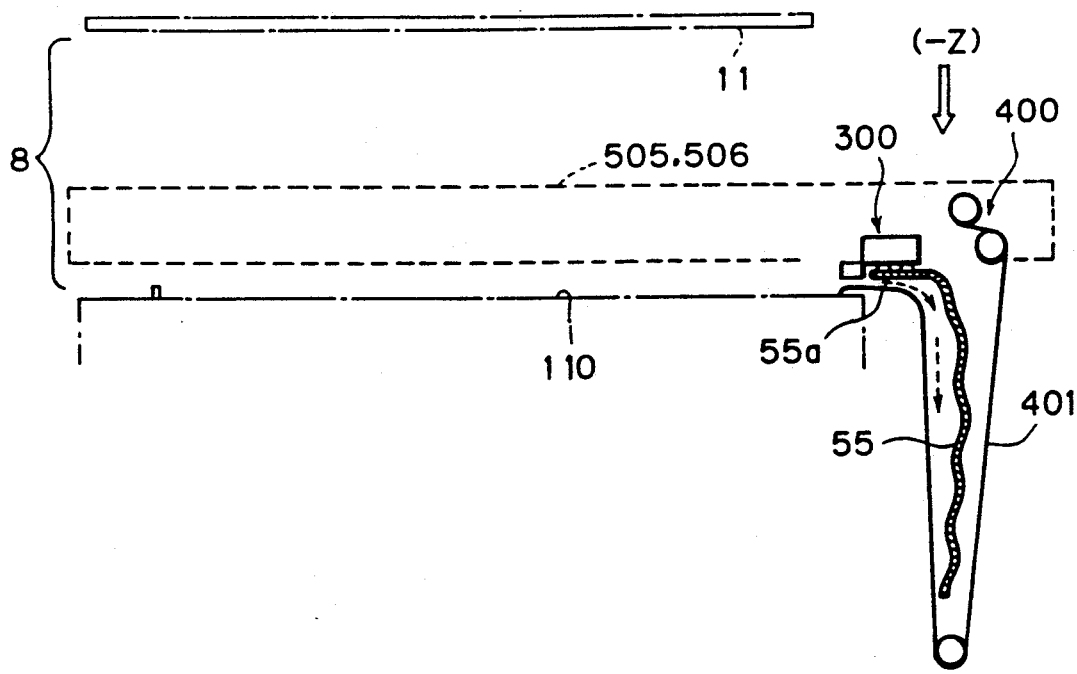

When the end portion 55a of the film 55 is held by the carrier 300 while other portions are stored in the pocket space 450, the elevation beams 505 and 506 are downwardly moved in the direction (−Z) (FIG. 13D). This causes the carrier 300 and the film pocket mechanism 400 to be downwardly moved.

Figure 13E:
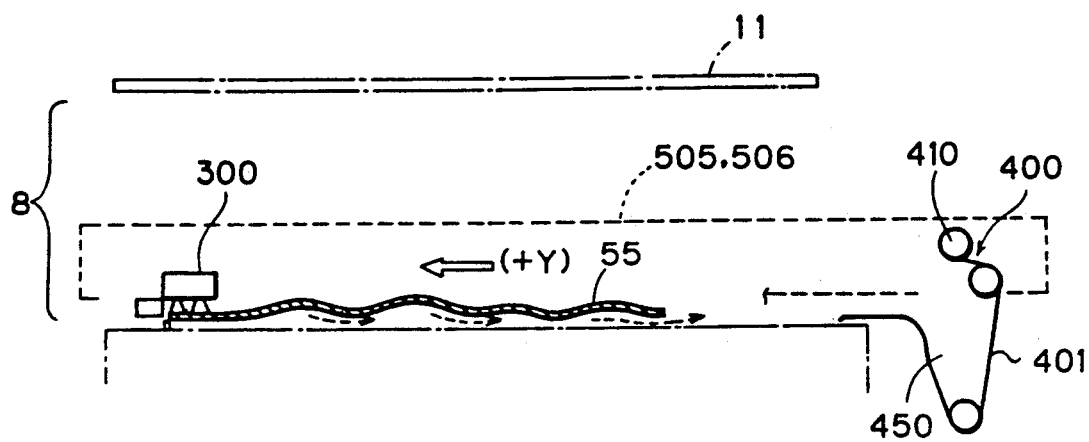
Figure 13F:
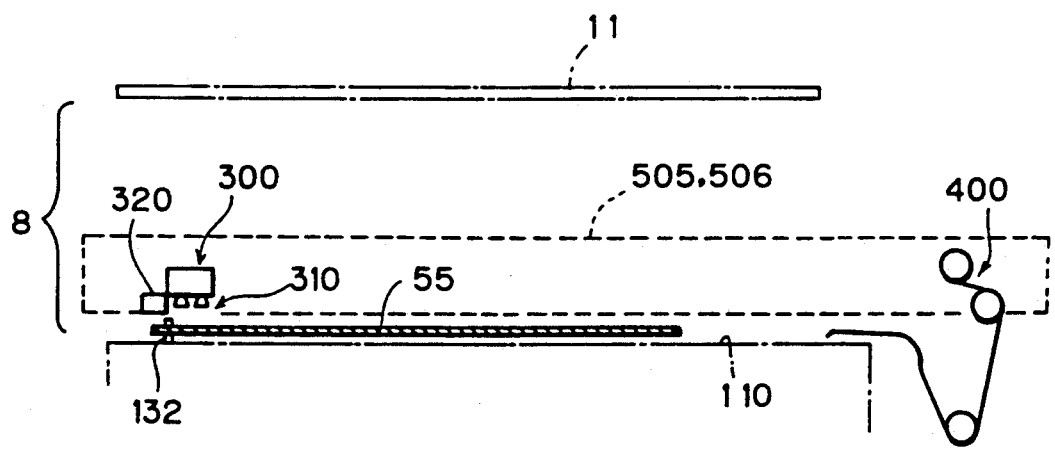

The carrier 300 is downwardly moved to a position close to the transparent plate 110. In response to this, the carrier 300 is further moved in the direction (+Y) while holding the end portion 55a of the film 55 (FIG. 13E). Thus, the overall film 55 is extracted from the pocket space 450, while the depth of the pocket space 450 is reduced. The horizontal movement of the carrier 300 is carried out until the register holes (not shown) provided in the film 55 are located above the register pins 132. Thereafter the carrier 300 is downwardly moved to a position immediately above the transparent plate 110, and then the injection of the air jet and the vacuum suction is stopped. This allows the film 55 to set on the transparent plate 110 with engagement of the register holes 51 with the register pins 132.

Figure 13G:
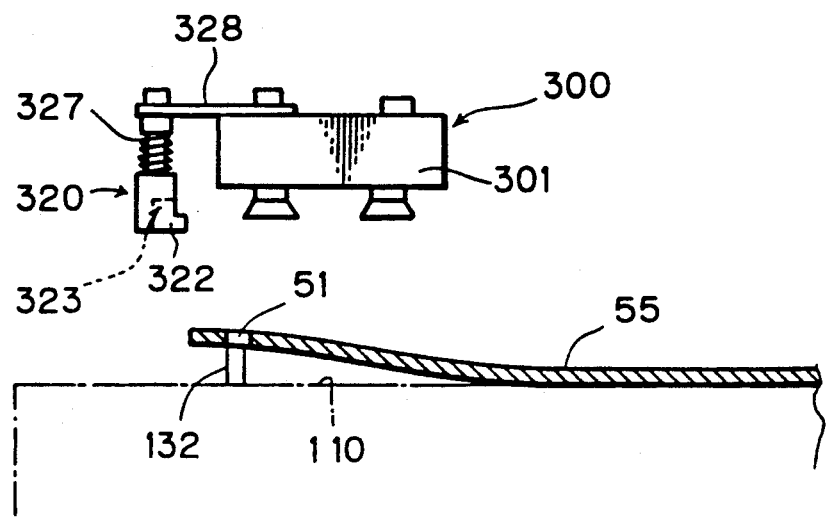

At this time, the following problem may often occur: the register hole 51 of the film 55 may not be completely engaged with the register pin 132, as shown in FIG. 13G. In the embodiment, the operation of the following film pressing are explained in light of this problem.

Figure 13H:
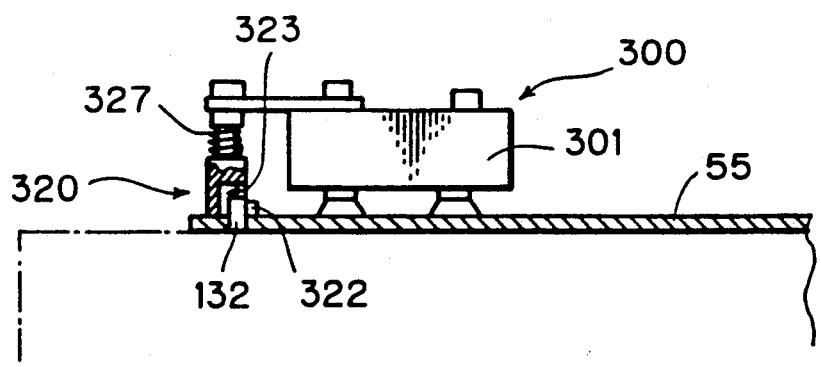

The carrier 300 is further moved in the direction (−Y) until the notch 323 of the nozzle 320 is located at a position immediately above the register pin 132. Thereafter the carrier 300 is gradually moved down by a prescribed amount, to press the film 55 by the legs 322 of the nozzle 320. Thus, even if the register hole 51 of the film 55 slightly deviates from the register pin 132 as shown in FIG. 13G, the register hole 51 of the film 55 is engaged with the register pin 132 by force of a spring 327 which urges the nozzle 320 in the direction (−Z) (FIG. 13H). Thus, carriage of the film 55 from the pallet 11 to the transparent plate 110 is completed, and the carrier 300 to retracted to its original position, i.e., to the position close to the film pocket mechanism 400.

(2) Operation for Carrying Two Films

Figure 13I:
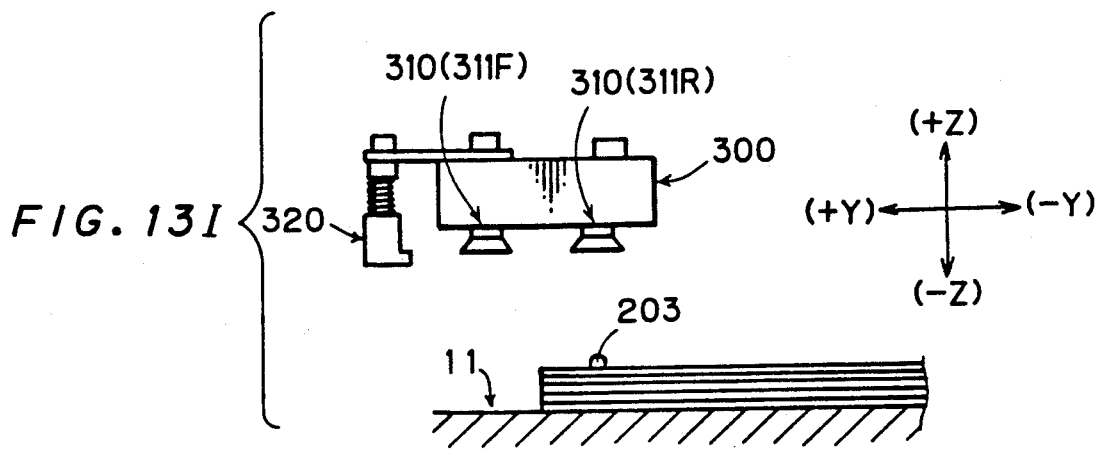
FIGS. 13I to 13N are typical diagrams showing the operation for carrying two films from the supply pallet to the glass plate, respectively.
Figure 13J:
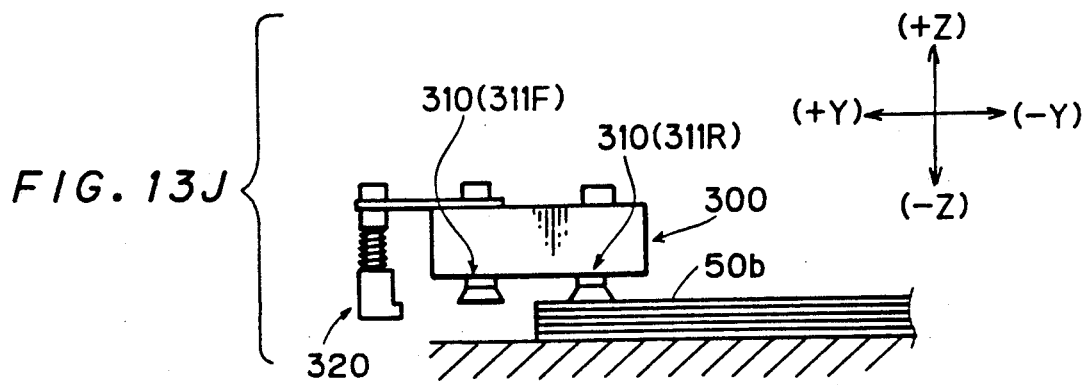

FIGS. 13I to 13N illustrate the operation for simultaneously carrying two films by the carrier 300. It is noted that the thickness of respective films stored in the supply pallet 11 and the length of the register pin 203 are drawn in an exaggerated manner for the convenience of illustration. The operation for simultaneously carrying two films from the supply pallet 11 onto the transparent plate 110 is carried out as follows:

First, the carrier 300 is moved in the direction (+Y) above the supply pallet 11, and the horizontal movement of the carrier 300 is stopped when the suction cups 310 belonging to the rear group 311R reach a position immediately above the register pins 203, as shown in FIG. 13I. Then the carrier 300 is moved down in the direction (−Z), to bring the rear group 311R into close contact with an end portion of a film 50b being at the top position (FIG. 13J). The vacuum pump 31 is turned on, whereby the end portion of the film 50b is sucked by the suction cups 310 of the rear group 311R. At this time, no negative pressure is supplied to the front group 311F.

Figure 13K:
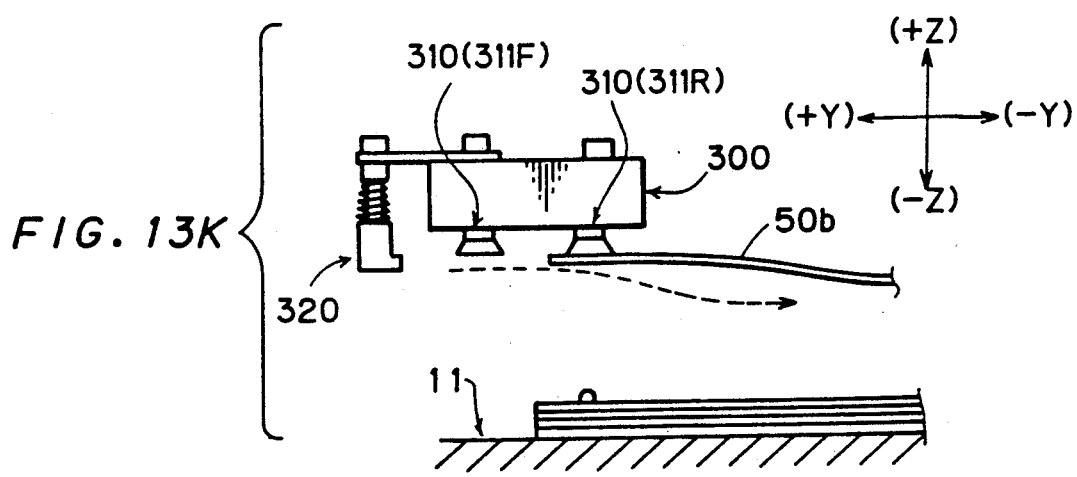

The carrier 300 is moved in the direction (+Z) by several millimeters while holding the film 50b by suction. Thereafter the carrier 300 temporarily stops there, whereby another film naturally drops on the supply pallet 11 even if the carrier 300 picks up the another one together with the film 50b. The air nozzle 320 ejects an air jet. This causes the film 50b to float. Thereafter the carrier 300 is further moved up (FIG. 13K). In movement of the carrier 300, the film 50b is moved up while the end portion thereof being held by the suction cups 310, the portions being close to both sides of each register hole (not shown). Hence, no damage is caused in the register holes provided in the film 50b.

Figure 13L:
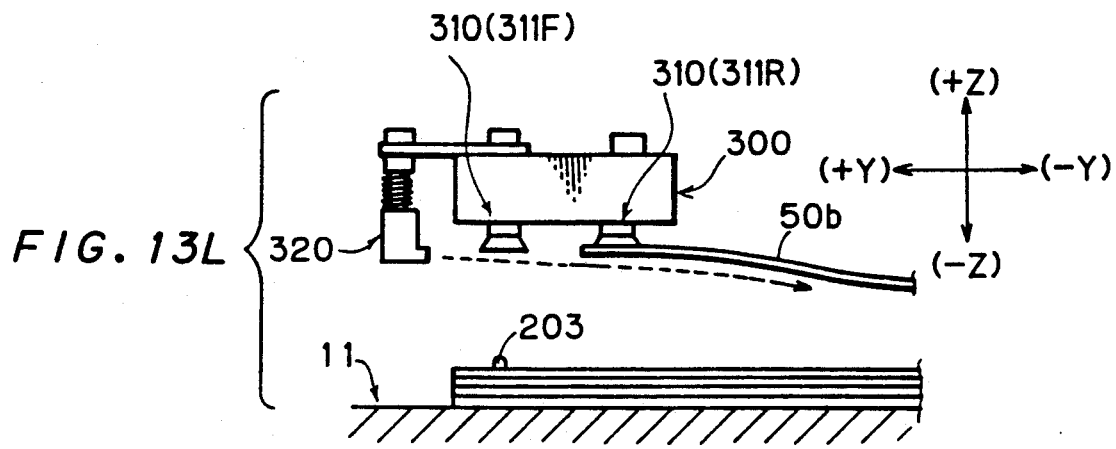
Figure 13M:
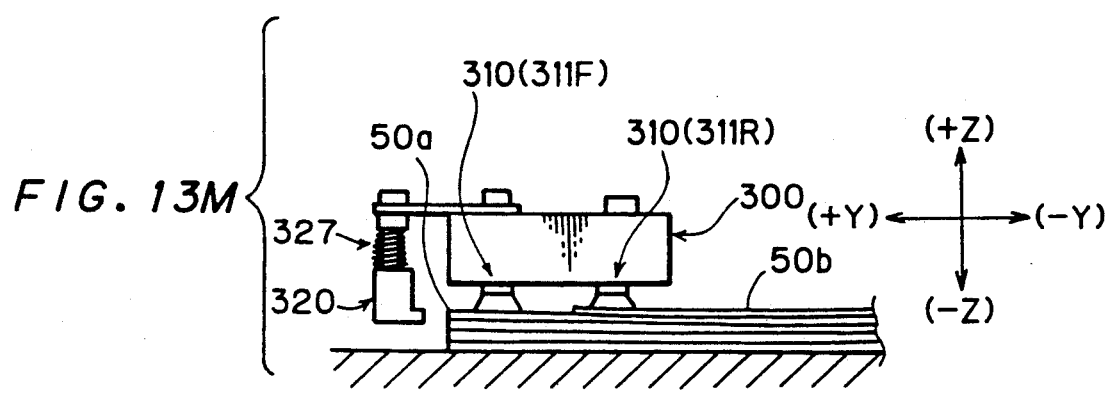
Figure 13N:
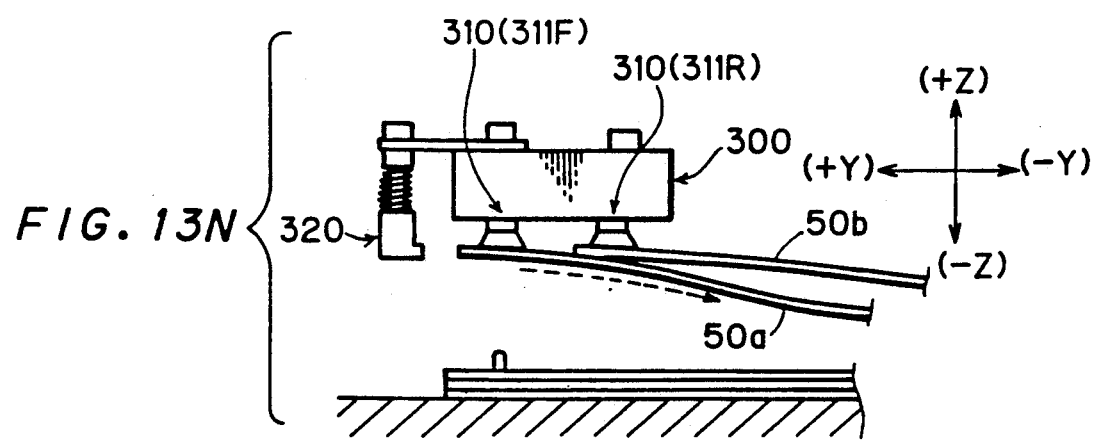

As in FIG. 13L, the carrier 300 is moved in the direction (−Y) by several centimeters, i.e., by the distance between the suction cup 310 belonging to the front group 311F and the suction cup 310 belonging to the rear group 311F while holding the film 50b. Then the carrier 300 is stopped moving at a point of time when the suction cups 310 belonging to the front group 311F reach a position immediately above the pins 203. Injection of the air jet from the air nozzle 320 is temporarily stopped at this point of time. Then, the carrier 300 is moved down until the front group 311F comes into contact with an end portion of a second film 50a as in FIG. 13M. In response to this, a negative pressure from the vacuum pump 31 is supplied to the front group 311F through the supply path. Thus, the film 50a is sucked by the front group 311F.

Thereafter the carrier 300 is moved up by several millimeters, and then is temporarily stopped. The ejection of the air jet is restarted and the carrier 300 is further moved up, as in FIG. 13N. The state shown in FIG. 13N corresponds to the aforementioned state of FIG. 10B. The carrier 300 is moved to the transparent plate 110 while suspendingly holding the two films 50a and 50b. This carriage path has already been described.

The operation for placing the films 50a and 50b on the transparent plate 110 is substantially inverse of the carrying operation. More precisely, the film 50a is placed on the transparent plate 110 with the register holes thereof being engaged with the register pins 132. Following this the film 50b is placed on the film 50a similarly to the above. In detaching the film 50a from the carrier 300, negative pressure supply to the front group 311F is stopped and then air from the air compressor 7 is supplied to the front group 311F for only an extremely short period. Consequently, the film 50a is reliably detached from the suction cup 310. Also when the other film 50b is detached, similar operation is performed as to the suction cups 310 belonging to the rear group 311R. This also applies to the case of placing the film on the discharge pallet 12 or the temporary storage pallets 13 to 18.

While the above operation is adapted to carry the film from the supply pallet 11 to the transparent plate 110, it also applies to carriage from the temporary storage pallets 13 to 18 to the transparent plate 110. However, when the film is taken up from the temporary storage pallets by the carrier 300, vacuum suction of the film by the E-shaped grooves 222 (FIG. 4) is cancelled. As to the carriage of the film from the transparent plate 110 to the temporary storage pallets 13 to 18 or the discharge pallet 12, the carrying process shown in FIGS. 13A to 13H is reversely carried out. In the temporary storage pallets 13 to 18, however, vacuum suction by the E-shaped grooves 222 is started when films are placed thereon.

D. Electrical Structure

Figure 14:
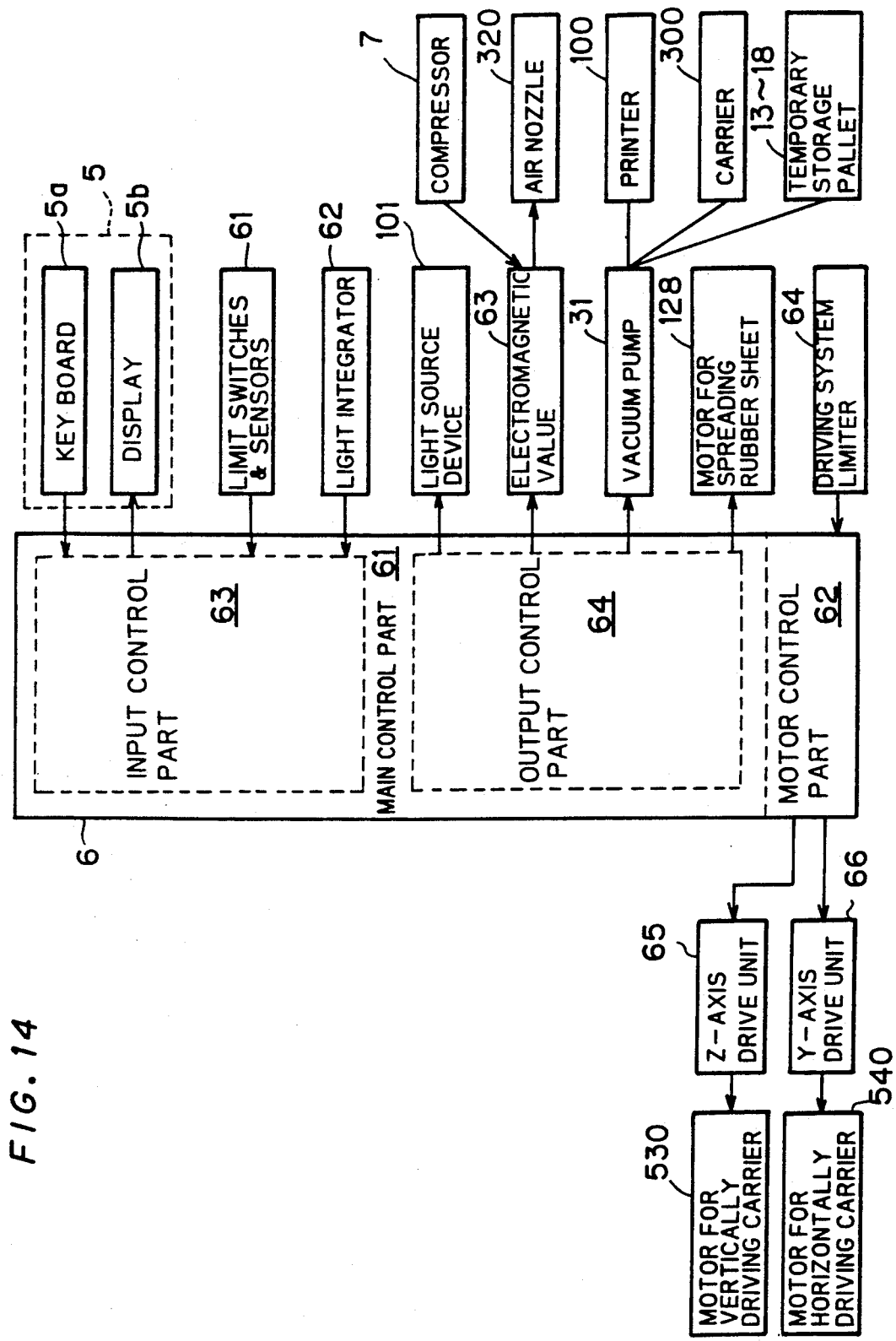
FIG. 14 is a block diagram of a control system for the printing apparatus.

FIG. 14 is a block diagram of the control system for the printing apparatus 1. A control unit 6 comprises a main control part 61 and a motor control part 62. The main control part 61 includes an input control part 63 and an output control part 64. The following elements are connected to the input control part 63:

(1) Console Panel 5

The console panel 5 has a key board 5a and a liquid crystal display 5b, and information for specifying the printing procedure is inputted through this console panel 5.

(2) Limit Switches and Sensors 61

In order to perform film carriage control etc., limit switches and sensors (not shown) are arranged in respective parts of the printing apparatus 1. Detection output signals therefrom are also supplied to the input control part 63.

(3) Light Integrator 62

The integrated quantity of light applied to the film in printing is measured by a light integrator 62 which is provided in the printer part 100. When the integrated quantity of light reaches a prescribed value, the light source device 101 is turned off.

On the other hand, the following elements are connected to the output control part 64:

(1) Light Source Device 101

(2) Electromagnetic Valve 63

The electromagnetic valve 63 is inserted in an air supply path from the compressor 7 to the air nozzle 320, to control supply of high-pressure air to the air nozzle 320.

(3) Vacuum Pump 31

The vacuum pump 31 is coupled to the printer 100, the carrier 300 and the temporary storage pallets 13 to 18, in order to apply suction to the films. Thus, supply of negative pressure to respective parts can be controlled by switching an electromagnetic valve provided in the vacuum pump 31. When the vacuum pump 31 is formed as a set of unit pumps alloted to the aforementioned respective parts, these unit pumps may be independently controlled.

(4) Rubber Sheet Spreading Motor 128.

Further, the following elements are connected to the motor control part 62:

(1) Driving System Limiter 64

A limiter for regulating the amount of driving is provided in each part of a motor driving system of the printing apparatus 1. The output of this limiter is supplied to the motor control part 62.

(2) Carrier Driving Motors 530 and 540

The output of the motor control part 62 is supplied to a Z-axis drive unit 65, and a motor 530 for vertically driving the carrier is driven by this unit 65. The motor 540 for horizontally driving the carrier is controlled through a Y-axis drive unit 66.

E. Printing Procedure (E-1) Preparation of Film Group

Figure 15:
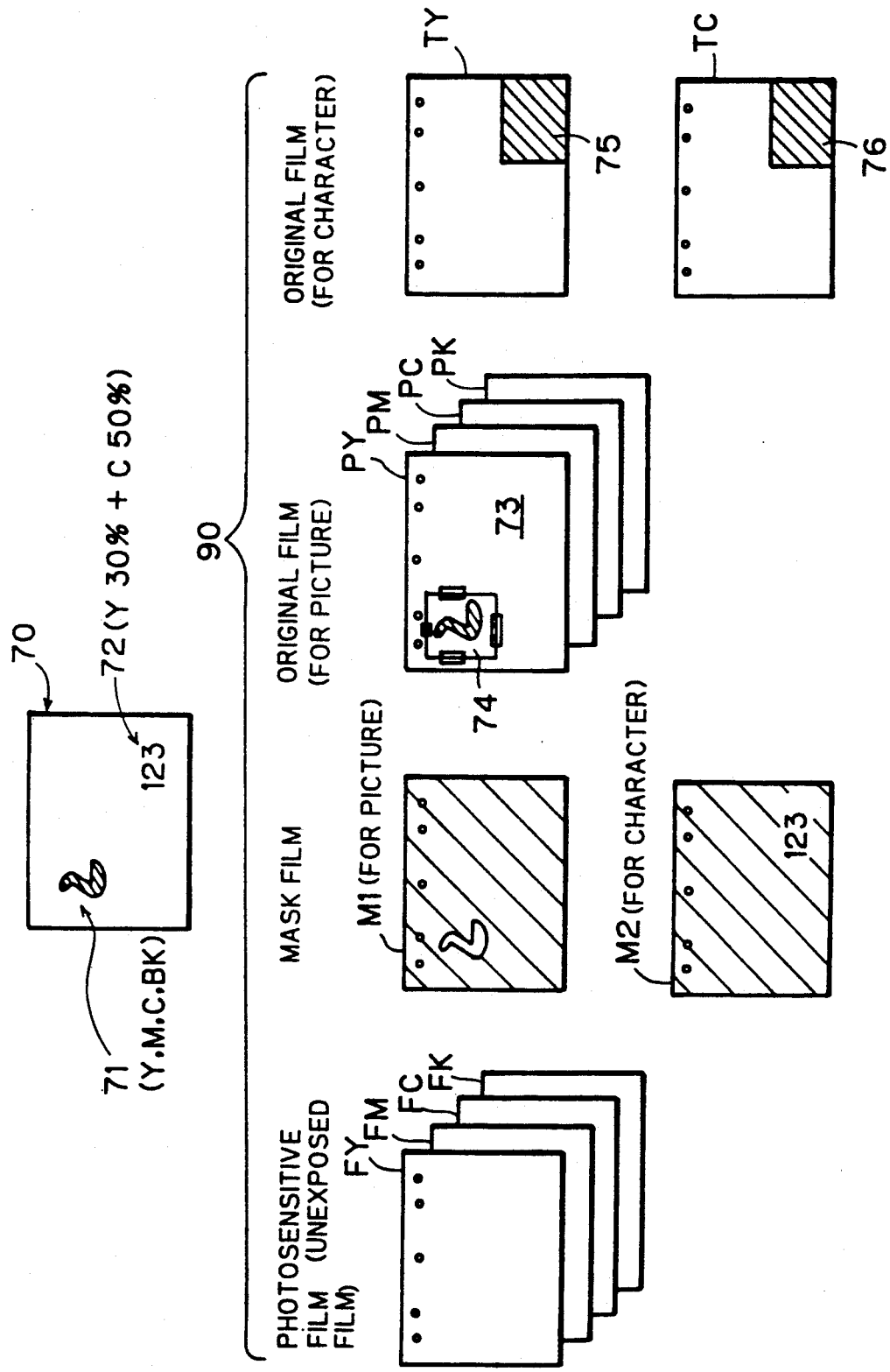
FIG. 15 illustrates an exemplary film group, which includes a plurality of films required for producing a printed matter.

FIG. 15 illustrates an exemplary film group 90, which includes a plurality of films required for producing a printed matter 70. The printed matter 70 includes a picture 71 having four color components Y, yellow M, magenta C cyan and BK, black and characters (numerals) 72 formed by combination of flat tints of Y30% and C50%, for example. It must be noted that the printed matter 70 is produced in a manner as follow: four color plates for the color components Y, M, C and BK are produced by printing described below, and then an image provided on the color plates is reproduced on a printing paper by successive printing on the same paper.

In the embodiment, the number of required films is 12 in total: that is, the film group 90 of FIG. 15 comprises:

(a) four photosensitive films FY, FM, FC and FK which are for the color components Y, M, C and BK, respectively;

(b) a picture mask M1 commonly used for the four color components Y, M, C and BK;

(c) a character mask M2 commonly used for two color components Y and C;

(d) four original films PY, PM, PC and PK which are for the color components Y, M, C and BK, respectively, each of the original films PY, PM, PC and PK being formed by a plain sheet 73 and a halftone negative original 74 which is adhered to the plain sheet 73 by tapes; and (e) two original films TY and TC which are for the color components Y and C, respectively, the original films TY having a flat tint 75 of 30%, the original film TC having a flat tint 76 of 50%.

(E-2) Sequence of Printing

Figure 16:
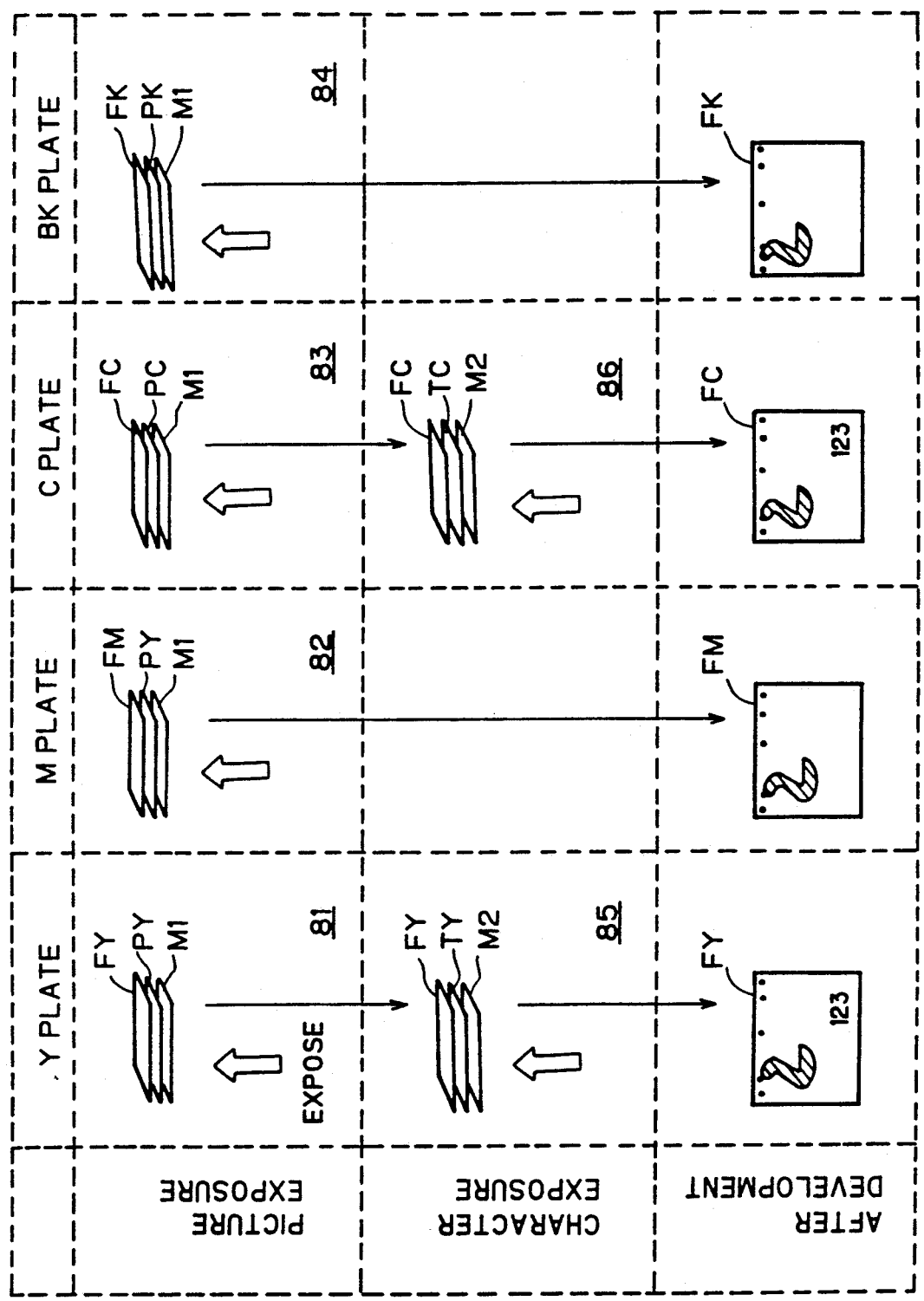
FIG. 16 illustrates the sequence of printing for producing four color plates.

FIG. 16 typically illustrates the sequence of printing for producing four color plates. The color plates are for the color components, Y, M, C and BK, respectively. The terms "Y-plate", "M-plate", "C-plate" and "BK-plate" refer to the color plates for the color components Y, M, C and BK, respectively.

Noting the Y-plate, the original film PY and the photosensitive film FY are overlapped on the picture mask M1. Thereafter the light indicated by a voided arrow is directed onto the photosensitive film FY through the mask M1 and the Y-color original film PY, so that the Y-color component of the picture onto the photosensitive film FY, in a process 81. In a next process 85, the character mask M2 and the Y-color flat tint original film TY are employed for printing the characters onto the photosensitive film FY on which the Y-color component of the picture is printed. Thereafter the photosensitive film FY is developed, thereby obtaining a Y-plate. The operation (process 83 and 86) similar to the above is applied to the photosensitive film FC in order to produce a C-plate.

On the other hand, only printing of the picture is performed in printing for M and BK plates. The mask M1 is commonly used for the Y-plate, the M-plate, the C-plate and the BK-plate.

Figure 17A:
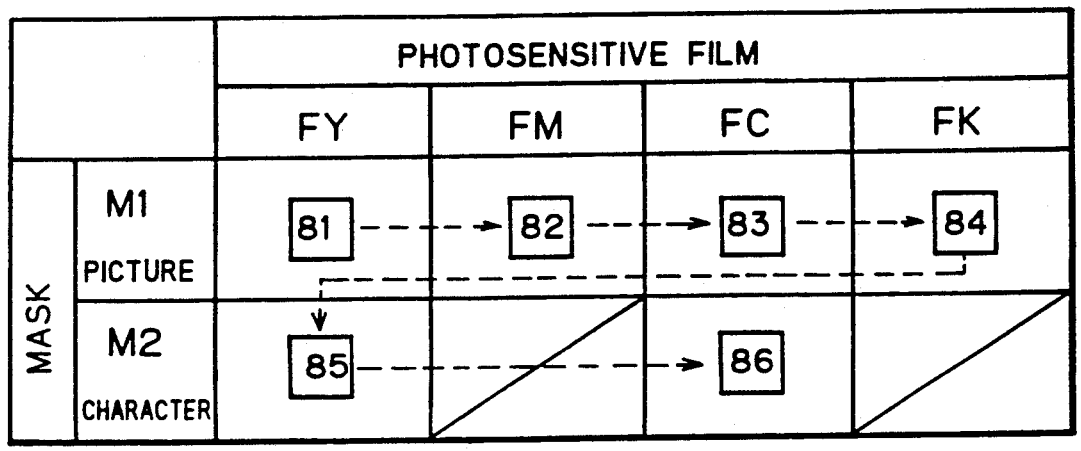
FIGS. 17A and 17B illustrate the printing procedure, respectively.

FIG. 17A illustrates the printing procedure in the printing apparatus 1. Reference numerals 81 to 86 in the rectangles of FIG. 17A correspond to the process numbers indicated in FIG. 16. The printing procedure is performed along the sequence indicated by broken arrows in FIG. 17A, and this sequence is "mask preference" sequence. That is, the process 81 to 84 using the picture mask M1 are continuously executed, and thereafter the process 85 and 86 using the character mask M2 are continuously executed. The reason for this is as follows:

As described with reference to FIG. 3, the mask film, the original film and the photosensitive film are placed on the transparent plate 110 in this order. Thus, the mask film is arranged in the bottom position. When the processes using the common mask are continuously executed, thus, it is possible to execute a plurality of printing processes without removing the mask film from the transparent plate 110. If the number of times of film removable from the transparent plate 110 is reduced, the number of times of film carriage between the pallet group 10 and the transparent plate 110 is also reduced. Accordingly, it is possible to reduce the time required for completion of the printing procedure.

Figure 17B:
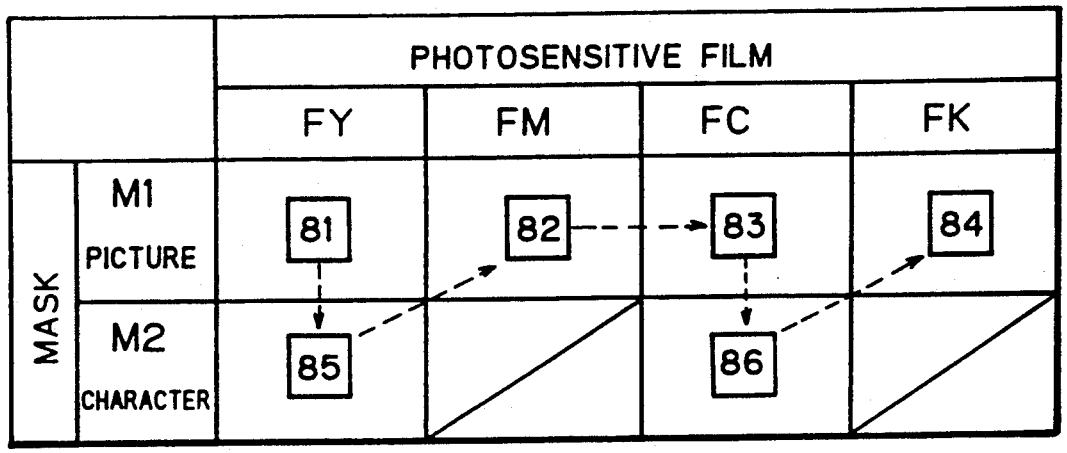

As in FIG. 1A, the space 8 between the transparent plate 110 and the pallet group 10 opens to the front side of the body 2, similarly to the window 3. In this apparatus 1, thus, the printing process can also be manually performed by introducing the films into the space 8 by manual operation. At this time, the printing procedure is carried out in "photosensitive film preference" sequence, as shown in FIG. 17B. It is related to the fact that, even if the photosensitive films FY to FK are exposed, the exposed images cannot be visually seen before development. If the printing process is performed in the mask preference sequence, a printing error is easily caused since it is impossible to confirm to what stage printing has been completed as to each of the photosensitive films FY to FK. Thus, the operation is shifted to printing of a next photosensitive film when printing of one photosensitive film is entirely completed.

In such "photosensitive film preference" sequence, however, the photosensitive films must be once removed from the transparent plate 110 every time single printing is completed, although printing is continuously performed on the same photosensitive films. This is because the mask film is in the bottom position and hence the photosensitive and the original films must be removed in order to exchange the mask. That is, the "photosensitive film preference" sequence is generally employed in multiple printing by manual operation in order to prevent a printing error, although the number of times of film exchange is large. In the printing apparatus 1 of this embodiment, on the other hand, the film exchange sequence is automated and the operator will not forget whether or not printing is completed. Consequently, it is possible to employ the "mask preference" sequence with a small number of exchange times.

(E-3) Order of Placement of Films

Figure 18:
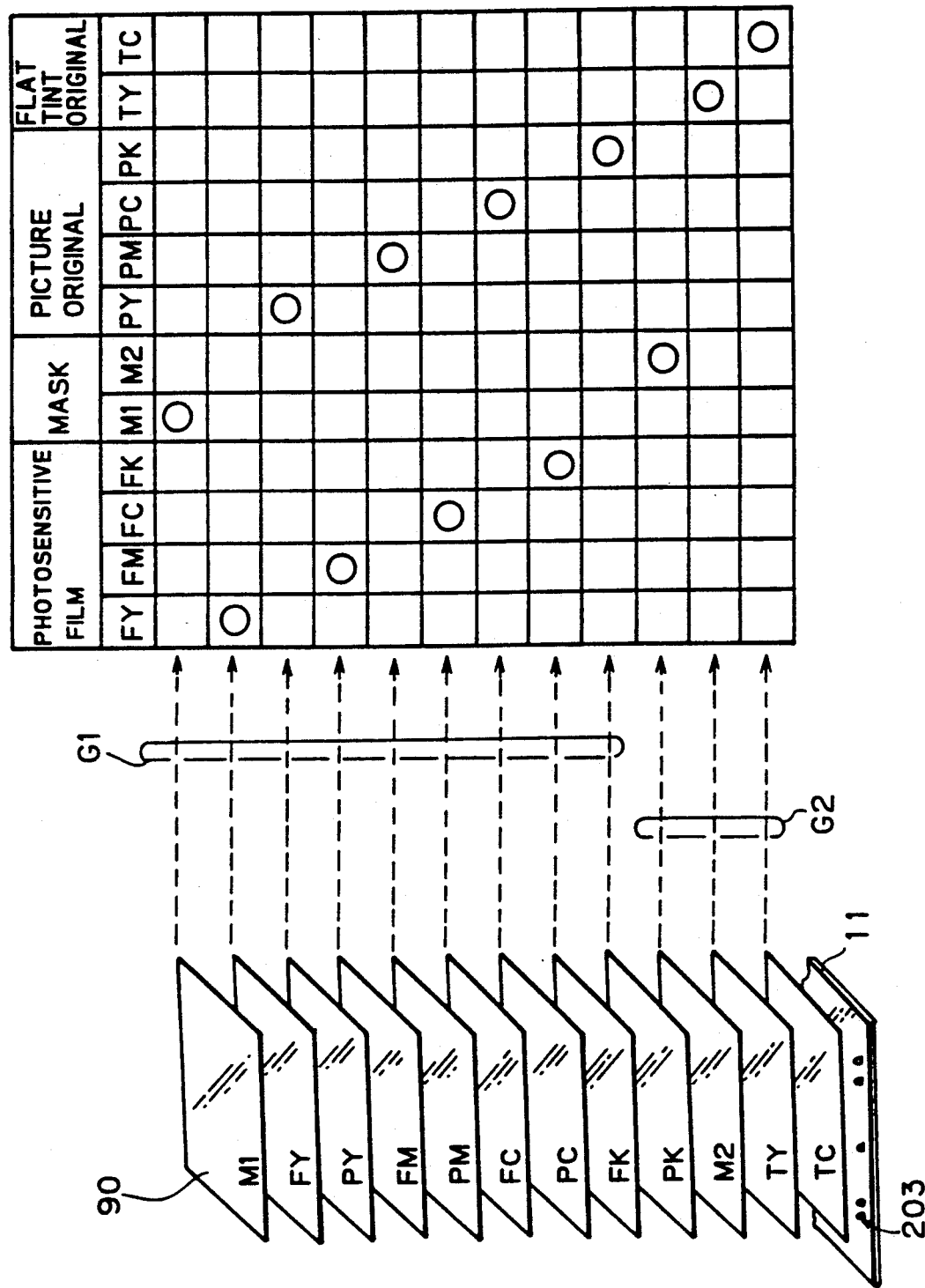
FIG. 18 illustrates order of placing the film group on the supply pallet.

FIG. 18 illustrates order of placing the film group 90 on the supply pallet 11 in printing in the sequence of FIG. 17A. FIG. 18 also illustrates the order in a table format. The film group 90 includes two groups G1 and G2 which are arranged on the supply pallet 11 in this order. In the group G1, the picture mask M1 is placed in a top position, and pairs of photosensitive and picture original films are placed thereunder in order of the color components Y, M, C and BK. In the group G2, on the other hand, the character mask M2 is located on the top position. The flat tint plates TY and TC are further placed thereunder in this order.

Setting of the film group 90 in the supply pallet 11 along the order of FIG. 18 is manually performed. In the manual setting operation, the register holes (not shown) provided in the respective films are engaged with the register pins 203 of the supply pallet 11, whereby the films placed on the supply pallet 11 are registered with each other. Then, the supply pallet 11 having the film group 90 is set in the body 2 of FIG. 4. The remaining pallets 12 to 18 are then set in the body 2, the pallet 12 to 18 having no films.

(E-4) Operation Sequence

Figure 19A:
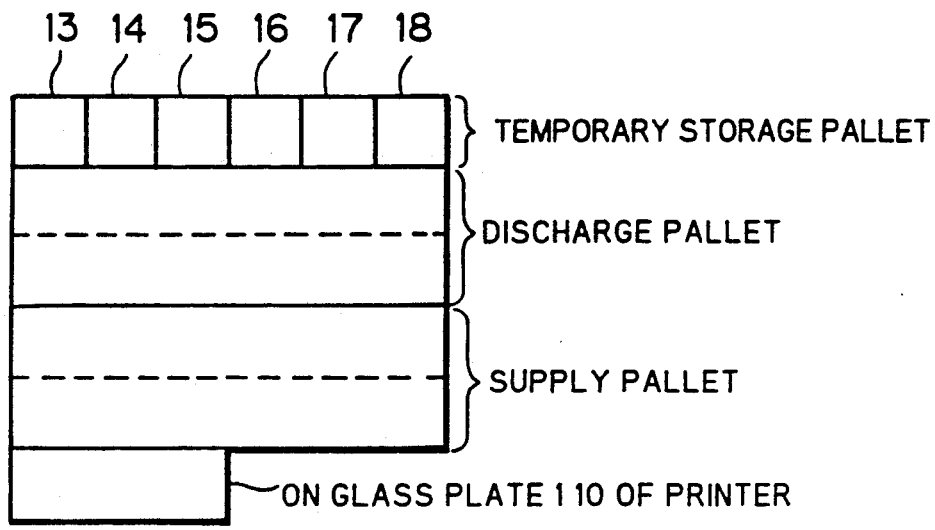
FIGS. 19A and 19B are explanatory diagrams for frame symbols employed for illustrating the operation of the embodiment.
Figure 19B:
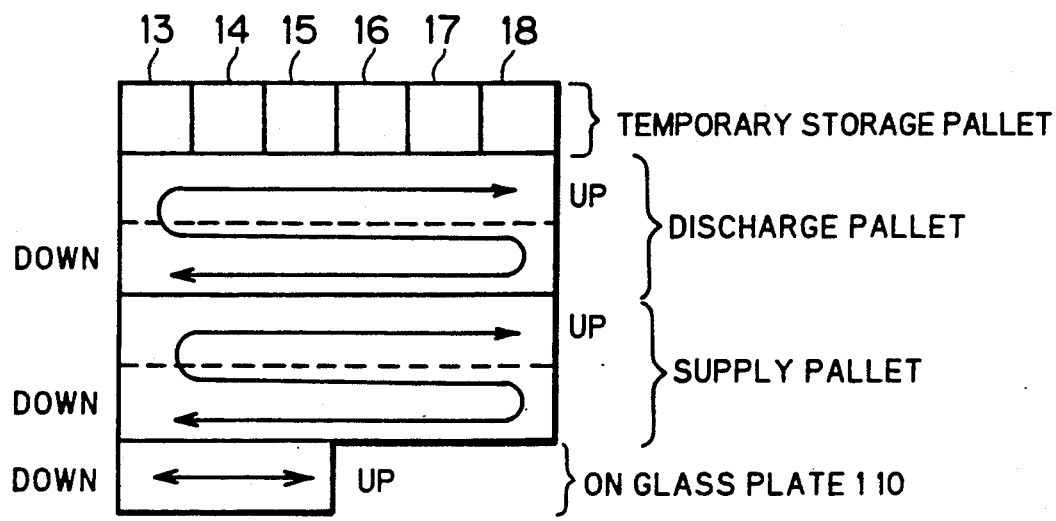

FIGS. 20A to 20F are operation flow charts of the printing apparatus 1, which produces Y-plate, the M-plate, the C-plate and the BK-plate for the printed matter 70. FIGS. 19A and 19B are explanatory diagrams for frame symbols of FIGS. 20A to 20F. In FIG. 19A, these are nine frame symbols corresponding to the pallets 11 to 18 and the transparent plate 110. The respective frame symbols have the space in which lists of films currently placed on the respective pallets 11 to 18 and the transparent plate 110 can be written. When the character flat tint original films TC and TY are placed on the supply pallet 11, for example, symbols TC and TY are written in the spaces corresponding to the supply pallet 11.

It is possible to place a plurality of films on each one of the supply pallet 11, the discharge pallet 12 and the transparent plate 110. FIG. 19B shows vertical relation of films placed in such case. When symbols for a plurality of films are shown in the space on the transparent plate 110, for example, it means that symbols written in the left side are present in lower positions and right-side symbols are present in upper positions. While the spaces corresponding to the supply pallet 11 and the discharge pallet 12 are in two-stage structures, respectively, for convenience of illustration, the respective films are vertically continuously stacked on the respective pallets 11 and 12 in practice, and vertical relation therebetween is as shown by bidirectional arrows in FIG. 19B.

Figure 20A:
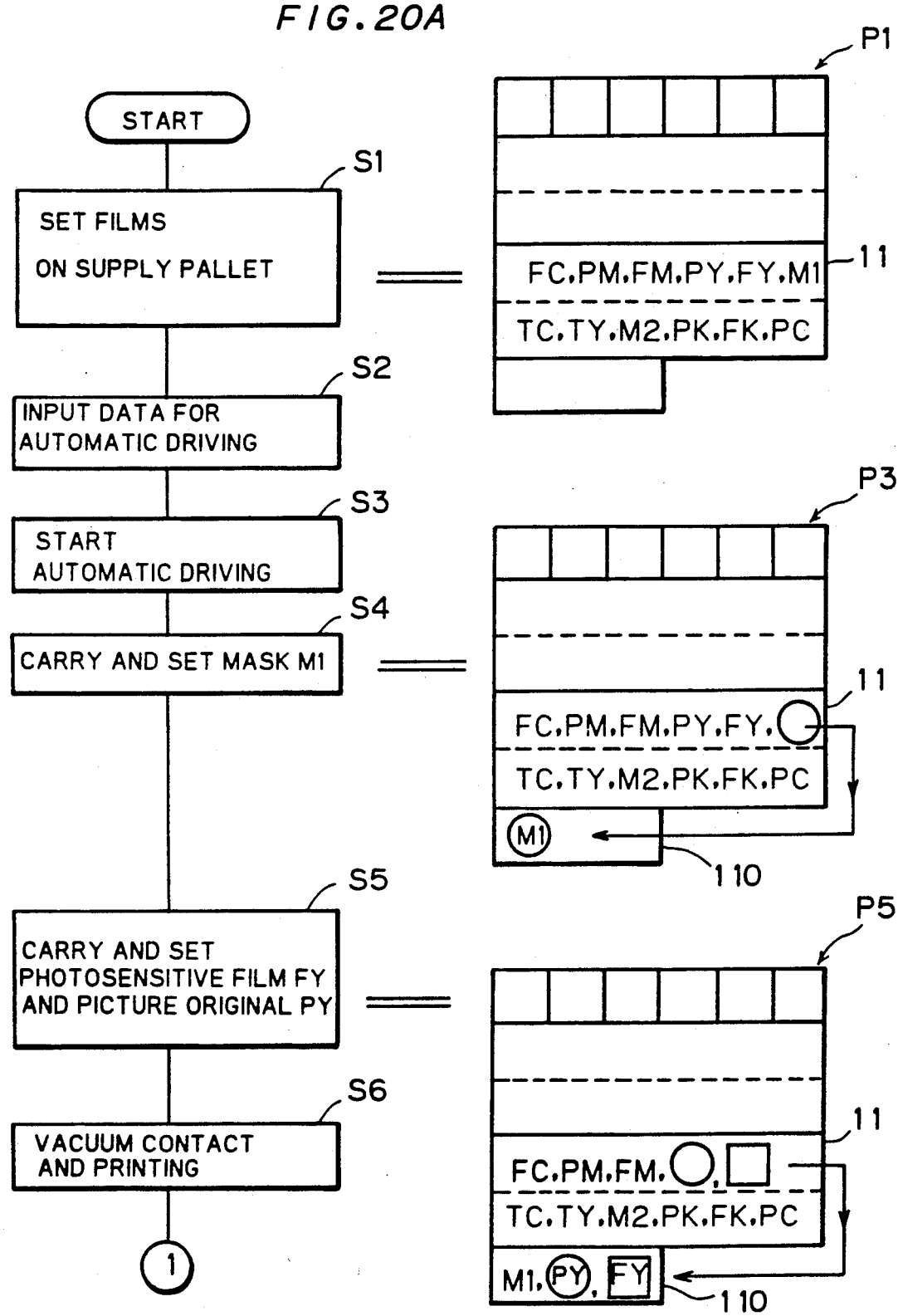
Figure 20F:
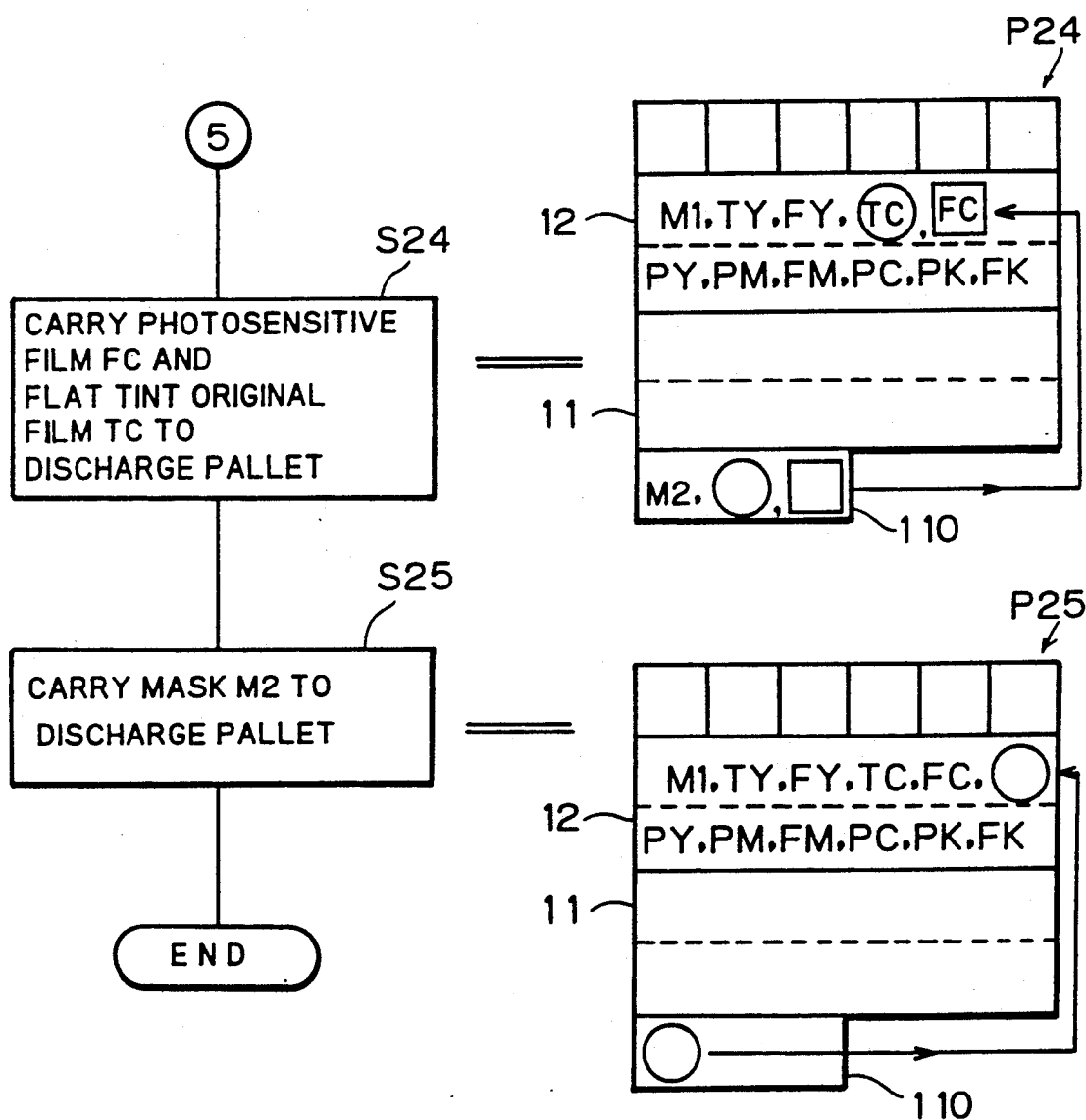

In Step S1 of FIG. 20A, the film group 90 is set in the aforementioned manner on the supply pallet 11 as shown in FIG. 18, and then the pallet 11 is inserted into the guides 230L and 230R (FIG. 4) provided in the body 2. At this point of time, thus, the films TC,TY, M2, PK, FK, PC, FC, PM, FM, PY, FY and M1 are sequentially placed on the supply pallet 11 from the bottom thereof as shown in a frame symbol P1 in FIG. 20A.

In Step S2, operator inputs instruction data through the console panel 5, the instruction data being for automatic driving. In Step S3, the operator presses down a start switch provided on the console panel 5. In response to this, the printing processes described below are automatically carried out.

In Step S4, the carrier 300 carries the top film on the supply pallet 11, i.e., the picture mask film M1 onto the transparent plate 110 while holding the same. The carriage of the mask film M1 is shown in a frame symbol P3. In FIGS. 20A to 20F, an arrow indicates the carriage and circular symbol indicates that the carriage is performed using the suction cups 310 belonging to the front group 311F.

In the next Step S5, the photosensitive film FY for the Y-plate and the picture original film PY are carried from the supply pallet 11 onto the transparent plate 110. These films FY and PY are simultaneously carried. That is, these films FY and PY are simultaneously carried onto the transparent plate 110 while being held by the carrier 300 in such manner shown in FIG. 10B. In more concrete terms, the film FY is first held by suction applied by the rear group 311R. Thereafter the carrier 300 is slightly moved in the direction (−Y), and then the other film PY is held by suction applied by the front group 311F. Thus, two films FY and PY are simultaneously held by the carrier 300. The carrier 300 is moved to the transparent plate 110. Thereafter the film PY is set on the mask M1 disposed on the transparent plate 110, and then the film FY is further set on above. Hence, the vertical relation between the films FY and PY on the supply pallet 11 is also maintained on the transparent plate 110. Rectangles in frame symbol P5 indicate suction carriage using the rear group 311R.

As in frame symbol P5, the films M1, PY and FY are stacked in this order on the transparent plate 110. In the next Step S6, the rubber sheet 123 is spread, and then the vacuum pump 31 starts driving. This allows the films M1, PY and FY to be brought into close contact on the transparent plate 110. The light source 101 is so turned on that a portion of an image on the original film PY is printed on the photosensitive film FY, the portion of the image corresponding to a transparent region of the mask M1. Then, the vacuum pump 31 stops sucking and the rubber sheet 123 is temporarily wound up. Thus, the process 81 in FIG. 16 is completed.

In the next Step S7 of FIG. 20B, the original film PY is carried onto the discharge pallet 12 and the photosensitive film FY is carried onto the temporary storage pallet 13, respectively (frame symbol P7). More precisely, the film FY is held by suction applied by the group 311R, and then the film PY is held by suction applied by the front group 311F. The carrier 300 is moved to an upper front portion of the discharge pallet 12 while holding these films FY and PY. On moving to the discharge pallet 12, suction by the front group 311F is stopped to drop the film PY on the discharge pallet 12. Then, the carrier 300 is moved to the temporary storage pallet 13 while holding the remaining film FY, and then the carrier 300 sets the film FY on this temporary storage pallet 13. At this time, vacuum suction in the temporary storage pallet 13 is turned on, so that the film FY is held by suction to the pallet 13. Consequently, positional deviation of the film FY is prevented on the pallet 13.

The reason that the film FY and PY are carried on the pallet 13 and 12, respectively, is that printing of the characters to the photosensitive film FY has not yet been completed, and on the other hand, the picture original film PY is not used later.

Next Steps S9 and S9 correspond to the process 82 of FIG. 16. As shown in frame symbol P8, printing of the picture for the M-plate is performed using the films M1, PM and FM. As understood from FIG. 16, it is not necessary to print the characters onto the photosensitive film FM for the M-plate. Thus, this photosensitive film FM is carried onto the discharge pallet 12 as well as the picture original film PM (Step S10, frame symbol P10).

Steps S11 and S12 of FIG. 20C correspond to the process 83 of FIG. 16. As in frame symbol P11, the picture mask M1 is still placed on the transparent plate 110 in this stage. In Step S13, the picture original film PC is carried to the discharge pallet 12 since the same is not employed, again and the photosensitive film FC for a C-plate is stored in the temporary storage pallet 15 until a later character printing process (frame symbol P13). The photosensitive film FC is stored in the third temporary storage pallet 15 since the temporary storage pallets 13 to 16 are alloted to the Y, M, C and BK plates, respectively. However, this is merely one mode, and the film may be stored in an arbitrary temporary storage pallet.

Next Steps S14 to S16 (frame symbols P14 and P16) correspond to the process 84 of FIG. 16. Thus, when the Step S16 is completed, picture printing is completed as to all of the photosensitive films FY, FM, FC and FK. Thus, the picture mask M1 is carried to the discharge pallet 12 in Step S17 (frame symbol P17).

In Step S18 (frame symbol P18), the character mask M2 is carried from the supply pallet 11 and set onto the transparent plate 110. In the next Step S19 (frame symbol P19) of FIG. 20E, the photosensitive film FY on the temporary storage pallet 13 and the original film TY on the supply pallet 11 are carried and set onto the transparent plate 110. When the film F is taken up from the temporary storage pallet 13 by the carrier 300, vacuum suction by this pallet 131 is turned off.

Printing is Step S20 corresponds to the process 85 of FIG. 16. When this process 85 is completed, both of the original film TY and the photosensitive film FY are carried to the discharge pallet 12 (Step S21, frame symbol P21). Next Steps S22 and S23 (frame symbol P22) correspond to the process 86 of FIG. 16. Thus, an essential portion of the printing procedure is completed when the Step S23 is completed. Accordingly, in Steps S24 and S25 (frame symbols P24 and P25), all of the films FC, TC and M2 on the transparent plate 110 are carried to the discharge pallet 12. Thus, the overall sequence of automatic driving is completed, and the operator takes out all films from the discharge pallet 12.

F. Extraction of Dropped Film

In the aforementioned embodiment, a film may be dropped in the pocket space 450 during carriage thereof. As in FIG. 13D, the film 55 is carried, for example, while the end portion 55a thereof is being held and the portions other than the end 55a are being stored in the pocket space 450. When suction force of the carrier 300 is weakened or external force is applied to the film 55, the film 55 is detached from the carrier 300 and is dropped in the pocket space 450.

In this embodiment, extraction of the dropped film is attained in the manner described below in detail, in addition to the aforementioned ordinary automatic printing operation.

In this embodiment, the vacuum sensor 35 (FIG. 14) serves as film drop detecting means for detecting a drop of a film in the pocket space 450 from the carrier 300, the vacuum sensor 35 being interposed into a tube (not shown) connecting the vacuum pump 31 with the carrier 300. In other words, the space in the tube is maintained at a constant negative pressure when the film is held by suction by the suction cups 310 of the carrier 300. On the contrary, the pressure in the tube suddenly approaches the atmospheric pressure when the film is once dropped. Thus, the vacuum sensor 35 detects the film drop on the basis of this pressure change.

FIG. 21 illustrates the operation for extracting the dropped film. When a film is dropped from the carrier 300 during ordinary automatic printing operation, the vacuum sensor (film drop detecting means) 35 first detects the film drop (Step S31), and then supplies a signal indicating the film drop to the control unit 6. In response to this, the control unit 6 supplies temporary stop commands to the respective parts of the apparatus, to temporarily stop operations of the carrier 300 and the like. It is noted that the so-called manual operation in which the operator manipulates the console panel 5 for driving the carrier 300 etc. is available. When the operator supplies a prescribed signal to the control unit 6 through the console panel 5, automatic driving is enabled.

Figure 22A:
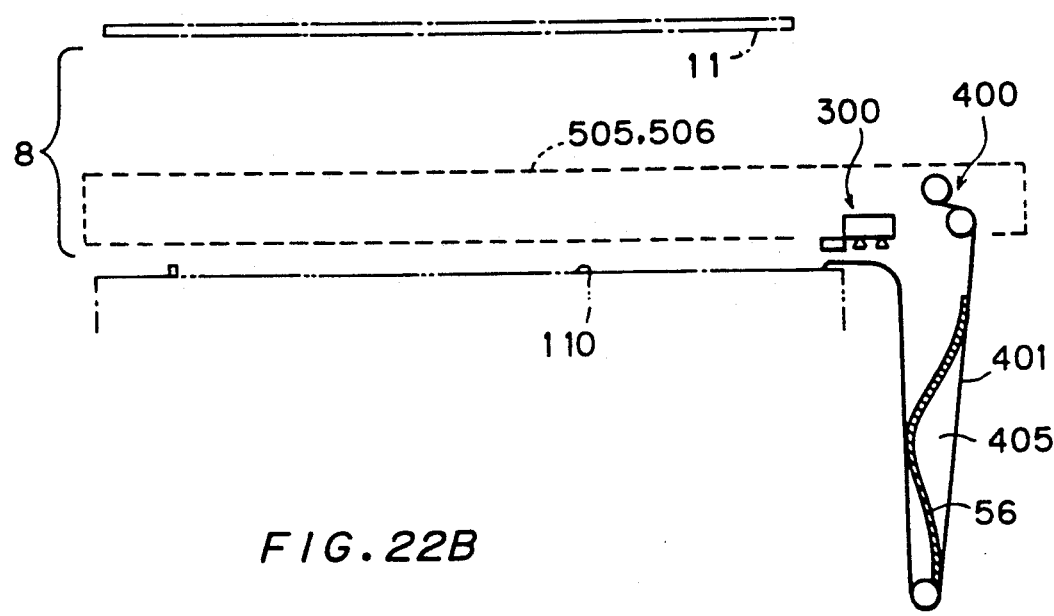
FIGS. 22A to 22C are explanatory diagrams showing the operation for extracting the dropped film, respectively.

Then, the operator properly manipulates the keyboard 5a of the console panel 5 so as to move the carrier 300 to a position where the film 56 can be relatively easily extracted, such as the position between the supply pallet 11 and the transparent plate 110, for example (FIG. 22A). When the operator continuously presses down a carrier-down-key (one of the keys forming the keyboard 5a) of the console panel 5, for example, the carrier 300 is moved down in the direction (−Z). When the operator judges that the carrier 300 reaches the aforementioned position and the carrier-down-key, is released and the carrier 300 is stopped at that position (Step S32).

Figure 22B:
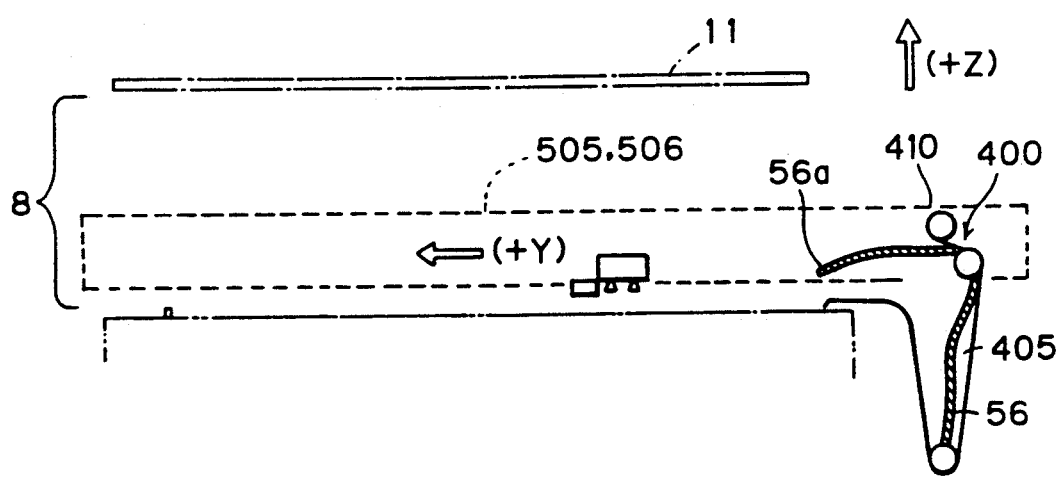
Figure 22C:
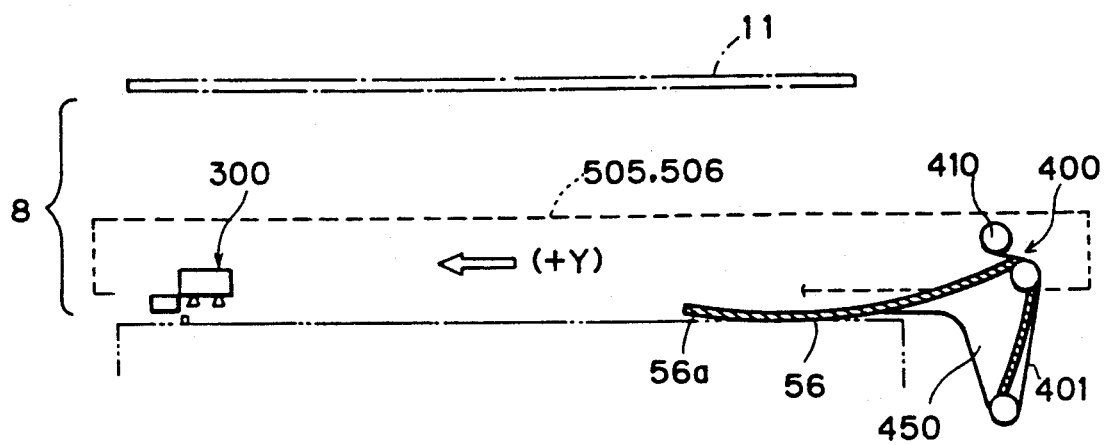

When the operator confirms completion of the movement and further properly manipulates the keyboard 5a (presses a sheet up key, for example), the sheet 401 is wound up by the roller 410 to reduce the depth of the pocket space 450 (Step S53). This causes one end portion 56a of the dropped film 56 to move up in the direction (+Z) along the sheet 401 and to wind around the guide roller 420 (FIG. 22B). When the sheet 401 is further continuously wound up, the end portion 56a runs onto the transparent plate 110 (FIG. 22C), so that the dropped film 56 can be easily extracted.

The operator extracts the film 56 and sets the same in a prescribed position (Step S34). When the film drop is caused in a process of discharging the film 56 from the printer part 100 to the discharge pallet 12, for example, the operator re-places the extracted film on the printer part 100.

When the aforementioned film setting is completed and the operator supplies a prescribed signal to the control unit 6 through the console panel 5, automatic printing driving is restarted (Step S35).

According to this embodiment, as hereinabove described, such an effect that the dropped film 56 can be easily extracted is provoked in addition to the aforementioned effect.

Though the operator extracts the dropped film 56 by manual operation while monitoring the extraction status of the film 56 in this embodiment, automatic extraction may be also available in the following manner: When the operator supplies an automatic extraction command to the control unit 6 through the keyboard 5a, the respective parts of the apparatus operate in the following sequence in accordance with commands from the control unit 6:

(1) The carrier 300 is moved in the direction (−Y).
(2) The elevation beams 505 and 506 are moved down in the direction (−Z), as in FIG. 22A.
(3) The sheet 401 is wound up with the roller 410 by a prescribed amount, so that the depth of the pocket space 450 is reduced. Thus, the end portion 56a of the dropped film 56 runs onto the transparent plate 110 (FIG. 22C), in consequence the dropped film 56 can be easily extracted.
(4) A message indicating the above is displayed on the liquid crystal display 5b to inform the operator of completion of extraction. The operator confirming the message sets the film 56 in a prescribed position and supplies a prescribed signal to the control unit 6 through the console panel 5, so that automatic printing driving is restarted.

G. Film Storage Processing

When no film is left in the supply pallet 11 as hereinabove described, it is necessary to supply next films to the supply pallet 11 for next printing. According to this embodiment, film storage is performed by manual operation shown in FIG. 23.

Figure 24:
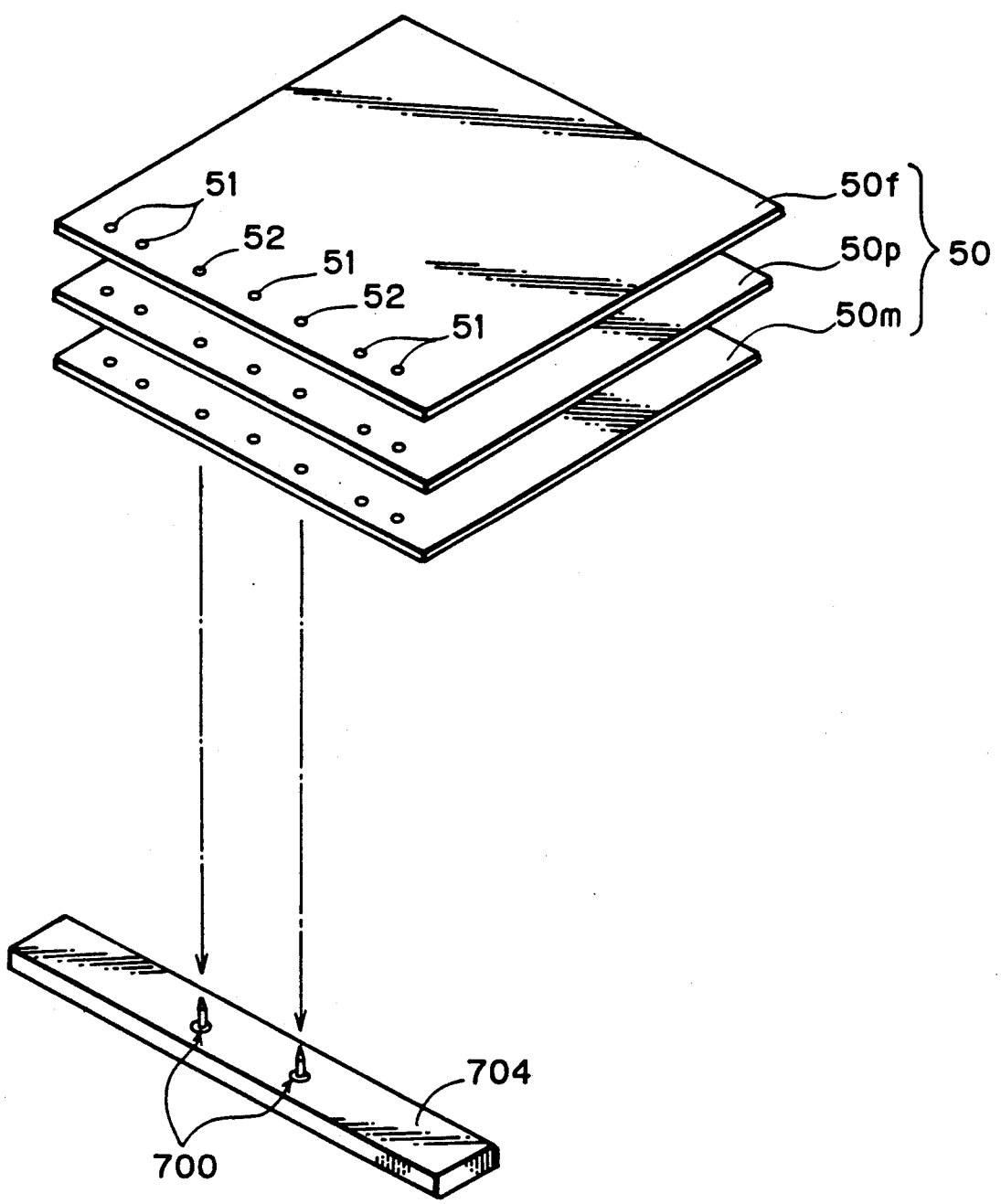
FIGS. 24 to 28 are explanatory diagrams showing the operation, for storing films in the supply pallet respectively.

In this embodiment, holes 52 for storing films are further provided in the end portion of the respective films, in addition to the register holes 51, as shown in FIG. 24. As in FIGS. 25 and 26, holes 204 are provided in the supply pallet 11 also.

Figure 27:
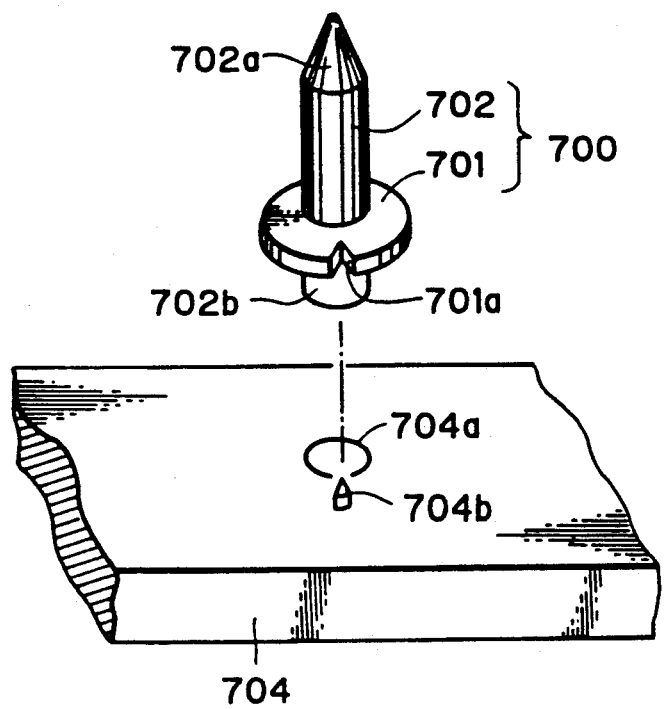

Pins 700 are prepared for stacking films for next printing in accordance with prescribed rules (Step S41). FIG. 27 is a perspective view of the pin 700. In FIG. 27, a pin portion 702 is provided to pass through a disc plate 701. The diameter of the disc plate 701 is larger than that of each register hole 52 of FIG. 24, while the diameter of the pin portion 702 is identical to or smaller than that of the register hole 52. The disc plate 701 is not necessarily restricted to a circular configuration, but may have a rectangular configuration or the like. At least a one dimension of the plate 701 should be larger than the diameter of the register hole 52. A top end portion 702a of the pin portion 702 is finished in a conical shape while the bottom end portion 702b of the pin portion 702 is finished to be engageable with a hole 704a provided in a preparation stand 704.

A notch 701a is provided in the disc plate 701. The notch 701a is engageable with a projecting portion 704b which is protrudingly provided around the hole 704a. Thus, the bottom end portion 702b of the pin portion 702 can be inserted into the hole 704a of the preparation stand 704 with the notch 701a being engaged with the projecting portion 704b.

The notch portion 701a and the projecting portion 704b, which are engageable with each other, have important meaning when the register holes 52 are formed in the form of slits. This is because it is also necessary to provide the pin portion 702 with a configuration corresponding to the register hole 52. Furthermore, the pin portion 702 must be located on the preparation stand 704 with a prescribed relation. More particularly, the pin 700 must be set on the preparation stand 704 with a one-to-one correspondence. Hence, the notch portion 701a and the projecting portion 704b serve as means for positioning the pin 700 with a one-to-one correspondence. When the register hole 52 is in a circular configuration, on the other hand, the notch 701a and the projecting portion 704b are not requisite elements.

After the pin portion 702 is completely set in the preparation stand 704 in the aforementioned manner, the films are stacked in prescribed order with the register holes 52 thereof being engaged with the pins 700 (Step S42). Assuming that the films 50f, 50p and 50m must be supplied to the supply pallet 11 in this order, the films 50m, 50p and 50f are set in this order reversely to the order of supplying the same to the supply pallet 11, as shown in FIG. 24. The operation up to this point is performed during automatic printing processing.

Figure 28:
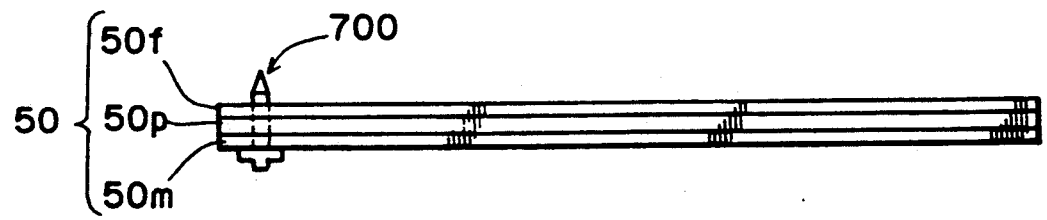

When no film is left in the supply pallet 11 upon completion of the printing procedure, the pins 700 are extracted from the preparation stand 704 while engaging with the film 50 (FIG. 28). At this time, an end portion (left end portion in FIG. 28, for example) of the films 50 m, 50p and 50f may be fixed by a clip etc., so as to simplify additional processing.

Figure 25:
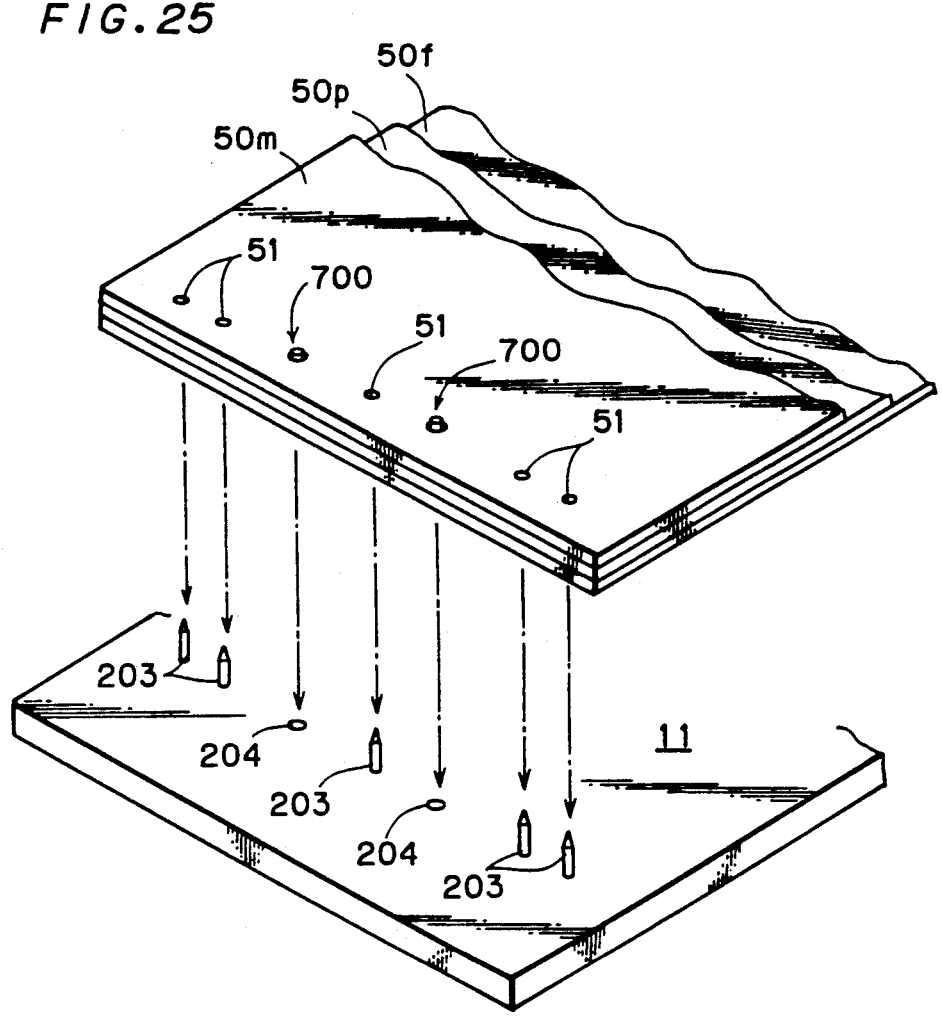
Figure 26:
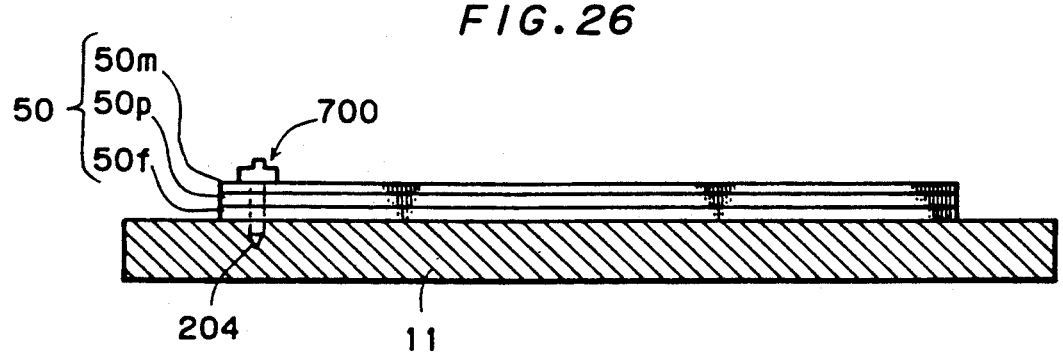

Following this, as shown in FIG. 25, the top end portions 702a of the pins 700 are engaged in the holes 202 of the supply pallet 11 with the register holes 51 of the film 50 being engaging with the register pins 203 of the supply pallet 11 (Step S43). Thus, each film 50 is registered and set in the supply pallet 11 (FIG. 26). Finally, the pins 700 are extracted (Step S44), thereby completing the film storage procedure. The holes 202 may not necessarily pass through the supply pallet 11, but the point is that the same may be in configurations capable of registering the pins 700.

According to this embodiment, it is possible to prepare next films 50 during automatic printing processing as well as to store the films 50 in the supply pallet 11 at the same time when no film is left in the supply pallet 11. Consequently, down time of the printing apparatus is reduced.

Furthermore, it is not necessary to detach the supply pallet 11 for every film storage in the supply pallet 11, whereby the supply pallet 11 can be registered with high accuracy. In addition, it is not necessary for an operator to handle the supply pallet itself for film storage, whereby film storage is simplified.

H. Modifications

(1) Other Carrier Moving Mechanism 500'

Figure 31:
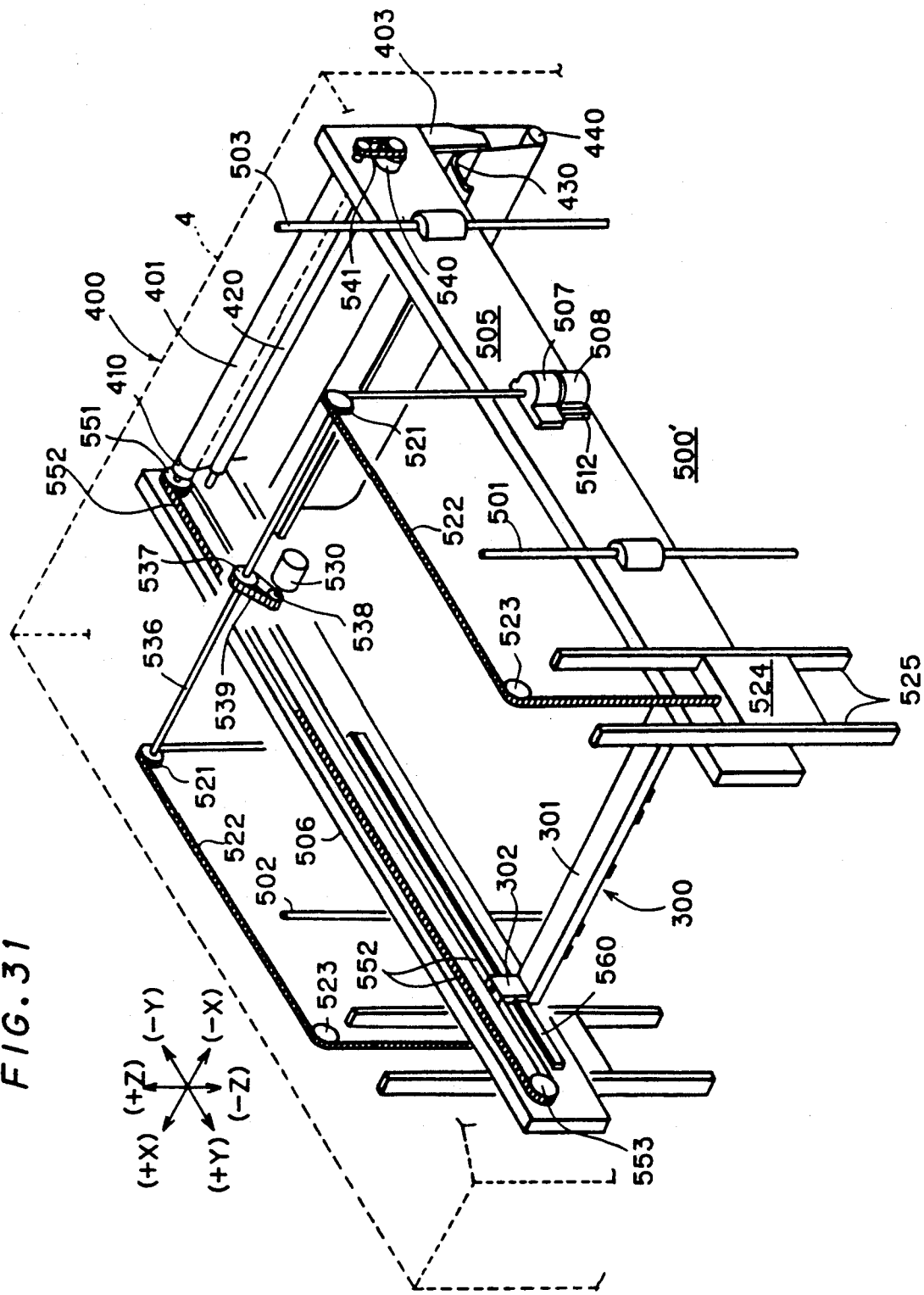
FIG. 31 is a perspective view of other carrier moving mechanism.

FIG. 31 is a perspective view of the other carrier moving mechanism 500'. The carrier moving mechanism 500' is different from the aforementioned one 500 in structure at only the following point: the driving force of the motor 530 for driving elevation beams 505 and 506 is transmitted through chains 552 instead of the screw rods 509. More precisely, sprockets 521 are secured on respective end portions of a rod 536 which is rotatably supported by the top surface of housing 4. A sprocket 537 is secured to a center portion of the rod 536, and is connected to a driving sprocket 538, which is coupled to a rotor shaft of the motor 530, through a belt 539. Thus, the elevation beams 505 and 506 are moved upward and downward upon driven by the motor 530.

According to the modified carrier moving mechanism 500', since the driving force of the motor 530 is transmitted to the elevation beams 505 and 506 through the chain 521, the carrier 300 can be moved in the directions ($\pm Z$) with speed. Noise produced by the movement of the carrier 300 is reduced. Further, it is easy to assemble the carrier moving mechanism and to control the speed of the carrier 300.

In the carrier moving mechanism 500' of FIG. 31, on the other hand, a problem arises that the chain 521 is stretch with age. The deterioration with age in the chain 521, results in a decreased position accuracy. The present invention in order to cope with this problem has introduced improvements in the carrier moving mechanism 500'.

Figure 32:
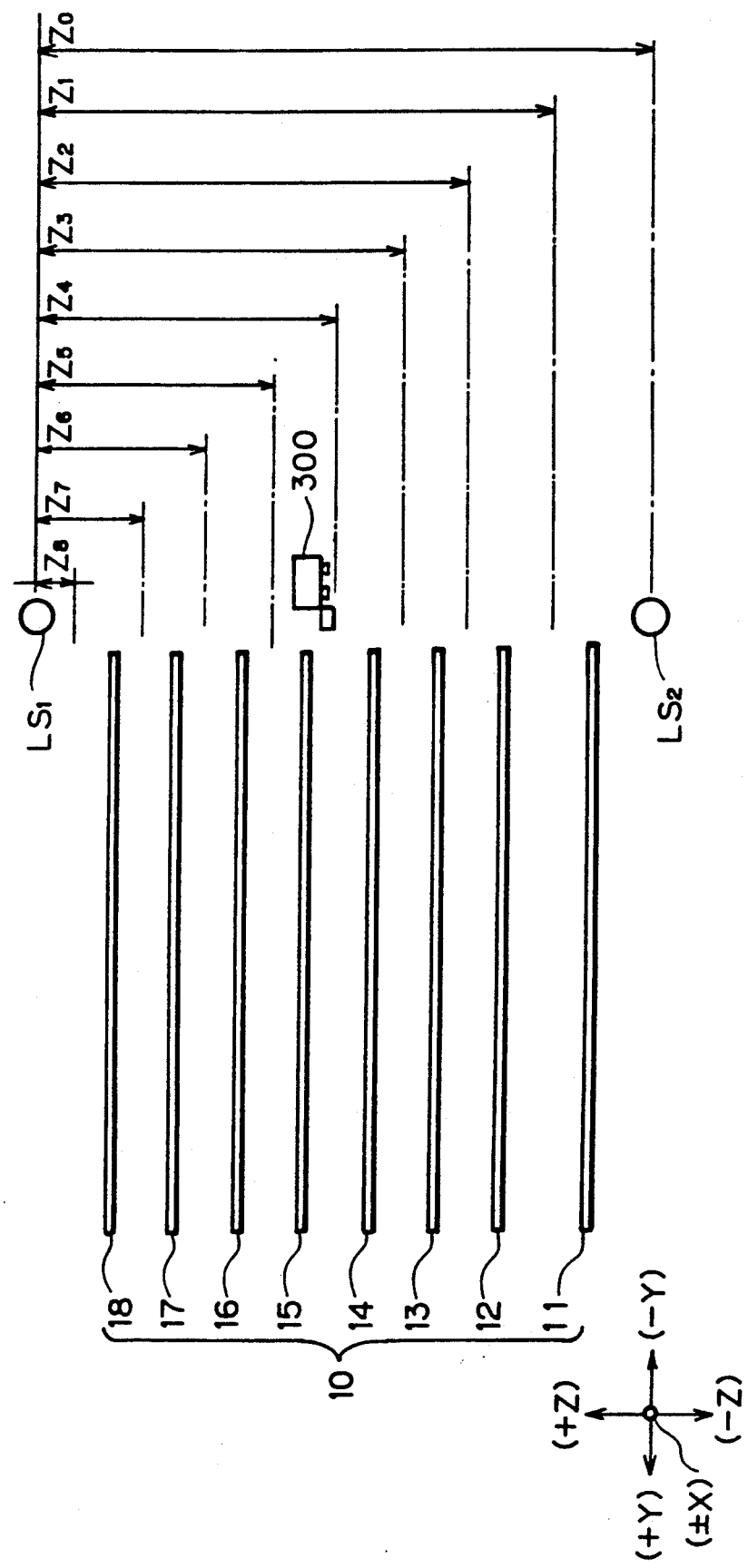
FIG. 32 illustrates the relation between the pallets.

FIG. 32 illustrates the relation between the pallets 11 to 18. In FIG. 32, the pallets 11 to 18 are disposed in superposed vertically spaced relation, the spacing therebetween being dimensioned to allow for the movement of the carrier 300. A sensor $LS_1$ for detection of the carrier 300 is provided above the top pallet 18 while a sensor $LS_2$ is provided below the bottom pallet 11. Detection output signals therefrom are supplied to an input control part 63. Further, the motor 530 for moving the elevation beams 505 and 506 has an encoder (not shown) within. The encoder is connected with the input control part 63, so as to output a marker signal each time the rotor shaft of the motor 530 rotates. In this figure, symbols $Z_1$ to $Z_8$ represent the distance from the carrier 300 horizontally moving between the pallets to the sensor $LS_1$ with respect to the directions ($\pm Z$), and symbol $Z_0$ represents the distance between the sensors $LS_1$ and $LS_2$.

Figure 33:
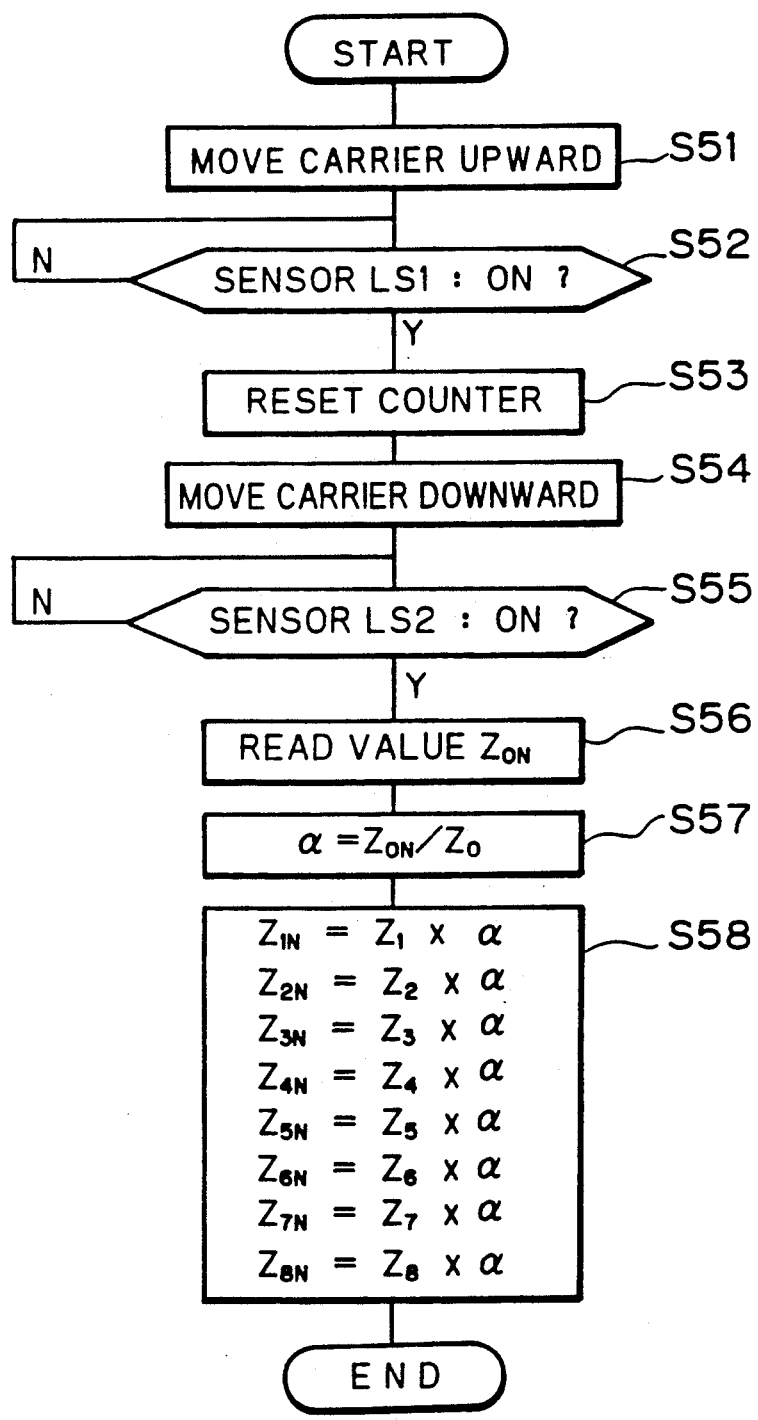
FIG. 33 is a flow chart of the operation for correcting a chain stretch.

FIG. 33 is a flowchart showing the operation for correcting the stretch of the chain 522. When an operator turns a main switch on, the following operation is carried out. The carrier 300 is moved to the initial position being in the space 30, and then is moved upward (Step S51). The carrier 300 reaches the top position to be detected by the sensor $LS_1$ (Step S52). Furthermore, when the marker signal is supplied to the input control part 63, a counter provided in the control unit 6 is reseted (Step S53).

After Step S53, the carrier 300 is moved downward (Step S54) while the counter starts counting. Then, the carrier 300 reaches the bottom position to be detected by the sensor $LS_2$ (Step S55). In response to this, the counter value $Z_{ON}$ is read out (Step S56). The value $Z_{ON}$ corresponds to the distance between the sensors LS$_1$ and LS$_2$. If no chains 522 stretch, the value Z$_{ON}$ is equal to the initial value Z therebetween. When stretching, the value Z$_{ON}$ is greater than the initial value Z. A stretch rate $\alpha(=Z_{ON}/Z)$ is calculated (Step S57) while values Z$_{1N}$-Z$_{8N}$, which correspond to the distance between the carrier 300 and the pallets 11 to 18 respectively, are also calculated (Step S58). The valves Z$_{1N}$-Z$_{8N}$ are substituted with the initial value, so that the carrier is moved in the directions ($\pm$Z) on the basis of the values Z$_{1N}$-Z$_{8N}$.

(2) Although all of the original, mask and photosensitive films are stored in the single supply pallet 11 in the above embodiment, separate pallets may be provided for the respective films.

(3) Accordingly to the above embodiment, the rubber sheet 123 spreads to cover the transparent plate 110. A previously spread rubber sheet may be vertically moved in parallel with the transparent plate 110, thereby covering the transparent plate 110 with the rubber sheet.

(4) An original film and a photosensitive film are indispensable for producing a color separation, but the mask film may be unnecessary. In the case that the films for producing a color separation are only the original and the photosensitive films, no mask film is supplied to the supply pallet.

(5) In the printing apparatus according to the present invention, the pallet group is arranged on the printer so that the printer part and the pallet group are spatially separated from each other. Therefore, it is also possible to build the inventive printing apparatus by partially altering a printer on hand and adding other members thereof.

Figure 29:
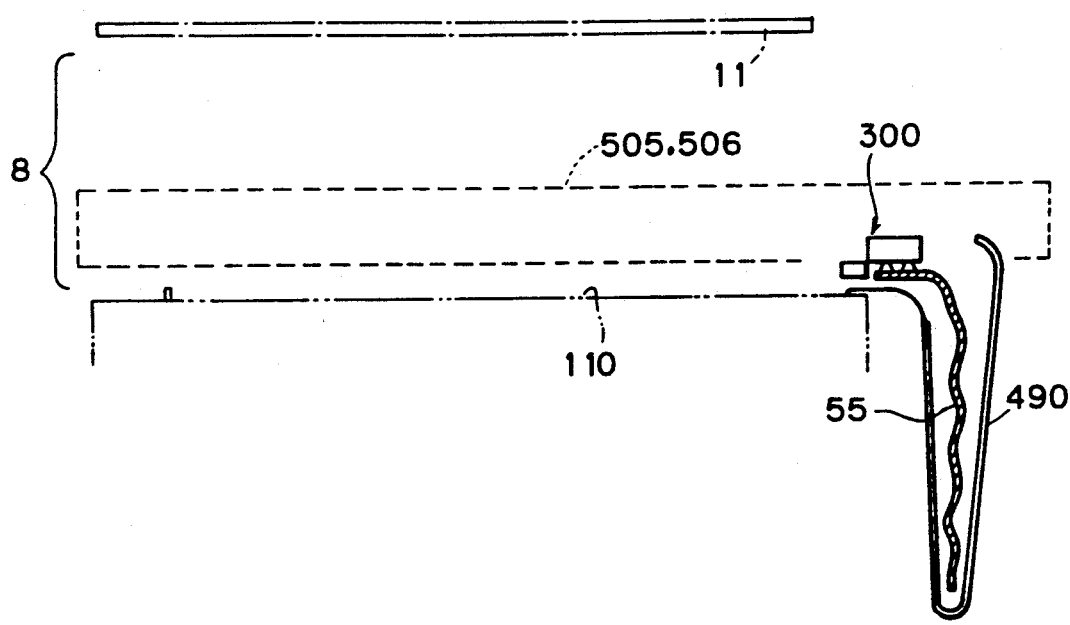
FIGS. 29 and 30 are sectional views of film pocket mechanism according to another embodiments, respectively.

(6) Though the pocket space 450 is formed by the sheet 401 in the embodiment, the space 450 may be formed in a film retractive space 30 by a hard pocket member 490, as shown in FIG. 29.

Figure 30:
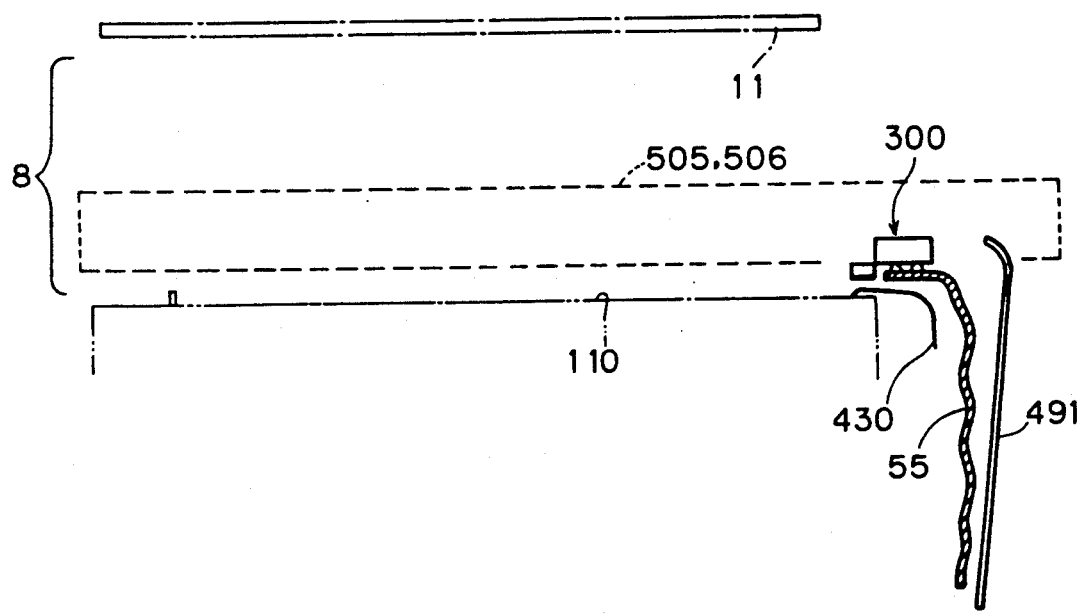

(7) In a case of considering no drop of a film 55, it is possible to directly guide the film 55 into a film retractive space 30 by arranging another guide member 491 at the back of a guide plate 430, as shown in FIG. 30.

(8) Although one air suction port 223 is provided in each temporary storage pallet in the aforementioned embodiment, it is also possible to provide a plurality of air suction ports in a single film pallet. When a relatively large number of air suction ports are formed and spatially distributed, it is possible to omit the groove 222 from the metal plate 211.

(9) The temporary storage pallet according to the present invention is applicable not only to a printing apparatus in which the pallet group is located above the printer, but also to an apparatus in which a pallet group and a printer are transversely arranged.

(10) In the embodiment, the inventive film storage processing is applied to the printing apparatus in which the pallet group is located above the printer. The object of application of the film storage processing is not restricted to this. The film storage processing is generally applicable to any printing apparatus which has register pins corresponding to register pins uprightly provided in supply pallets.

(11) The number and configurations of the pins 700 for the film storage processing can be arbitrarily selected. In addition, it is possible to use the element in which a plurality of register pins are uprightly provided in a strip-shaped plate, in place of the pins 700.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A printing apparatus for printing an image provided on an original film onto a photosensitive film, comprising:
   a printer including a light source for emitting light and a transparent plate located above said lights source;
   film storage means, arranged above said transparent plate, having a supply pallet for storing a plurality of films required for printing, said films including an original film and a photosensitive film;
   a carrier including vacuum suction means for applying suction to an end of said film and a nozzle for blowing air in a predetermined direction substantially in parallel with a lower surface of said film held by said vacuum suction means;
   a carrier moving mechanism for moving said carrier between said transparent plate and said film storage means;
   a film pocket mechanism for forming a pocket space on a downstream side with respect to said predetermined air blowing direction; and
   a controller for controlling said printer, said carrier and said carrier moving mechanism,
   such that said original and said photosensitive film which are stored in said supply pallet are carried onto said transparent plate by said carrier so as to be stacked in this order, and then light from said light source is directed toward said transparent plate, whereby an image provided on said original film is printed onto said photosensitive film.

2. The printing apparatus of claim 1, wherein said printer includes a mechanism for covering said transparent plate with a sheet, said sheet having a light-shielding and an airtight property.

3. The printing apparatus of claim 2, further comprising a vacuum pump, and wherein said printer includes an air suction port coupled to said vacuum pump.

4. The printing apparatus of claim 1, wherein a plurality of register holes are provided in one end portion of each of said films.

5. The printing apparatus of claim 4, wherein a plurality of register pins are upwardly provided on said transparent plate so as to be engaged with said register holes.

6. The printing apparatus of claim 4, wherein a plurality of register pins are further provided on said supply pallet so as to be engaged with said register holes.

7. The printing apparatus of claim 1, wherein said film storage means further has a discharge pallet for storing a plurality of films which have been used for printing.

8. The printing apparatus of claim 7, wherein said supply pallet is located at the bottom of said film storage means and said discharge pallet is located above said supply pallet.

9. The printing apparatus of claim 7, wherein said film storage means further has a temporary storage pallet for temporarily storing a film which is used a plurality of times in printing.

10. The printing apparatus of claim 9, wherein said supply, said discharge and said temporary pallet are located in this order from the bottom of said film storage means, while being disposed in superposed vertically spaced relation.

11. The printing apparatus of claim 9, further comprising a vacuum pump, and wherein said temporary storage pallet comprises a plate having an upper surface on which a groove is provided and an air suction port provided in one portion of said groove, said suction port being connected to said vacuum pump.

12. The printing apparatus of claim 1, wherein said supply pallet is formed by a first and a second plate, said second plate being removably attached to said first plate.

13. The printing apparatus of claim 12, wherein a plurality of register pins are upwardly provided on said second plate, said register pins being engageable with a plurality of register holes which are provided in one end portion of each of said films.

14. The printing apparatus of claim 1, wherein said carrier moving mechanism comprises:
 a movable member being vertically movable around said printer;
 a coupling member superimposed on said movable member, said coupling member being coupled to said carrier; and
 driving means for vertically driving said movable member,
 said coupling member being coupled to said movable member such that said movable member and said coupling member move downwardly toward said transparent plate together until said carrier is stopped on said transparent plate, and then only said movable member moves downwardly.

15. The printing apparatus of claim 14, wherein said carrier moving mechanism further comprises a balance mechanism which includes a balance member of prescribed weight, a rotary member rotatably supported in a position above said printer and a connecting member extended along said rotary member, one end of said connecting member being connected to said coupling member, the other end thereof being connected to said balance member.

16. The printing apparatus of claim 14, wherein said driving means includes a motor, a vertically extending screw rod engaged with said movable member and means for transmitting a driving force of said motor to said screw rod.

17. The printing apparatus of claim 14, wherein said driving means includes a motor, a balance member of prescribed weight, a rotary member connected to said motor and a chain extended along said rotary member, one end of said chain being connected to said coupling member, the other end thereof being connected to said balance member.

18. The printing apparatus of claim 17, further comprising means for correcting a stretch of said chain, said correcting means including a first sensor disposed in a top portion of said film storage means, a second sensor disposed in a bottom portion thereof, means for moving said carrier between said first and said Second sensor to obtain a distance therebetween, and means for calculating a stretch rate of said chain.

19. The printing apparatus of claim 1, further comprising an air compressor coupled to said nozzle and a vacuum pump coupled to said vacuum suction means.

20. The printing apparatus of claim 1, wherein said vacuum suction means has a plurality of trains of suction cups in parallel, said trains being extended in a direction substantially perpendicular to the air blowing direction.

21. The printing apparatus of claim 20, further comprising a vacuum pump, wherein said trains of said suction cups are coupled to said vacuum pump so as to be independently activated.

22. The printing apparatus of claim 1, wherein said carrier further comprises support means for vertically movable supporting said nozzle with respect to said carrier and an elastic member for downwardly urging said nozzle.

23. The printing apparatus of claim 22, wherein said nozzle has a plurality of pressing portions which are provided at its bottom surface, said pressing portions being disposed at intervals larger than diameters of a register pin upwardly provided on said transparent plate.

24. The printing apparatus of claim 1, wherein said film pocket mechanism comprises:
 a sheet member for forming said pocket space, said sheet member having one end coupled to said carrier moving mechanism;
 a roller for winding another end portion of said sheet member; and
 driving means for rotating said roller and unwinding said sheet member such that
 unwinding of said sheet member moves the carrier toward the downstream side while downwardly spreading said pocket space.

25. The printing apparatus of claim 1, further comprising:
 film drop detecting means for detecting a drop of a film from said carrier; and
 means for pressing up said film while upwardly moving said pocket space by winding up said sheet member with said roller when said film drop detecting means detects the film drop from said carrier.

26. A method of storing a plurality of films on a supply pallet in a prescribed order, said supply pallet having a plurality of first pins, each of said films having a plurality of first holes each of which is engageable with said first pin and a plurality of second holes, said method comprising:
 preparing a plurality of second pins each of which has a pin portion having diameters identical to or smaller than those of second holes and a plate portion having larger sizes than diameters of said second holes;
 stacking said films in reverse of said order while engaging said second holes with said second pins;
 inserting top end portions of said second pins in hole portions provided in said supply pallet while engaging said first holes of said films with said second pins; and
 extracting said second pins from said second holes.

* * * * *